US010794437B2

(12) United States Patent
Maehara et al.

(10) Patent No.: US 10,794,437 B2
(45) Date of Patent: Oct. 6, 2020

(54) WEDGE CAM BRAKE

(71) Applicant: AKEBONO BRAKE INDUSTRY CO., LTD., Chuo-ku, Tokyo (JP)

(72) Inventors: Toshifumi Maehara, Tokyo (JP); Shogo Mashimo, Tokyo (JP); Kazuhiro Yoshikawa, Tokyo (JP)

(73) Assignee: AKEBONO BRAKE INDUSTRY CO., LTD., Chuo-ku, Tokyo (JP)

(*) Notice: Subject to any disclaimer, the term of this patent is extended or adjusted under 35 U.S.C. 154(b) by 171 days.

(21) Appl. No.: 15/750,295

(22) PCT Filed: Aug. 5, 2016

(86) PCT No.: PCT/JP2016/073058

§ 371 (c)(1),
(2) Date: Feb. 5, 2018

(87) PCT Pub. No.: WO2017/022847

PCT Pub. Date: Feb. 9, 2017

(65) Prior Publication Data

US 2018/0223923 A1 Aug. 9, 2018

(30) Foreign Application Priority Data

Aug. 6, 2015 (JP) ................................ 2015-155798
Mar. 15, 2016 (JP) ................................ 2016-051276

(51) Int. Cl.
*F16D 55/224* (2006.01)
*F16D 65/18* (2006.01)
(Continued)

(52) U.S. Cl.
CPC ........... *F16D 55/2245* (2013.01); *B61H 5/00* (2013.01); *F16D 65/18* (2013.01); *F16D 65/183* (2013.01);
(Continued)

(58) Field of Classification Search
CPC ............... F16D 55/225; F16D 55/2245; F16D 2121/26; F16F 2125/66
See application file for complete search history.

(56) References Cited

U.S. PATENT DOCUMENTS 3,927,738 A 12/1975 Ernst
4,175,645 A * 11/1979 Brinkert ................ B60T 13/743 188/72.1

(Continued)

FOREIGN PATENT DOCUMENTS

CN A-102265053 11/2011
DE A1-19525722 1/1997

(Continued)

OTHER PUBLICATIONS

CN Office Action dated Dec. 14, 2018 in Chinese Application No. 201680046255.9 (with attached English-language translation).

(Continued)

*Primary Examiner* — Bradley T King
(74) *Attorney, Agent, or Firm* — Faegre Drinker Biddle & Reath LLP

(57) ABSTRACT

A wedge cam brake executes a braking operation by causing proximal end portions of brake arms to press a pair of pad assemblies against both sides of a brake rotor so as to hold it therebetween by means of a cam action of a wedge cam which is caused to move to a braking position along the direction of a rotational axis of a ball screw which is screwed into a ball nut which is provided integrally with the wedge cam as a result of the ball screw being driven to rotate. The wedge cam includes a compression coil spring for pushing to bias the ball nut towards the braking position where the proximal end portions of the brake arms are expanded and a spring holding mechanism for holding the compression coil spring in a biasing force accumulating state.

9 Claims, 30 Drawing Sheets

(51) Int. Cl.

| | |
|---|---|
| ***B61H 5/00*** | (2006.01) |
| *F16D 121/14* | (2012.01) |
| *F16D 121/24* | (2012.01) |
| *F16D 125/36* | (2012.01) |
| *F16D 125/28* | (2012.01) |
| *F16D 125/66* | (2012.01) |
| *F16D 125/58* | (2012.01) |
| *F16D 121/26* | (2012.01) |

(52) U.S. Cl.

CPC ...... *F16D 2121/14* (2013.01); *F16D 2121/24* (2013.01); *F16D 2121/26* (2013.01); *F16D 2125/28* (2013.01); *F16D 2125/36* (2013.01); *F16D 2125/582* (2013.01); *F16D 2125/66* (2013.01)

(56) References Cited

U.S. PATENT DOCUMENTS

| | | | | |
|---|---|---|---|---|
| 4,651,852 | A * | 3/1987 | Wickham | B60T 8/1893 188/173 |
| 4,784,244 | A * | 11/1988 | Carre | B60T 13/741 188/156 |
| 6,722,477 | B1 * | 4/2004 | Wolfsteiner | B61H 5/00 188/173 |
| 7,975,811 | B2 * | 7/2011 | Berliant | B61H 7/12 188/41 |
| 2004/0074709 | A1 * | 4/2004 | Krug | B60T 13/743 188/72.1 |
| 2005/0006948 | A1 | 1/2005 | Friesen | |
| 2009/0183956 | A1 | 7/2009 | Berliant | |

FOREIGN PATENT DOCUMENTS

| | | | |
|---|---|---|---|
| FR | A1-2956888 | | 9/2011 |
| JP | A-2008-020014 | | 1/2008 |
| JP | 2010-25313 | A | 2/2010 |
| JP | 2010-65751 | A | 3/2010 |
| JP | 2011-511730 | A | 4/2011 |
| JP | A-2012-065751 | | 4/2012 |
| WO | WO-2012/111830 | A1 | 9/2012 |
| WO | WO-2012/118133 | A1 | 9/2012 |

OTHER PUBLICATIONS

Extended European Search Report dated Mar. 29, 2019 in corresponding European patent application 16833126.2, (7 pages).

International Search Report and Written Opinion dated Sep. 6, 2016 for PCT/JP2016/073058 [non-English language].

International Search Report dated Sep. 6, 2016 for PCT/JP2016/073058, including English translation.

* cited by examiner (a)

(b)

WEDGE CAM BRAKE

TECHNICAL FIELD

The present invention relates to a wedge cam brake.

BACKGROUND ART

Conventionally, in disc brakes for vehicles installing brakes, particularly, railway vehicles on which a strong braking force is required, wedge cam brakes are known in which proximal end portions of a pair of brake arms are expanded by the action of a wedge cam so that pad assemblies provided at open end portions of the brake arms are strongly pressed against both sides of a brake rotor so as to hold the brake rotor therebetween to execute a braking operation.

Additionally, it has been studied that electric power is used as a power source of a railway vehicle brake instead of hydraulic or air pressure (refer to Patent Literature 1).

As shown in FIG. 30, an electric brake apparatus 500 includes a disc (a brake rotor) 520 which rotates together with a wheel, wheel braking elements (pad assemblies) 530 which are brought into abutment with the disc 520 to impart a friction force to the disc 520, a mechanical spring 550 provided on a caliper 510 for biasing the wheel braking elements 530 in the direction of the disc 520, an electric actuator 540 for biasing the wheel braking elements 530 in the direction of the disc 520 and an opposite direction thereto depending upon an energized direction, and a transmission mechanism 555 for transmitting outputs from the electric actuator 540 and the mechanical spring 550 to the wheel braking elements 530. Then, when applying the brake, the wheel braking elements 530 are pressed against the disc 520 by cooperation of the mechanical spring 550 with the electric actuator 540, whereby the small electric actuator 540 can be used to thereby reduce the consumed electric power.

PRIOR ART LITERATURE

Patent Literature

[Patent Literature 1] JP-A-2010-25313

SUMMARY OF INVENTION

Technical Problems

However, in trying to use the electric actuator 540 as the electric power source, when attempting to solve problems of excessive consumption of electric power by the electric motor and overheat of the electric motor which is heated to obtain a predetermined response and of ensuring against the failure of the electric actuator 540 as a result of the energization thereof being cut off, the electric brake apparatus 500 has to be enlarged in size, resulting in a problem that it becomes difficult for the electric brake apparatus 500 to be installed in a predetermined space.

Namely, when a braking force is generated in cooperation between the mechanical spring 550 and the electric actuator 540, the electric actuator 540 needs to generate a force corresponding to a sum of a spring force at the time of clamping (braking) and a force to which a spring constant corresponding to a pad clearance is added to release the braking force. Additionally, when the brake is kept released, the electric actuator 540 has to hold the force.

The invention has been made in view of the situations described above, and an object thereof is to provide a good wedge cam brake which can not only reduce the consumption of electric power by an electric motor but also ensure against a failure of power supply.

Solution to Problems

The above object of the invention can be attained by the following configurations.

(1) A wedge cam brake, in which proximal end portions of brake arms are expanded to oscillate by a cam action of a wedge cam which moves along a direction of a rotational axis of a ball screw which screws into a ball nut for pushing to bias the wedge cam to a braking position as a result of the ball screw being driven to rotate by an electric motor, causing a pair of pad assemblies provided at open end portions of the brake arms to be pressed against both sides of a brake rotor so as to hold the brake rotor therebetween to thereby execute a braking operation, the wedge cam brake comprising:

an elastic member for pushing to bias the wedge cam to the braking position to expand the proximal end portions of the brake arms; and a spring holding mechanism holding the elastic member in a biasing force accumulating state so as to push to bias the wedge cam from a non-braking position to the braking position.

According to the wedge cam brake configured as described under (1) above, in applying the brake, since the elastic member pushes to bias the wedge cam to the braking position as a result of the spring holding mechanism being released and the ball screw is driven to rotate in a brake applying direction by the electric motor, causing the ball nut to push to bias the wedge cam to the braking position, the wedge cam can move to the braking position without any delay, thereby making it possible to obtain a high brake response. Thus, a high response is not required on the electric motor, thereby making it possible to reduce the size of the electric motor and the consumption of electric power by the electric motor.

Further, since a parking braking force (a parking state) can be obtained by a biasing force of the elastic member, the driving of the motor can be kept in a halt state. In addition, in the event that a power supply is cut off, since the elastic member can push to bias the wedge cam to the braking position to brake and stop the vehicle, the wedge cam brake configured according to (1) above can ensure against a failure in terms of power supply, whereby an improvement in safety can be realized.

(2) The wedge cam brake according to (1) above, wherein the spring holding mechanism includes:

a piston member which is allowed to move freely along the direction of the rotational axis of the ball screw to transmit a biasing force of the elastic member to the ball nut which is held so as not to rotate relative thereto, wherein the elastic member is interposed between a stationary portion on a brake main body side and the piston member;

an armature, which is disposed at a rear end side of the piston member, and which is attracted to a stator of an electromagnetic clutch which is fixed to the stationary portion on the brake main body side; and a holding lever, which is attached to a distal end portion of a guide rod which is fixed to the armature at a proximal end portion thereof so as to oscillate, and which is brought into engagement with an engaging portion on the brake main body side at an oscillating end thereof for abutment with a distal end side of the piston member to restrict the movement thereof.

According to the wedge cam brake configured as described under (2) above, in releasing the brake, the ball screw is driven to rotate in a brake releasing direction by the electric motor, whereby the ball nut is moved to its initial position against the biasing force of the elastic member by the ball nut. Then, the holding lever is brought into engagement with the engaging portion, and the armature is brought into abutment with the stator of the electromagnetic clutch via the guide rod. Due to this, a required attraction force of an electromagnet in the electromagnetic clutch can be obtained, and the consumption of electric power can be suppressed. Additionally, in the event that a power supply is cut off, the attraction of the armature by the electromagnetic clutch is released, and the elastic member pushes to bias the wedge cam to the braking position, thereby making it possible to obtain a parking braking force (a parking state).

(3) The wedge cam brake according to (1) above, wherein the spring holding mechanism includes:

a case-shaped piston which is configured to move freely along the direction of the rotational axis of the ball screw to transmit a biasing force of the elastic member to the ball nut accommodated therein, wherein the elastic member is interposed between a stationary portion on a brake main body side and the case-shaped piston;

a guide groove portion, which is provided on the stationary portion on a brake main body side, and which extends along the direction of the rotational axis of the ball screw;

a cam groove having a holding groove portion which extends from one end portion of the guide groove portion in a rotational direction of the ball screw; and a follower member, which is provided integrally with the ball nut, which has a roller contact element which moves so as to follow the cam groove at a distal end portion thereof, and which is provided so as to project radially outwards of the ball nut, wherein the ball nut in which the roller contact element is guided in the holding groove portion holds the wedge cam in the non-braking position against the spring biasing forces of the elastic member.

According to the wedge cam brake configured as described under (3) above, a rotational force of the ball nut is borne by the roller contact element, causing the roller contact element to slide in the cam groove, whereby a frictional resistance that would be generated when the ball nut moves in the axial direction is reduced, allowing the ball nut to move smoothly.

In releasing the brake, the ball screw is driven to rotate in the brake releasing direction by the electric motor, whereby the elastic member is returned to its initial position, and the roller contact element enters the holding groove portion of the cam groove, allowing the holding groove portion to bear a reaction force of the elastic member which is inputted into the ball nut via the roller contact element. Then, since the reaction force of the elastic member is decomposed into a force with which the ball screw is rotated and a force which is borne by the holding groove portion, a holding force (for example, a minute rotational force exerted in a counter-braking direction by the electric motor or an electromagnetic force of the electromagnetic clutch provided between the electric motor and the ball screw) for preventing the rotation of the ball screw can be reduced to a low level.

(4) The wedge cam brake according to (3) above, wherein the holding groove portion has a sloping surface which allows the roller contact element to roll towards the guide groove portion by the biasing force of the elastic member.

According to the wedge cam brake configured as described under (4) above, when the holding force for preventing the rotation of the ball screw is released as a result of the power supply is cut off, since the roller contact element rolls on the sloping surface of the holding groove portion to move into the guide groove portion so as to move freely along the direction of the rotational axis of the ball screw, the wedge cam is pushed to be biased to the braking position by means of the reaction force of the elastic member, thereby making it possible to obtain a parking braking force (a parking state).

(5) The wedge cam brake according to (1) above, wherein the spring holding mechanism includes:

a piston member which is configured to move freely along the direction of a rotational axis of the ball screw to transmit a biasing force of the elastic member to the ball nut which is held so as not rotate relative to the ball screw, wherein the elastic member is interposed between a stationary portion on a brake main body side and the piston member;

an armature, which is brought into engagement with the piston member so as not to move towards the elastic member relative thereto, and which is attracted to a stator of an electromagnetic clutch which is fixed to the stationary portion on the brake main body side;

an axial force sensor, which is provided on a link rod for expanding the proximal end portion of the brake arm, for detecting an axial force exerted on the link rod; and a controller for controlling the rotation of the electric motor based on a detection signal of the axial force sensor.

According to the wedge cam brake configured as described under (5) above, in applying the brake, firstly, the ball screw is driven to rotate in a brake applying direction by the electric motor, and the ball nut pushes to bias the wedge cam to the braking position. As this occurs, since a load acting along the direction of the rotational axis of the ball screw is not exerted on the ball nut, the ball screw can rotate smoothly, whereby an initial response of the electric motor is improved. Namely, when a load attributed to the biasing force of the elastic member is exerted on the ball nut, a frictional resistance at a thread engagement portion between the ball nut and the screw is increased to thereby increase the load of the electric motor. However, since the armature which is brought into engagement with the piston member so as not to move towards the elastic member is attracted to the stator of the electromagnetic clutch, the biasing force of the elastic member is never exerted on the ball nut.

Next, the attraction of the armature by the electromagnetic clutch is released after a predetermined length of time elapses, and the biasing force of the elastic member is transmitted to the ball nut via the piston member, whereby the ball nut on which a screw feeding force by the ball screw and the biasing force of the elastic member are exerted moves the wedge cam to the braking position. As this occurs, an axial force exerted on the link rod is detected by the axial force sensor which is provided on the link rod which expands the proximal end portion of the brake arm 3 by the cam action of the wedge cam, and the controller controls the rotation of the electric motor based on a detection signal from the axial force sensor, thereby making it possible to control the braking force as required.

In addition, since the armature can move relative to the piston member to the opposite side to the side where the elastic member is provided, the armature is never caused to move to the initial position together with the piston member by the ball nut. Namely, the forces exerted from the wedge cam and the ball nut are transmitted to the elastic member and are hence not exerted on the electromagnetic clutch, and therefore, an excessive load is never exerted on the electromagnetic clutch.

(6) The wedge cam brake according to (5) above, wherein a damper member is provided between a pushing portion of the piston member which pushes to bias the ball nut and the ball nut.

According to the wedge cam brake configured as described under (6) above, in applying the brake, the ball screw is driven to rotate in the brake applying direction by the electric motor, whereby the ball nut moves temporarily from the ball nut. Then, when the attraction of the armature by the electromagnetic clutch is releases after a predetermined length of time elapses, the pushing portion of the piston member which is biased by means of the biasing force of the elastic member is brought forcibly into abutment with the ball nut. However, the damper member made of an elastic member is provided between the pushing portion and the ball nut. Thus, an impact generated when the piston member is brought into abutment with the ball nut is dampened, whereby the generation of abnormal noise is suppressed, and the durability is never damaged.

(7) The wedge cam brake according to (5) or (6) above, wherein the armature is elastically biased towards the stator by a set spring whose spring force is weaker than the biasing force of the elastic member at all times.

According to the wedge cam brake configured under (7) above, in releasing the brake, the ball screw is driven to rotate in the brake releasing direction by the electric motor, whereby the piston member is caused to move to its initial position against the biasing force of the elastic member by the ball nut. As this occurs, the armature which can move relative to the piston member towards the opposite side to the side where the elastic member is provided is never caused to move to its initial position together with the piston member by the ball nut. However, the armature is brought into abutment with the stator by means of the spring force of the set spring. Then, in case the electromagnetic clutch is energized to attract the armature to the stator, a maximum attracting force can be obtained, whereby the consumption of electric power can be saved.

(8) The wedge cam brake according to (1) above, wherein the spring holding mechanism includes:

a case-shaped piston, which is configured to move freely along the direction of a rotational axis of the ball screw, which accommodates the ball nut so as to move relative to the ball screw along the direction of the rotational axis of the ball screw within a predetermined range and so as not to rotate relative thereto and which is configured to transmit a biasing force of the elastic member to the wedge cam, wherein the elastic member is interposed between the stationary portion on the brake main body side and the case-shaped piston; and an armature, which is brought into engagement with the case-shaped piston so as not to move towards the elastic member relative to the case-shaped piston, and which is attracted to a stator of an electromagnetic clutch which is fixed to the stationary portion of the brake main body side.

According to the wedge cam brake configured as described under (8) above, in applying the brake, the wedge cam can be pushed to be biased to the braking position by means of the biasing force of the elastic member which is transmitted via the case-shaped piston and a screw feeding force by the ball screw which is transmitted via the ball nut independently.

Then, the biasing force of the elastic member is not exerted on the ball nut, and the frictional resistance at the screwing portion between the ball nut and the ball screw is never increased. Consequently, the ball screw is allowed to rotate smoothly, and hence, the operating force of the electric motor can be reduced, thereby making it possible to save the consumption of electric power.

In addition, since the armature can move relative to the case-shaped piston to the opposite side to the side where the elastic member is provided, the armature is never caused to move to the initial position together with the case-shaped piston by the ball nut. Namely, the forces exerted from the wedge cam and the ball nut are transmitted to the elastic member and are hence not exerted on the electromagnetic clutch, and therefore, an excessive load is never exerted on the electromagnetic clutch.

(9) The wedge cam brake according to (8) above, wherein the armature is elastically supported on the case-shaped piston so as to be attracted to the stator while being elastically biased thereto.

According to the wedge cam brake configured as described under (9) above, in releasing the brake, the armature is brought into abutment with the stator while being elastically biased thereto before the ball screw is driven to rotate in the brake releasing direction by the electric motor, whereby the case-shaped piston is caused to move to its initial position against the biasing force of the elastic member by the ball nut. Then, since the electromagnetic clutch can operate with substantially no gap defined between the stator and the armature, it is possible to obtain a sufficient attracting force easily.

(10) The wedge cam brake according to (8) above, wherein the armature is attached to the case-shaped piston via a holding force reducing mechanism, and the holding force reducing mechanism causes a part of a locking force, with which the case-shaped piston attempting to move in an armature releasing direction is locked, to be borne by an engaging portion on the brake main body side.

According to the wedge cam brake configured as described under (10), the armature is attached to the case-shaped piston via the holding force reducing mechanism, and part of the holding force with which the elastic member is held in a biasing force accumulating state is borne by the engaging portion on the brake main body side. Therefore, the attraction force of the electromagnetic clutch is reduced. Thus, it is possible to reduce the size of the electromagnetic clutch.

Advantageous Effect of Invention

According to the invention, it is possible to provide the good wedge cam brake which can reduce the consumption of electric power by the electric motor and which can ensure against a failure in terms of power supply.

EMBODIMENTS OF INVENTION

Hereinafter, preferred modes for carrying out a wedge cam brake of the invention will be described based on the drawings.

Hereinafter, the construction of a wedge cam brake according to a first embodiment of the invention will be described by the use of FIGS. 1 to 6.

Figure 1:
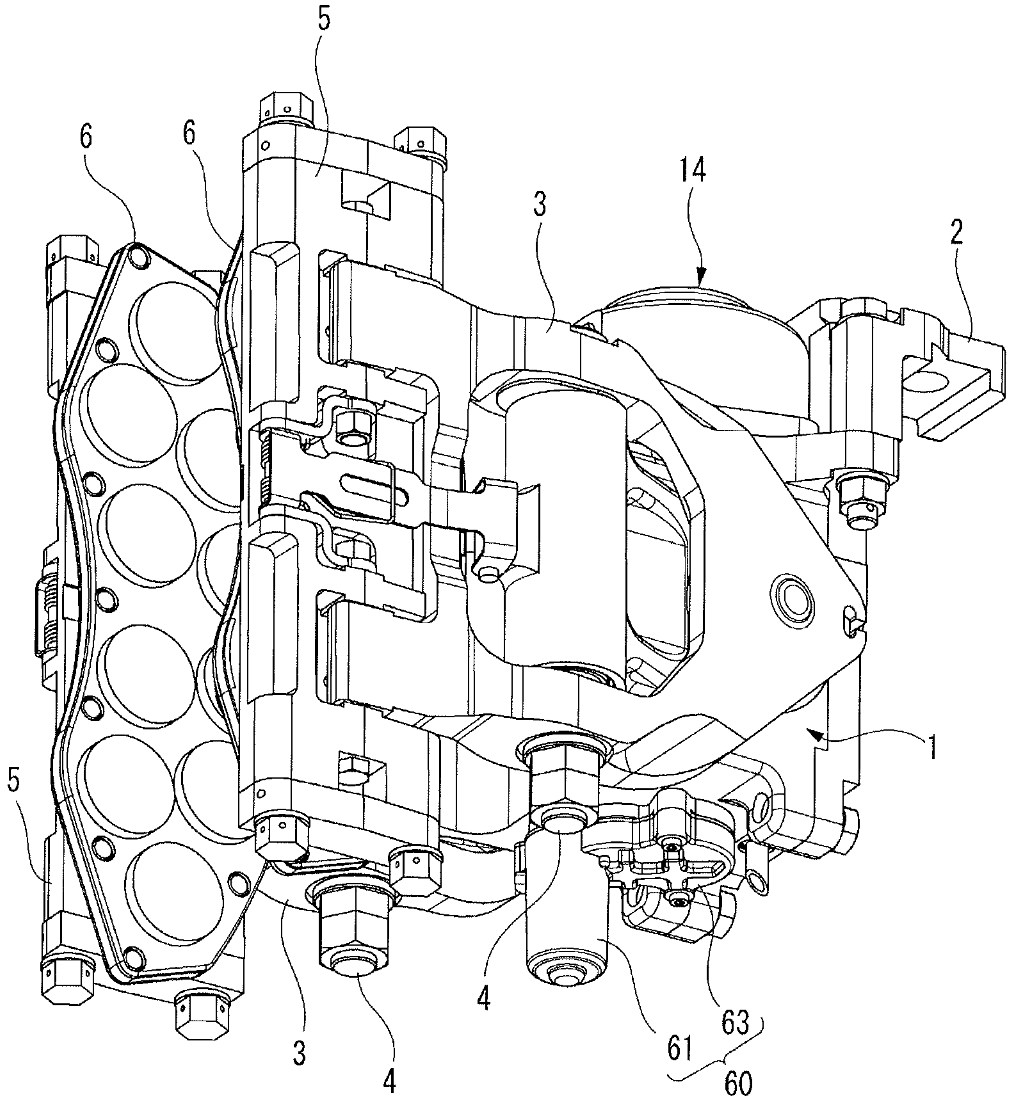
FIG. 1 is a perspective view showing an overall construction of a wedge cam brake according to a first embodiment of the invention.
Figure 2:
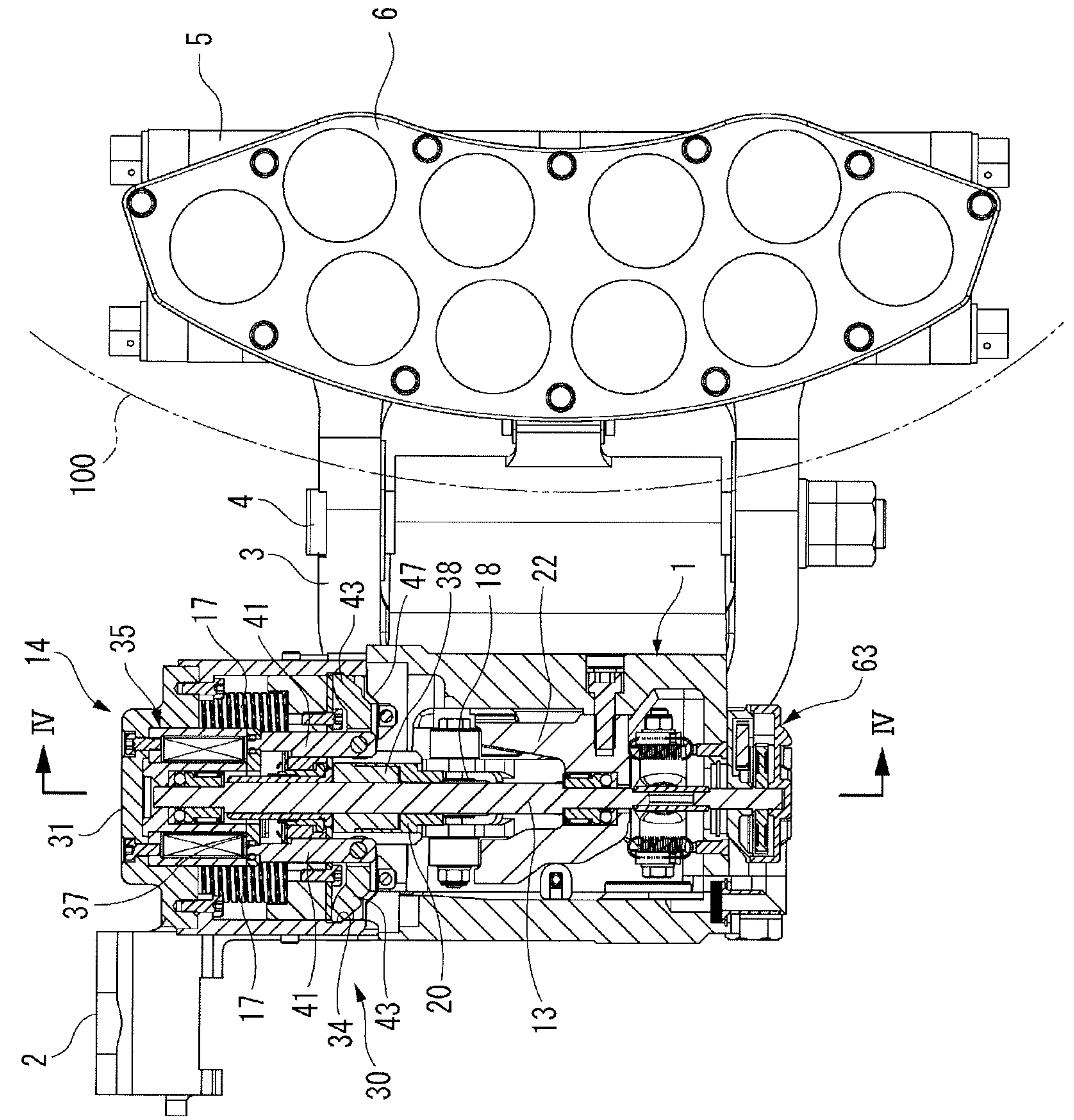
FIG. 2 is a vertical sectional view of the wedge cam brake shown in FIG. 1.

FIGS. 1 and 2 show an overall construction of a railway vehicle disc brake which includes a wedge cam brake. A substantially cylindrical body 1 is fixed to a body side via a support 2 and middle portions of a pair of brake arms 3, 3 are supported pivotally by brake arm shafts 4, 4 on an opposite side of the body 1 to the side where the support 2 is provided.

An actuator 14 for expanding the brake arms 3, 3 is connected to oscillating ends of the brake arms 3, 3 (proximal end portions at a side of the support 2), and pad assemblies 6, 6 are mounted on the other oscillating ends of the brake arms 3, 3 (open end portions at an opposite side to the support 2) via pad holders 5.

Figure 3:
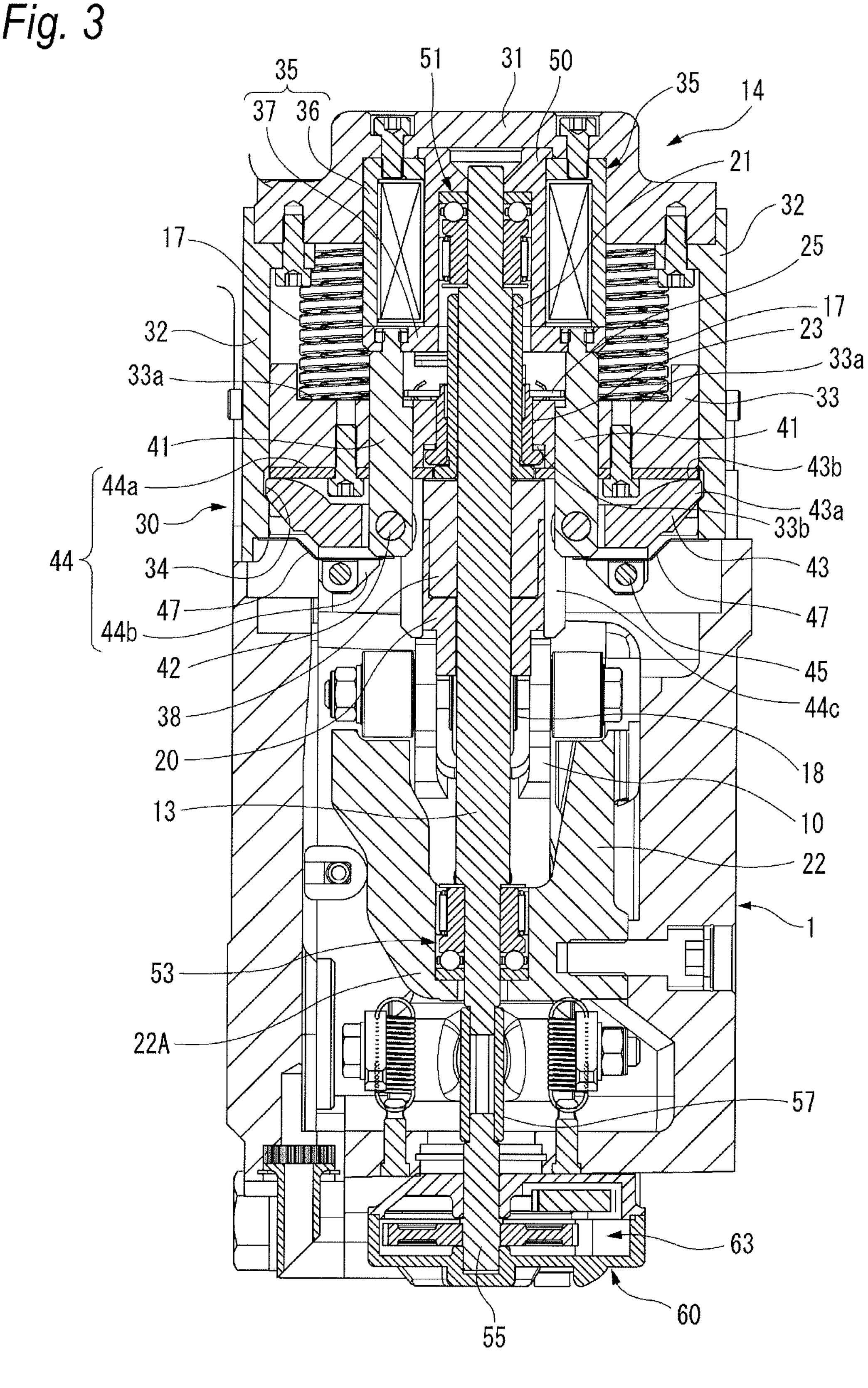
FIG. 3 is an enlarged sectional view of an actuator of the wedge cam brake shown in FIG. 2.
Figure 4:
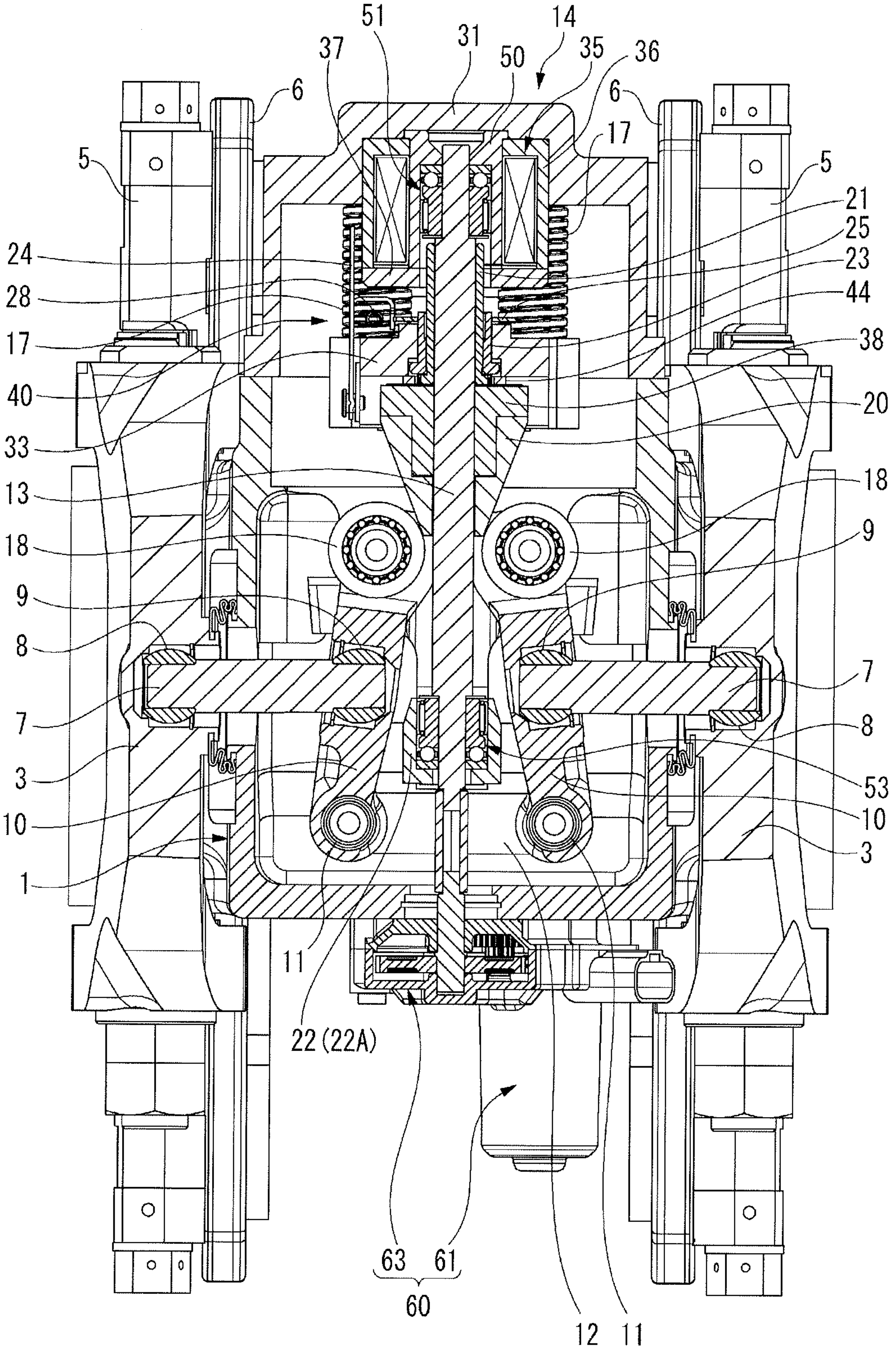
FIG. 4 is a sectional view taken along a line IV-IV shown in FIG. 2 and seen in a direction indicated by arrows attached thereto.

As shown in FIGS. 3 and 4, in an actuator 14 according to the first embodiment, when a brake is applied, compression coil springs 17 push to bias a ball nut 38 on which a wedge cam 20 is provided integrally to a braking position, while the wedge cam 20 is moved to the braking position along the direction of a rotational axis of a ball screw 13 which is screwed into the ball nut 38 as a result of the ball screw 13 being driven to rotate by an electric motor 61, whereby the proximal end portions of the brake arms 3, 3 are expanded to oscillate by means of a cam action of the wedge cam 20, and the pair of pad assemblies 6, 6 provided at the open end portions of the brake arms 3, 3 are pressed against both sides of a brake rotor 100 so as to hold it therebetween to execute a braking operation.

Outer ends of link rods 7, 7, which constitute output shafts, are supported at the respective proximal end portions of the brake arms 3, 3 by spherical bushes 8, and inner ends of the link rods 7, 7 are connected and supported to roller arms 10, 10 by spherical bushes 9. Then, lower ends of the roller arms 10, 10 are supported pivotally at both end portions of a strut 12 via bearings 11, 11 to form a link type servo unit. In the actuator 14, when a motor gear unit 60 is driven, the link rods 7, 7 are caused to reciprocate via the link type servo unit.

The ball screw 13 is mounted in the body 1 so as not to move along the rotational axis thereof relative to the body 1 but so as to rotate relative to the body 1 by a bearing 51 which is disposed at a proximal end portion side (an upper end portion side in the figures) and a bearing 53 which is disposed at a distal end side (a lower end portion side in the figures) of the ball screw 13.

The bearing 51 is a radial thrust bearing which is mounted in a bearing case 50 which is fixed to a cap 31 placed to cover an upper end opening portion of the body 1 which constitutes a stationary portion on a brake main body side and supports rotatably the proximal end portion side of the ball screw 13 while restricting an upward movement of the ball screw 13. Additionally, the bearing 53 constitutes a radial thrust bearing which is mounted in a sleeve portion 22A of a fixed sleeve member 22 within the body 1 and supports rotatably the distal end portion side of the ball screw 13 while restricting a downward movement of the ball screw 13.

Further, a distal end portion of the ball screw 13 is coupled to an output shaft 55 of the motor gear unit 60 via a joint 57, whereby a rotational driving force of the electric motor 61 is transmitted to the ball screw 13 via a speed reduction mechanism 63. Here, the motor gear unit 60 is disposed so that a drive shaft 62 (refer to FIG. 13) of the electric motor 61 becomes parallel to the rotational axis of the ball screw 13.

As shown in FIGS. 3 and 4, the ball nut 38 on which the wedge cam 20 is provided integrally is disposed concentrically with the ball screw 13 and is mounted so as to move in an axial direction relative to a piston member 33, which will be described later, but so as not to rotate relative to the piston member 33.

As the ball nut 38 moves axially on the ball screw 13 towards a distal end side (a lower side) thereof, cam rollers 18, 18 which are mounted at upper ends of the roller arms 10, 10 ride on a sloping surface of the wedge cam 20 which is provided at a distal end portion of the ball nut 38.

The roller arms 10, 10 are caused to oscillate in an expanding direction as a result of the cam rollers 18, 18 riding on the sloping surface of the wedge cam 20 and move the link rods 7, 7 which are coupled to be supported substantially at middle portions of the roller arms 10, 10 by the spherical bushes 9, 9 axially outwards (leftwards and rightwards in FIG. 4) in an amplified fashion based on the principle of leverage. By doing so, the respective proximal end portions of the brake arms 3, 3 are moved in an expanding direction about brake arm shafts 4, 4 as oscillating centers, causing the pad assemblies 6, 6 provided at the open end portions of the brake arms 3, 3 to be pressed against the brake rotor 100 (refer to FIG. 2) so as to hold it therebetween to execute a braking operation.

Further, the actuator 14 includes a plurality of (four in the first embodiment) compression coil springs 17 which are elastic members for pushing to bias the ball nut 38 towards the braking position where the wedge cam 20 expands the proximal end portions of the brake arms 3, 3 and a spring holding mechanism 30 for holding the compression coil springs 17 in a biasing force accumulating state so as to push to bias the wedge cam 20 from a non-braking position to the braking position.

The spring holding mechanism 30 includes a piston member 33 which is allowed to move along the direction of the rotational axis of the ball screw 13 to transmit spring biasing forces of the compression coil springs 17 which are interposed between the cap 31 which constitutes a stationary portion on a brake main body side and itself to the ball nut 38 which is held so as not to rotate relative thereto, an armature 37 which is provided at a rear end side (an upper end side in FIG. 4) of the piston member 33 so as to be attracted to a stator 36 of the electromagnetic clutch 35 which is fixed to the cap 31, and holding levers 43 which are attached to distal end portions of a pair of guide rods 41 which are fixed to the armature 37 at proximal end portions (upper end portions in FIG. 3) thereof so as to oscillate freely thereat to thereby be brought into engagement with engaging portions 34 on the brake main body side at oscillating ends 43*a* thereof so that the holding levers 43 are brought into abutment with a distal end side of the piston member 33 to restrict the movement of the piston member 33.

The compression coil springs 17 are accommodated in spring receiving portions 31*a* which are provided so as to be depressed on an inner bottom surface of the cap 31 at upper end portions thereof and in spring receiving portions 33*a* which are provided so as to be depressed on a rear end surface of the piston member 33 at lower end portions thereof, whereby the compression coil springs 17 are interposed between the cap 31 and the piston member 33. The spring biasing forces of the compression coil springs 17 are set so as to push to bias the ball nut 38 and the wedge cam 20 from the non-braking position to the braking position to such an extent that the pad assemblies 6, 6 can obtain a parking braking force (a braking force which is about a half of a normal braking force).

The piston member 33 is fitted in the cap 31, whereby the piston member 33 is allowed to move along the direction of the rotational axis of the ball screw 13 but is not allowed to rotate relative to the ball screw 13. Namely, guide rails 32 having a flat plate-like shape are attached individually to a pair of cut-out portions formed in opposite positions on a circumferential wall of the cap 31 which is formed substantially into a bottomed cylindrical shape, and the piston member 33 is fitted in the cap 31 so that two flat surfaces which are formed on an outer circumferential surface of the piston member 33 are positioned opposite to the pair of guide rails 32, whereby the piston member 33 is allowed to move along an axial direction relative to the cap 31 but is not allowed to rotate relative to the cap 31. The engaging portions 34 are provided on inner surfaces of the guide rails 32 as grooves which extend in a direction which intersects the axial direction of the cap 31.

As shown in FIG. 3, the pair of guide rods 41 are fixed to the armature 37 at proximal end portions thereof which penetrate the piston member 33 in an axial direction on opposite sides across the ball screw 13 and are provided so as to move freely in the axial direction relative to the piston member 33. The holding levers 43 are attached individually to distal end portions of the guide rods 41 so as to oscillate freely by support pins 42.

Dimensions of portions of the holding lever 43 are determined so as to restrict the piston member 33 from moving downwards in the figure by an abutment portion 43*b* being brought into abutment with the distal end side of the piston member 33 (in this embodiment, a flat plate portion 44*a* of an anchor member 44 which will be described later) as a result of an oscillating end 43*a* being brought into engagement with the engaging portion 34 of the cap 31 in such a state that the guide rod 41 is held in an initial position (a non-braking position) shown in FIG. 3 by the armature 37. Then, when the guide rods 41 are released from their initial positions to which they are held by disengaging the electromagnetic clutch 35, the holding levers 43 oscillate to allow the oscillating ends 43*a* thereof to be disengaged from the corresponding engaging portions 34, whereby the restriction on the movement of the piston member 33 is released.

An anchor member 44 is attached to a distal end face of the piston member 33 so as to correspond to the pair of holding levers 43. The anchor member 44 has a rectangular flat plate portion 44*a* which is secured closely to the distal end face of the piston member 33 and with which the abutment portions 43*b* of the holding levers 43 are brought into abutment, two pairs of support walls 44*b* which are provided so as to extend perpendicularly at side edges of the flat plate portion 44*a* to support a pair of support pins 45, and two pairs of guide walls 44*c* which are provided so as to extend perpendicularly at the side edges of the flat plate portion 44*a* to support the ball nut 38 so that the ball nut 38 is allowed to move axially relative to the piston member 33 but is not allowed to rotate relative to the piston member 33.

Plate spring-like switching springs 47 which are supported on the corresponding support pins 45 elastically bias the corresponding holding levers 43 in a direction in which the oscillating ends 43*a* are brought into engagement with the engaging portions 34.

When the brake is applied, the ball nut 38 which is disposed below the piston member 33 is pushed downwards via the piston member 33 by means of the spring biasing forces of the compression coil springs 17, whereby the ball nut 38 moves downwards to a parking brake applying position below while rotating the ball screw 13, and moves further downwards to a normal braking positions further below as a result of the ball screw 13 being driven to rotate in a brake applying direction by the electric motor 61.

Then, in releasing the brake, when the ball screw 13 is driven to rotate in a brake releasing direction by the electric motor 61, the ball nut 38 moves upwards while pushing up the piston member 33 against the spring biasing forces of the compression coil springs 17.

A gap adjusting mechanism 40 is provided between the piston member 33 and the ball screw 13 which penetrates a center of the piston member 33 for automatically executing a gap adjustment when pads get worn.

Figure 5:
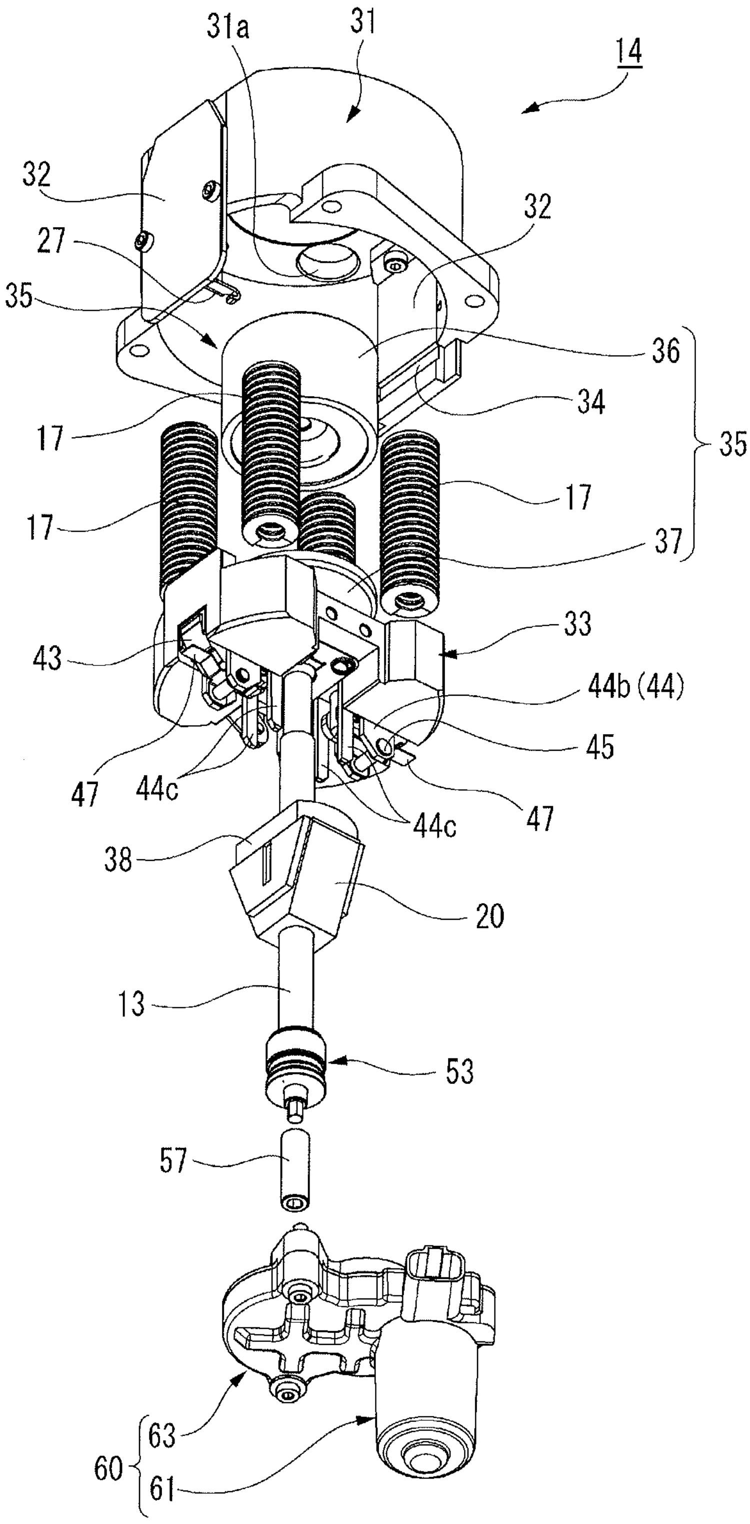
FIG. 5 is an exploded perspective view of the actuator shown in FIG. 2 as seen from below.
Figure 6:
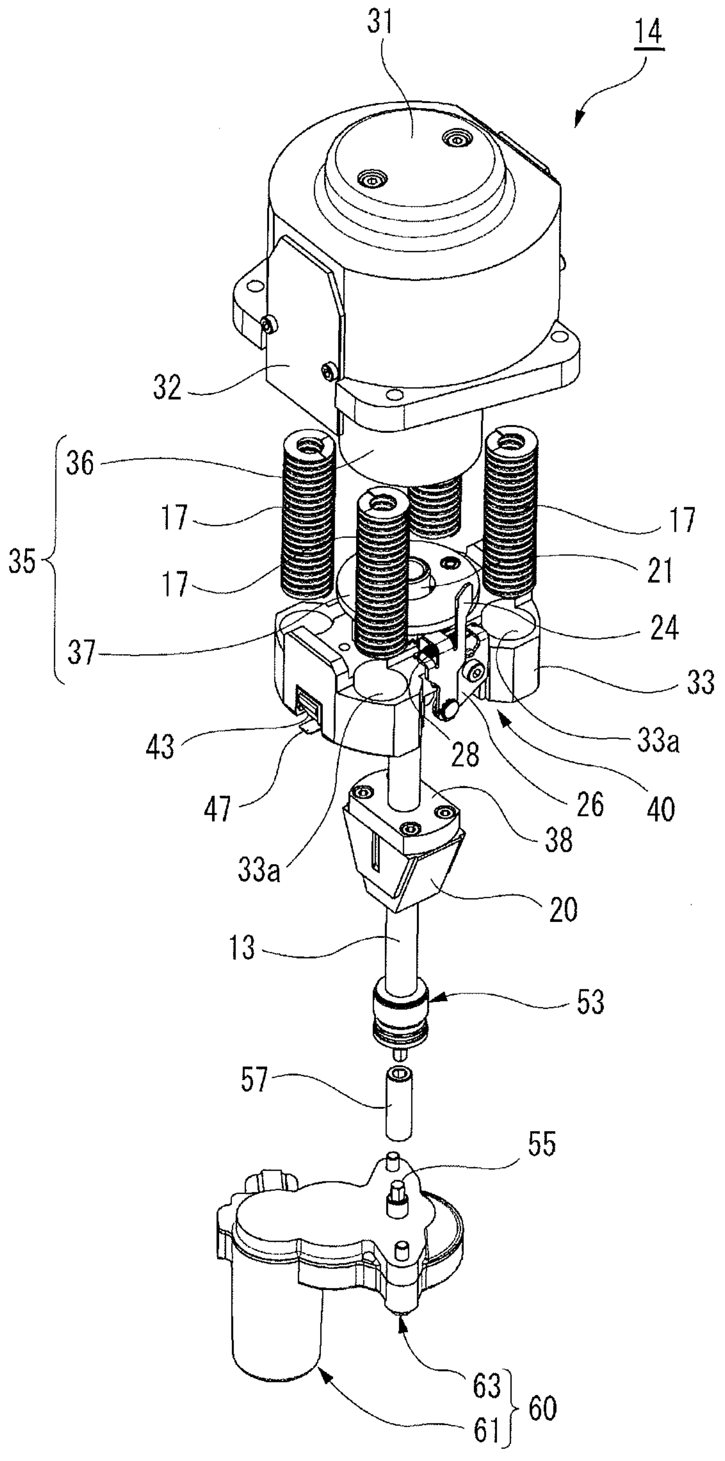
FIG. 6 is an exploded perspective view of the actuator shown in FIG. 2 as seen from above.

As shown in FIGS. 4 to 6, the gap adjusting mechanism 40 includes an adjuster screw 21 which is placed on the ball screw 13 so that the ball screw 13 passes through it while being brought into abutment with a rear end face of the ball nut 38 at a distal end portion thereof (a lower end portion in FIG. 4) so as not to rotate relative thereto, an adjuster nut 23 which screws on male threads formed on an outer circumferential surface of the adjuster screw 21, an adjuster gear 25 fixed to a distal end of the adjuster nut 23 which penetrates the piston member 33 from the distal end side to a rear end side to project from an rear end face of the piston member 33, an adjuster lever 24 which is attached rotatably to an adjuster bracket 26 which is fixed to the piston member 33 so as to be brought into engagement with the adjuster gear 25, and an adjuster guide 27 which is placed on an inner circumferential surface of the cap 31.

A flange portion is provided on an outer circumference of a distal end portion of the adjuster screw 21 so as to project therefrom to thereby be brought into abutment with a rear end face of the ball nut 38 and a distal end portion of the adjuster nut 23. A flange portion is provided on an outer circumference of a distal end portion of the adjuster nut 23 so as to project therefrom to thereby be brought into abutment with a diametrically expanded recess portion 33*b* which is formed on the distal end side of the piston member 33, whereby the adjuster nut 23 is restricted from moving relative to the piston member 33 towards a rear end side thereof.

Then, when the pads get worn, oscillating strokes of the brake arms 3 are increased, and hence, strokes of the piston member 33 and the ball nut 38 deviate from their normal ranges to become excessive, whereby the ball nut 38 and the piston member 33 move axially downwards.

As a result of this, when the piston member 33 moves a predetermined distance away from the cap 31, the adjuster lever 24 is rotated against a spring biasing force of a return spring 28 by the adjuster guide 27, whereby an engaging position between the adjuster lever 24 and the adjuster gear 25 is changed. Then, when the piston member 33 returns to its initial position as a result of the brake being released, the adjuster lever 24 is rotated by means of the spring biasing force of the return spring 28, whereby the adjuster nut 23 is rotated via the adjuster gear 25, allowing an axial position of the adjuster lever 23 relative to the adjuster screw 21 to be adjusted upwards. This adjusts axial positions of the ball nut 38 and the wedge cam 20 relative to the piston member 33 at the initial position, so that gaps between the brake rotor 100 and the pad assemblies 6, 6 are adjusted so as not to be too great.

Namely, the adjuster screw 21 is allowed to advance relatively from the piston member 33 to project therefrom by the gap adjustment ensured to be executed to eliminate the oscillating gaps of the brake arms 3, 3 which are generated by the excessive strokes thereof which are attributed to the wear of the pads, whereby initial positions of the ball nut 38 and the wedge cam 20 after the gap adjustment are located in advanced positions lying further ahead by a distance over which the adjuster screw 21 projects as a result of the gap adjustment than their original positions. Consequently, the roller arms 10, 10 which are brought into cam engagement with the sloping surface of the wedge cam 20 are also in an expanded state. Namely, a state is produced in which the gaps are adjusted to be advanced by an amount corresponding to an amount of wear of the pads in advance.

Next, referring to FIGS. 7(*a*) to 7(*c*), an operation of the actuator 14 according to the first embodiment will be described.

Figure 7:
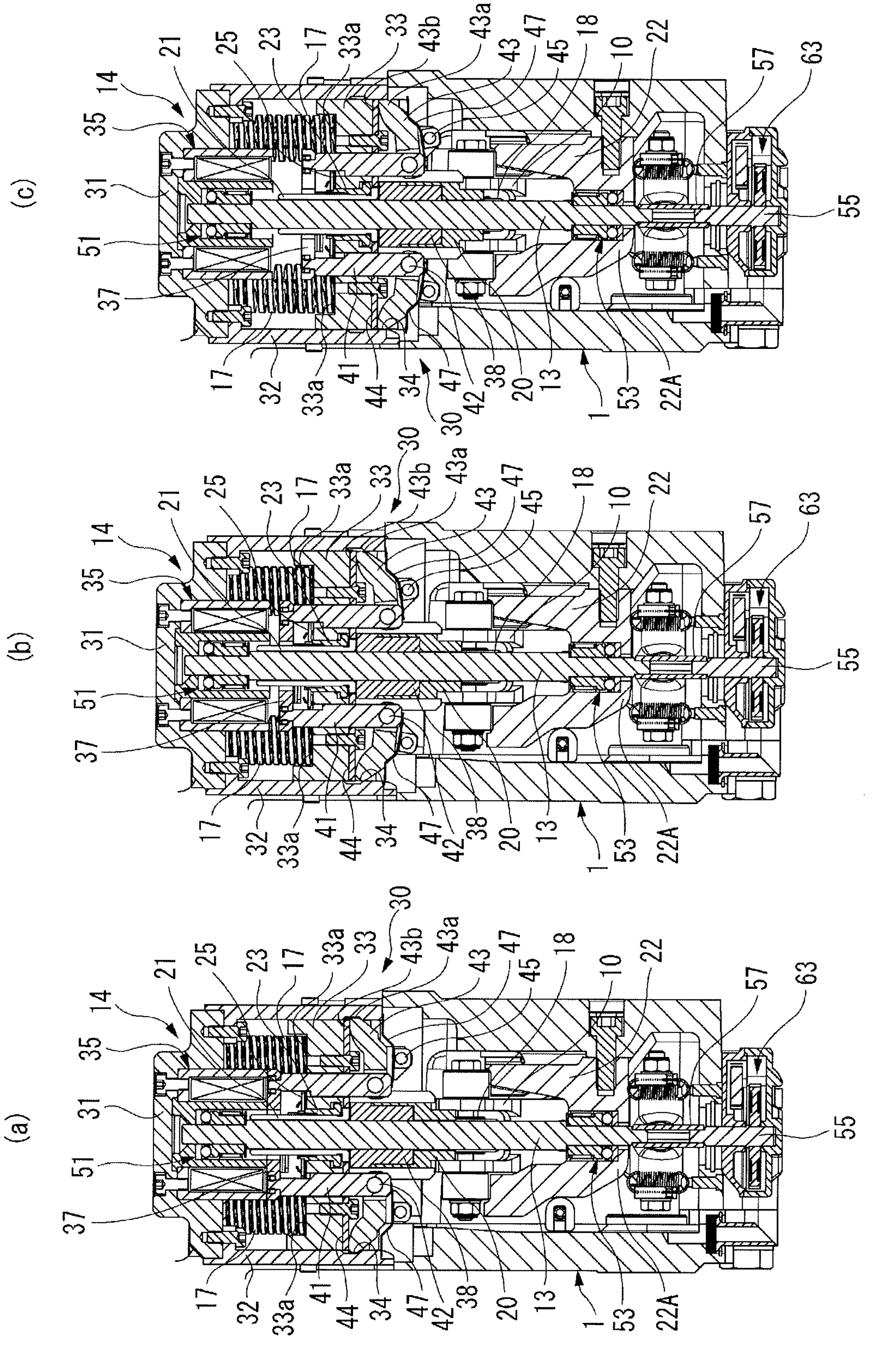
FIGS. 7(*a*) to 7(*c*) are sectional views of a main part of the actuator shown in FIG. 2 for explaining an operation thereof.

As FIG. 3 does, FIG. 7(*a*) shows an initial state in which both the brake and the gap adjusting mechanism 40 are not in operation. In this state, the spring holding mechanism 30 is in operation, and the armature 37 is attracted to the stator 36 of the electromagnetic clutch 35, and the holding levers 43 are restricted from oscillating with the oscillating ends 43*a* thereof brought into engagement with the engaging portions 34 on the guide rails 32. The holding levers 43 which are now restricted from oscillating restrict the piston member 33 from moving downwards in the figure with the abutment portions 43*b* thereof brought into abutment with the distal end side of the piston member 33. Then, the compression coil springs 17 which are interposed between the cap 31 and the piston member 33 are held in a biasing force accumulating state.

Then, in applying the brake, when an energization of the electromagnetic clutch 35 is stopped to release the guide rods 41 from the held state, the holding levers 43 are caused to oscillate by means of the spring biasing forces of the compression coil springs 17 and are disengaged from the engaging portions 34. Then, the compression coil springs 17 push to bias the ball nut 38 downwards in the figure via the piston member 33. The ball nut 38 which is pushed downwards by means of the spring biasing forces of the compression coil springs 17 moves downwards to the parking brake applying position below while rotating the ball screw 13 which is now free to rotate since the electric motor 61 is not energized.

Then, as shown in FIG. 7(*b*), when the wedge cam 20 which is provided integrally on the ball nut 38 moves downwards to the parking brake applying position below, the proximal end portions of the brake arms 3, 3 are expanded to oscillate by the cam action of the wedge cam 20, causing the pair of pad assemblies 6, 6 which are provided at the open end portions of the brake arms 3, 3 to be pressed against both sides of the brake rotor 100 so as to hold it therebetween.

Then, the ball screw 13 is driven to rotate in the brake applying direction by the electric motor 61 substantially at the same time as the energization of the electromagnetic clutch 35 is stopped or slightly thereafter, whereby as shown in FIG. 7(*c*), the wedge cam 20 which is provided integrally on the ball nut 38 moves further downwards to the normal braking position further below, whereupon the pair of pad assemblies 6, 6 are caused to be pressed against both the sides of the brake rotor 100 so as to hold it therebetween with a normal braking force by the cam action of the wedge cam 20.

In releasing the brake, when the ball screw 13 is driven to rotate in a brake releasing direction by the electric motor 61, the wedge cam 20 which is provided integrally on the ball nut 38 moves upwards to the non-braking position above, whereby the pair of pad assemblies 6, 6 are caused to move away from both the sides of the rotor 100 by the cam action of the wedge cam 20.

At the same time as this, the piston member 33 is pushed upwards by the ball nut 38 against the spring biasing forces of the compression coil springs 17, and the compression coil springs 17 are returned to the biasing force accumulating state which corresponds to their initial positions (refer to FIG. 7(*a*)). In addition, when the piston member 33 is returned to its initial position, the oscillating ends 43*a* of the holding levers 43 which are elastically biased in the direction in which the oscillating ends 43*a* are brought into engagement with the engaging portions 34 by the switching springs 47 are brought into engagement with the engaging portions 34, and the armature 37 is brought into abutment with the stator 36 of the electromagnetic clutch 35 via the guide rods 41.

Then, when the electromagnetic clutch 35 is energized so that the armature 37 is attracted to the stator 36, the holding levers 43 are restricted from oscillating with the oscillating ends 43*a* thereof staying in engagement with the engaging portions 34 of the guide rails 32, and the abutment portions 43*b* are brought into abutment with the distal end side of the piston member 33 so as to restrict the piston member 33 from moving downwards in the figure, whereby the compression coil springs 17 which are interposed between the cap 31 and the piston member 33 are held in the biasing force accumulating state.

Consequently, according to the wedge cam brake including the actuator 14 of the first embodiment, in applying the brake, since the compression coil springs 17 push to bias the ball nut 38 to the braking position via the piston member 33, as a result of the spring holding mechanism 30 being released, whereafter the ball screw 13 is driven to rotate by the motor gear unit 60, the wedge cam 20 which is provided integrally on the ball nut 38 can move to the braking position without no delay, thereby making it possible to obtain a high brake response. Thus, a high response is not required on the electric motor 61, thereby making it possible to reduce the size of the electric motor 61 and the consumption of electric power by the electric motor 61.

Further, since the parking braking force (the parking state) is obtained by means of the spring biasing forces of the compression coil springs 17, the electric motor 61 does not have to be driven to stay in a halt state, thereby making it possible to suppress the consumption of electric power while a vehicle is at a halt. In addition, in the event that a power supply is cut off, since the compression coil springs 17 push to bias the wedge cam 20 to the braking position at the same time as the energization of the electromagnetic clutch 35 is stopped to brake and stop the vehicle, the railway vehicle disc brake including the wedge cam brake configured according to the first embodiment can ensure against a failure in terms of power supply, whereby an improvement in safety can be realized.

Further, according to the wedge cam brake including the actuator 14 of the first embodiment, in releasing the brake, when the ball screw 13 is driven to rotate in the brake releasing direction by the electric motor 61, the piston member 33 is caused to move to its initial position against the biasing forces of the compression coil springs 17 by the ball nut 38. Then, the holding levers 43 are brought into engagement with the engaging portions 34, and the armature 37 is brought into abutment with the stator 36 of the electromagnetic clutch 35 via the pair of guide rods 41. Due to this, the required attraction force of an electromagnet in the electromagnetic clutch 35 can be obtained and the consumption of electric power can be suppressed.

Next, the construction of a wedge cam brake according to a second embodiment of the invention will be described by the use of FIGS. 8 to 12. It should be noted that like reference numerals will be given to like constituent members to those of the wedge cam brake according to the first embodiment so as to omit a detailed description thereof.

Figure 8:
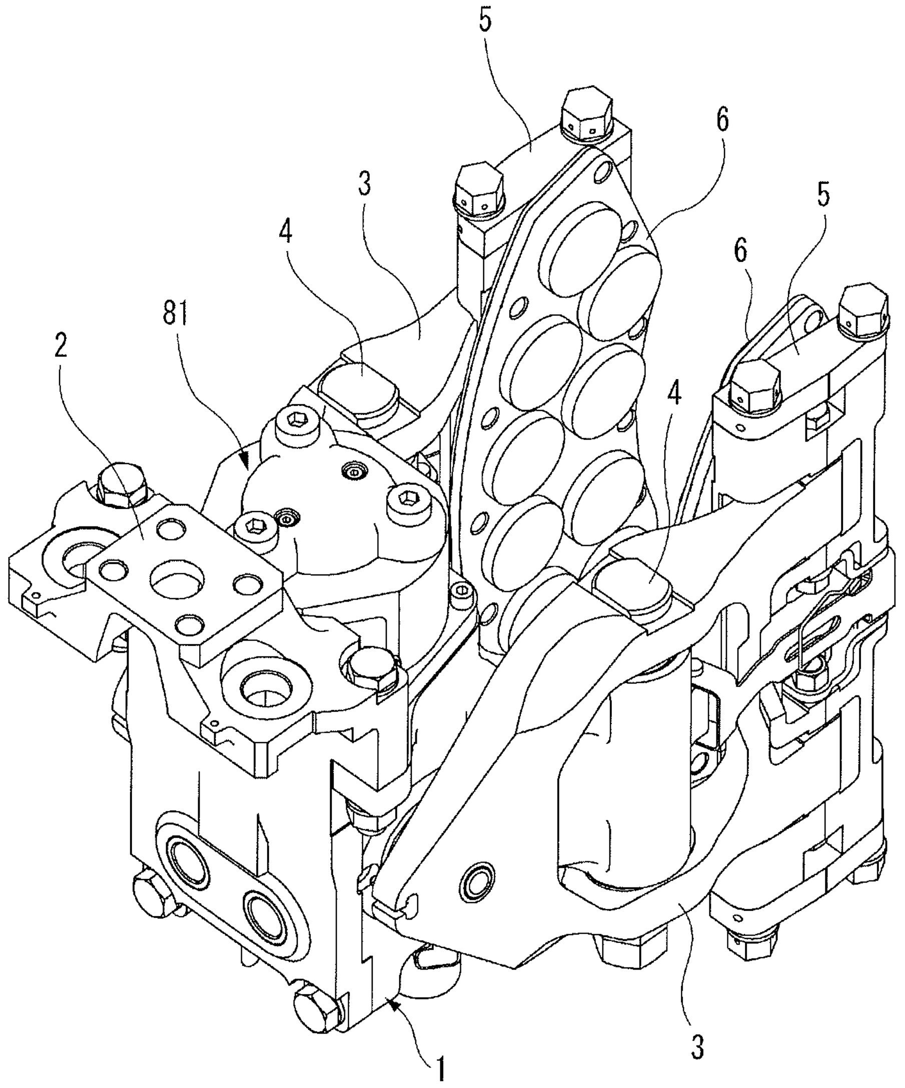
FIG. 8 is a perspective view showing an overall construction of a wedge cam brake according to a second embodiment of the invention.
Figure 9:
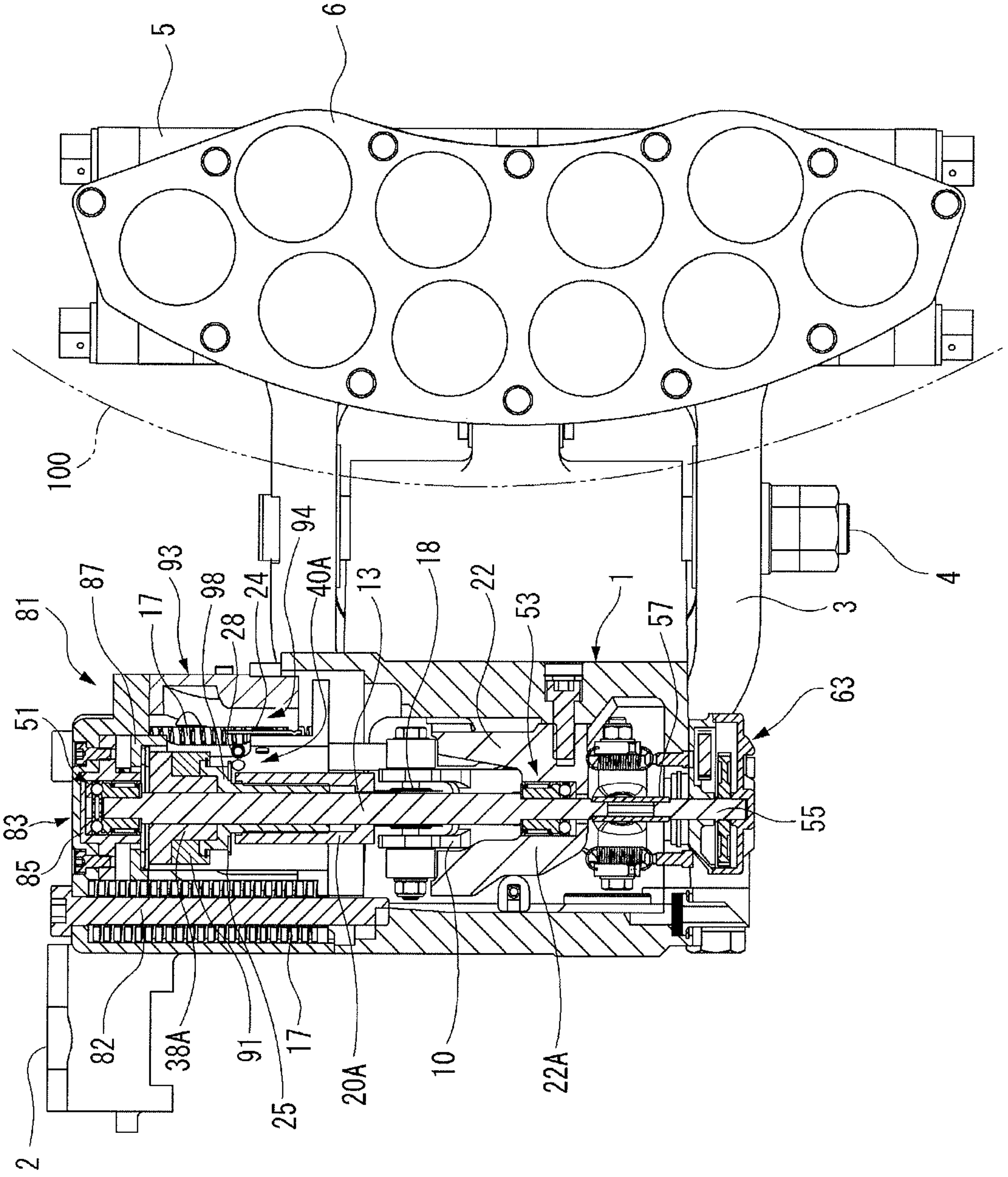
FIG. 9 is a vertical sectional view of the wedge cam brake shown in FIG. 8.

FIGS. 8 and 9 are perspective view and a vertical sectional view which show an overall construction of a railway vehicle disc brake including a wedge cam brake according to a second embodiment of the invention.

An actuator 81 for expanding brake arms 3, 3 is connected to oscillating ends of the brake arms 3, 3, and pad assemblies 6, 6 are mounted on the other oscillating ends of the brake arms 3, 3 via pad holders 5.

Figure 10:
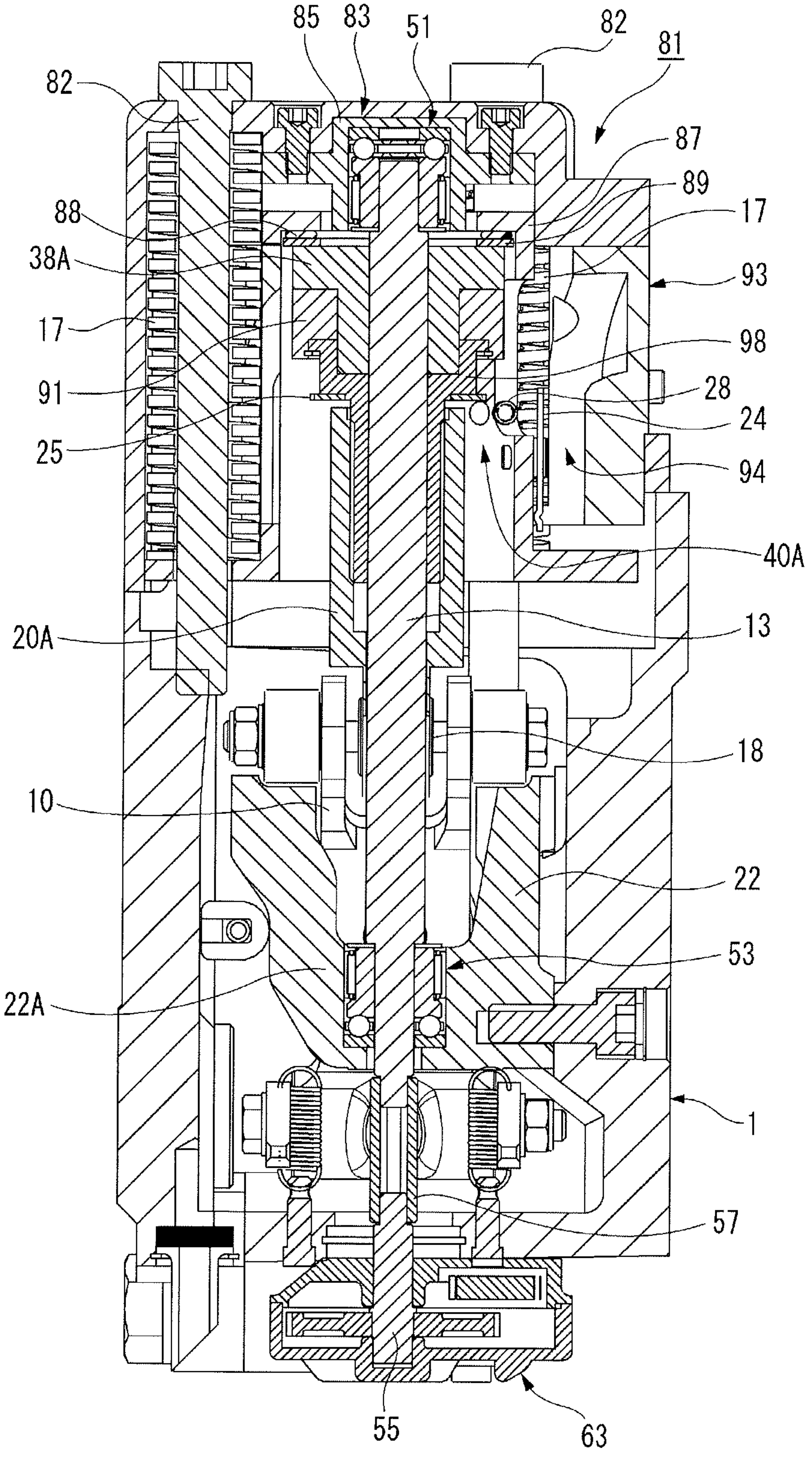
FIG. 10 is an enlarged sectional view of an actuator of the wedge cam brake shown in FIG. 9.

As shown in FIGS. 9 and 10, in an actuator 81 according to the second embodiment, when a brake is applied, compression coil springs 17 push to bias a ball nut 38A on which a wedge cam 20A is provided integrally to a braking position, while the wedge cam 20 is moved to the braking position along the direction of a rotational axis of a ball screw 13 which is screwed into the ball nut 38A as a result of the ball screw 13 being driven to rotate by an electric motor 61, whereby proximal end portions of the brake arms 3, 3 are expanded to oscillate by means of a cam action of the wedge cam 20, and the pair of pad assemblies 6, 6 provided at the open end portions of the brake arms 3, 3 are pressed against both sides of a brake rotor 100 so as to hold it therebetween to execute a braking operation. Namely, as in the actuator 14 according to the first embodiment, in the actuator 81, when a motor gear unit 60 is driven, link rods 7, 7 are caused to reciprocate via a link type servo unit.

The ball screw 13 is mounted in the body 1 so as not to move along the rotational axis thereof relative to the body 1 but so as to rotate relative to the body 1 by a bearing 51 which is disposed at a proximal end portion side (an upper end portion side in the figures) and a bearing 53 which is disposed at a distal end side (a lower end portion side in the figures) of the ball screw 13.

The bearing 51 is mounted in a bearing case 85 which is fixed to an inner bottom surface of a housing 83 which constitutes a stationary portion on a brake main body side, and the bearing 53 is mounted in a sleeve portion 22A of a fixed sleeve member 22 in the body 1.

Figure 11:
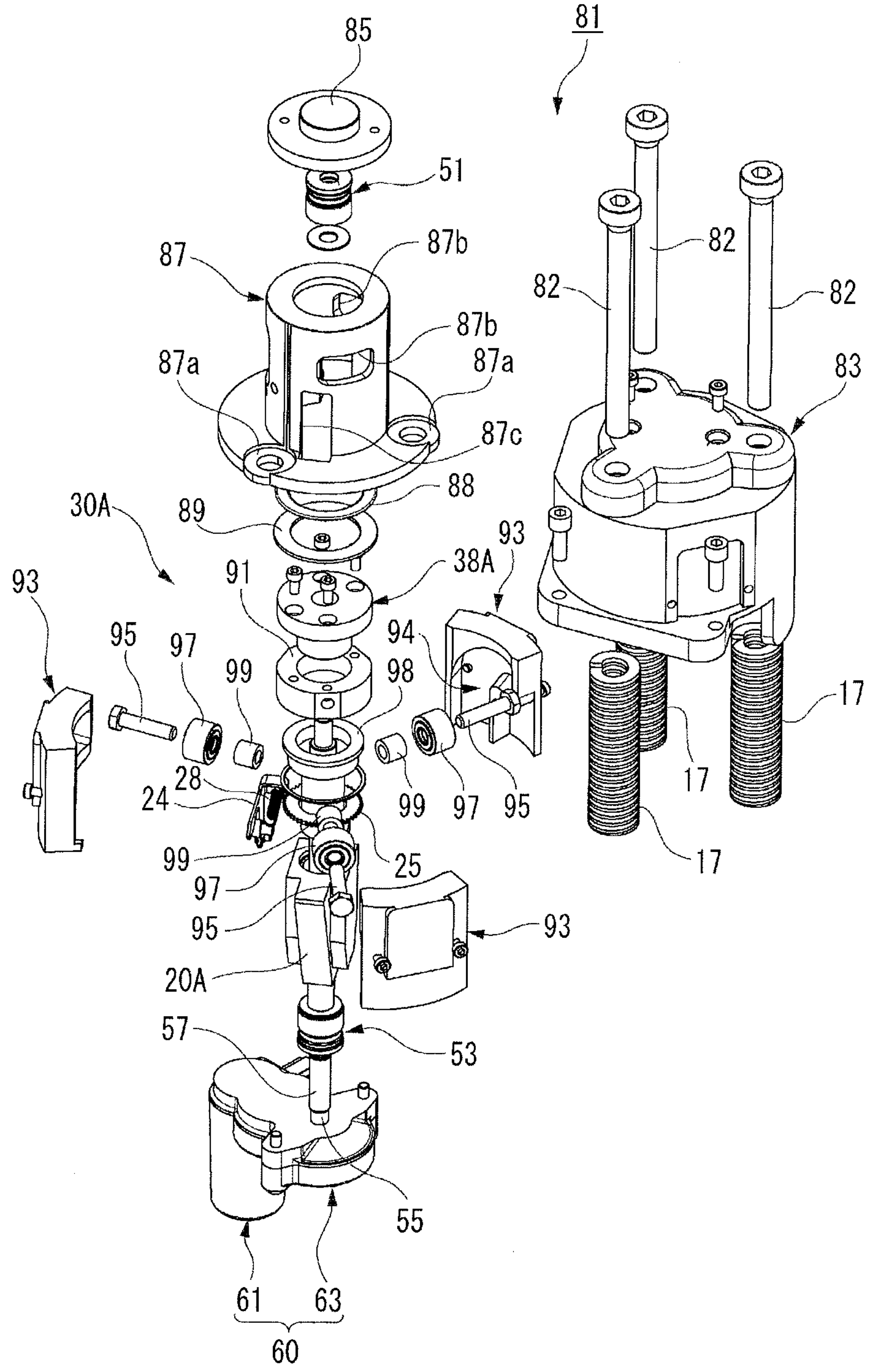
FIG. 11 is an exploded perspective view of the actuator shown in FIG. 9 as seen from above.

As shown in FIGS. 10 and 11, the ball nut 38A on which the wedge cam 20A is provided integrally is disposed concentrically with the ball screw 13 and is accommodated in a case-shaped piston member 87, which will be described later, so as to move in an axial direction relative to the piston member 87 but so as not to rotate relative to the piston member 87.

As the ball nut 38A moves axially on the ball screw 13 towards a distal end side (a lower side) thereof, cam rollers 18, 18 which are mounted at upper ends of roller arms 10, 10 ride on a sloping surface of the wedge cam 20A which is attached to a distal end portion of the ball nut 38A.

The roller arms 10, 10 are caused to oscillate in an expanding direction as a result of the cam rollers 18, 18 riding on the sloping surface of the wedge cam 20A and move the link rods 7, 7 which are coupled to be supported substantially at middle portions of the roller arms 10, 10 by spherical bushes 9, 9 axially outwards in an amplified fashion based on the principle of leverage (refer to FIG. 4). By doing so, the respective proximal end portions of the brake arms 3, 3 are moved in an expanding direction about brake arm shafts 4, 4 as oscillating centers, causing the pad assemblies 6, 6 provided at the open end portions of the brake arms 3, 3 to be pressed against the brake rotor 100 so as to hold it therebetween to execute a braking operation.

Further, the actuator 81 includes a plurality of (three in the second embodiment) compression coil springs 17 which are elastic members for pushing to bias the ball nut 38A towards the braking position where the wedge cam 20A expands the proximal end portions of the brake arms 3, 3 and a spring holding mechanism 30A for holding the compression coil springs 17 in a biasing force accumulating state so as to push to bias the wedge cam 20A from a non-braking position to the braking position.

Figure 12:
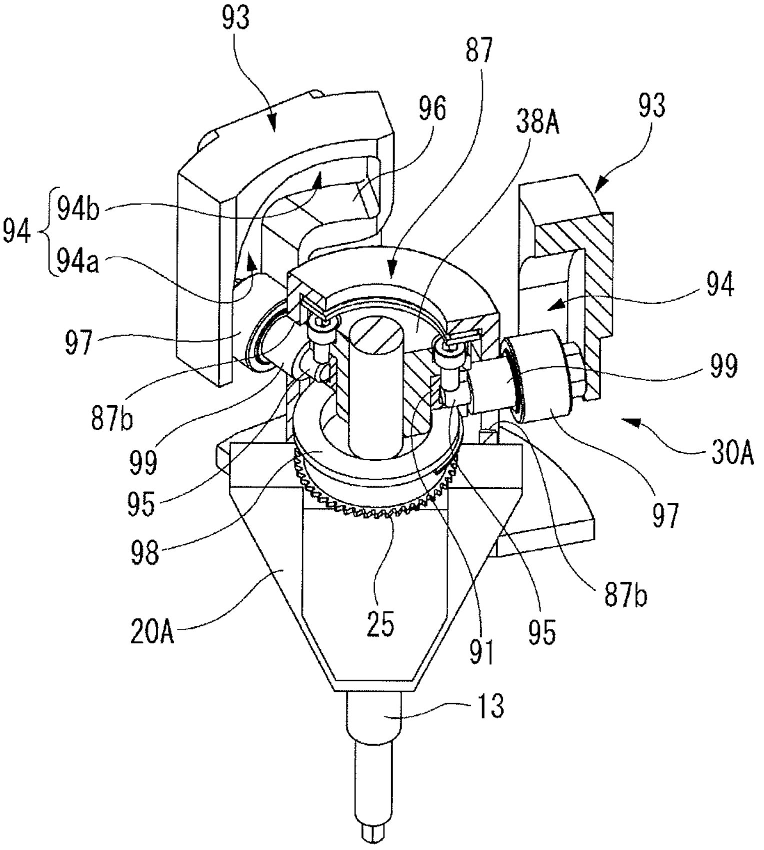
FIG. 12(*a*) is a partially cut away perspective view for explaining the actuator shown in FIG. 11, and FIG. 12(*b*) is a perspective view of a guide rail shown in FIG. 12(*a*).
Figure 12:
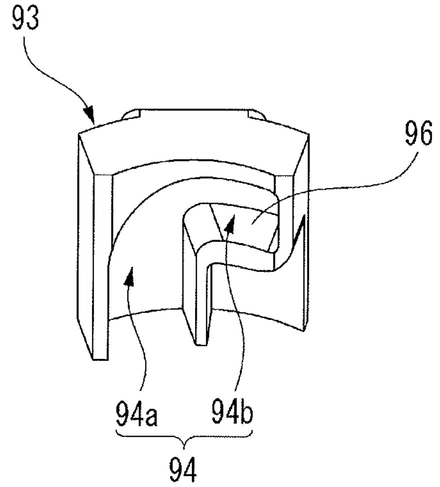

The spring holding mechanism 30A includes the case-shaped piston 87 which is configured to move freely along the direction of a rotational axis of the ball screw 13 to transmit spring biasing forces of the compression coil springs 17 which are interposed between a housing 83 which constitutes a stationary portion on a brake main body side and itself to the ball nut 38A accommodated therein, guide rails 93 which are provided within the housing 83 and in which a cam groove 94 is formed which has a guide groove portion 94*a* which extends along the direction of the rotational axis of the ball screw 13 and a holding groove portion 94*b* which extends from one end portion (an upper end portion in FIG. 12(*b*)) of the guide groove portion 94*a* in a rotational direction of the ball screw 13 and roller fixing bolts 95 as follower members which are provided integrally with the ball nut 38A, which each have a roller contact element 97 which moves so as to follow the cam groove 94 at a distal end portion thereof and which are provided so as to project radially outwards of the ball nut 38A, whereby the ball nut 38A in which the roller contact elements 97 are guided in the holding groove portions 94*b* holds the wedge cam 20A in the non-braking position against the spring biasing forces of the compression coil springs 17.

Each compression coil spring 17 is placed on a guide bolt 82 which is provided so as to extend from an inner bottom surface of the housing 83 along an axial direction and is supported in a spring receiving portion 87*a* which is provided so as to be depressed on a flange portion of the case-shaped piston 87 at a lower end portion thereof, so that the compression coil spring 17 is interposed between the housing 83 and the case-shaped piston 87. The spring biasing forces of the compression coil springs 17 are set so as to push to bias the ball nut 38A and the wedge cam 20A from the non-braking position to the braking position to such an extent that the pad assemblies 6, 6 can obtain a parking braking force (a braking force which is about a half of a normal braking force).

The case-shaped piston 87 is fitted in the casing 83, whereby the case-shaped piston 87 is allowed to move along the direction of the rotational axis of the ball screw 13 but is not allowed to rotate relative to the ball screw 13. Namely, the spring guide bolts 82 which are provided on the inner bottom surface of the housing 83 which is formed substantially into a bottomed cylindrical shape so as to extend downwards perpendicularly therefrom penetrate through holes in the flange portion which is provided on the outer circumference of a distal end portion of a cylindrical main body portion so as to project therefrom, whereby the case-shaped piston 87 is allowed to move freely along the axial direction relative to the housing 83 but is not allowed to rotate relative to the housing 83. Window portions 87*b* which the roller fixing bolts 95 penetrate and an opening portion 87*c* which is brought into engagement with a wide portion of the wedge cam 20A are provided in the cylindrical main body portion of the case-shaped piston 87.

The three roller fixing bolts 95 are disposed circumferentially at equal intervals on an outer circumferential surface of an annular spacer 91 which is fixed to an outer circumferential portion of the ball nut 38A. The roller fixing bolts 95 on which the roller contact elements 97 and sleeves 99 are placed penetrate the window portions 87*b* of the case-shaped piston 87 and are screwed into the spacer 91 at distal end portions thereof, and the roller contact elements 97 are supported rotatably on head portion sides of the roller fixing bolts 95.

In the ball nut 38A, the roller contact elements 97 are brought into engagement with the holding groove portions 94*b* which constitute initial positions (non-braking positions) of the cam grooves 94 which are formed on the guide rails 93, whereby the sleeves 99 which are placed on the roller fixing bolts 95 are brought into engagement with the window portions 87*b* of the case-shaped piston 87, allowing the ball nut 38A to restrict the case-shaped piston 87 from moving downwards in the figures. Namely, the ball nut 38A cannot move in the axial direction in such a state that the ball screw 13 is prevented from rotating to thereby hold the wedge cam 20A and the case-shaped piston 87 in the non-braking position against the spring biasing forces of the compression coil springs 17.

As shown in FIG. 12(*b*), the holding groove portion 94*b* has a sloping surface 96 on which the roller contact element 97 is allowed to roll towards the guide groove portion 94*a* by means of the biasing force of the compression coil spring 17. However, when the ball screw 13 is prevented from rotating by a minute rotational force exerted in a counter-braking direction by the electric motor 61 or a holding force of an electromagnetic clutch provided between the electric motor 61 and the ball screw 13, the ball nut 38A cannot move downwards in the figures.

Then, when the ball screw 13 is released from the state in which the ball screw 13 is prevented from rotating by stopping an energization of the electric motor 61 or releasing the electromagnetic clutch, the ball nut 38A is allowed to move in the axial direction.

A sliding member 88 and a washer 89 are interposed between an inner bottom surface of the case-shaped piston 87 and a rear end face of the ball nut 38A. The ball nut 38A is allowed to rotate relative to the case-shaped piston 87 within a predetermined angular range so that the roller contact elements 97 can roll along the sloping surfaces 96 of the holding groove portions 94*b* towards the guide groove portions 94*a*.

When the ball screw 13 is released from the state in which the ball screw 13 is prevented from rotating in applying the brake, allowing the ball nut 38A which is disposed on the inner bottom surface of the case-shaped piston 87 to be pushed downwards via the case-shaped piston 87 by means of the spring biasing forces of the compression coil springs 17, the roller contact elements 97 are allowed to roll along the sloping surfaces 96 of the holding grooves 94*b* towards the guide groove portions 94*a*. Then, when the roller contact elements 97 reach the guide groove portions 94*a*, the ball nut 38A which is allowed to move freely along the direction of the rotational axis of the ball screw 13 moves downwards to a parking brake applying position below while rotating the ball screw 13 by means of the spring biasing forces of the compression coil springs 17 and moves further downwards to a normal braking position further below as a result of the ball screw 13 of being driven to rotate in a brake applying direction by the electric motor 61.

Then, in releasing the brake, when the ball screw 13 is driven to rotate in a brake releasing direction by the electric motor 61, the ball nut 38A moves upwards while pushing up the case-shaped piston 87 against the spring biasing forces of the compression coil springs 17. The roller contact elements 97 which have arrived at upper portions of the guide groove portions 94*a* receive a rotational force of the ball screw 13 to enter the holding groove portions 94*a*.

A gap adjusting mechanism 40A is provided between the wedge cam 20A which is provided integrally on the ball nut 38A and the ball screw 13 which penetrates a center of the wedge cam 20A in the axial direction for automatically executing a gap adjustment when pads get worn.

As shown in FIGS. 10 and 11, the gap adjusting mechanism 40A includes an adjuster screw 98 which is placed on the ball screw 13 in such a state that a rear end portion (an upper end portion in FIG. 10) thereof is fitted on a distal end portion of the ball nut 38A so as to rotate relative to the distal end portion of the ball nut 38A and in which male threads formed on an outer circumferential surface thereof are screwed into female threads formed on the wedge cam 20A, an adjuster gear 25 which is fixedly fitted on the adjuster screw 98, an adjuster lever 24 which is attached rotatably to the case-shaped piston 87 so as to be brought into engagement with the adjuster gear 25 and an adjuster guide (not shown) which is disposed on an inner circumferential surface of the housing 83.

Then, when the pads get worn, oscillating strokes of the brake arms 3 are increased, and hence, strokes of the case-shaped piston 87 and the ball nut 38A deviate from their normal ranges to become excessive, whereby the ball nut 38A and the case-shaped piston 87 move axially downwards.

As a result of this, when the case-shaped piston 87 moves a predetermined distance away from the housing 83, the adjuster lever 24 is rotated against a spring biasing force of a return spring 28 by the adjuster guide, whereby an engaging position between the adjuster lever 24 and the adjuster gear 25 is changed. Then, when the case-shaped piston 87 returns to its initial position as a result of the brake being released, the adjuster lever 24 is rotated by means of the spring biasing force of the return spring 28, whereby the adjuster screw 98 is rotated via the adjuster gear 25, and an axial position of the adjuster screw 98 relative to the wedge cam 20A is adjusted upwards. This adjusts an axial position of the wedge cam 20A relative to the case-shaped piston 87 and the ball nut 38A which stay in their initial positions, so that gaps between the brake rotor 100 and the pad assemblies 6, 6 are adjusted so as not to be too great.

Namely, the wedge cam 20A is allowed to advance relatively from the adjuster screw 98 to project therefrom by the gap adjustment ensured to be executed to eliminate the oscillating gaps of the brake arms 3, 3 which are generated by the excessive strokes thereof which are attributed to the wear of the pads, whereby an initial position of the wedge cam 20A after the gap adjustment is located in an advanced position lying further ahead by a distance over which the wedge cam 20A projects as a result of the gap adjustment than its original position. Consequently, roller arms 10, 10 which are brought into cam engagement with the sloping surface of the wedge cam 20A are also in an expanded state. Namely, a state is produced in which the gaps are adjusted to be advanced by an amount corresponding to an amount of wear of the pads in advance.

Next, referring to FIGS. 13 and 14, an operation of the actuator 81 according to the second embodiment will be described.

Figure 13:
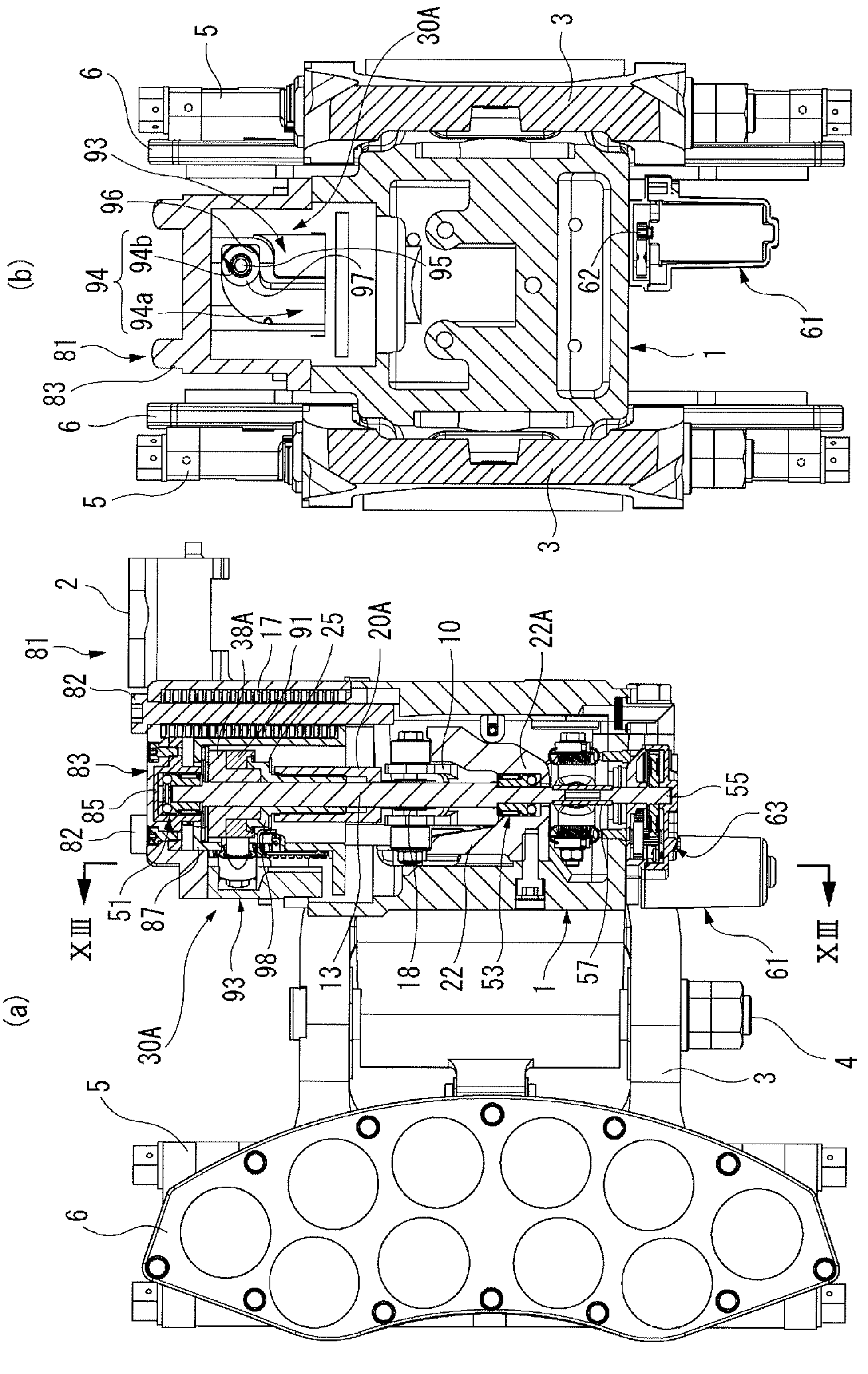
FIG. 13 shows explanatory views for explaining an operation of the wedge cam brake shown in FIG. 9, in which FIG. 13(*a*) is a vertical sectional view and FIG. 13(*b*) is a sectional view taken along a line XIII-XIII shown in FIG. 13(*a*) and seen in a direction indicated by arrows attached thereto.

FIG. 13 shows an initial state in which both the brake and the gap adjusting mechanism 40A are not in operation as FIG. 10 does. In this state, the spring holding mechanism 30A is in operation, and the ball nut 38A cannot move in the axial direction with the ball screw 13 prevented from rotating and the roller contact elements 97 guided in the holding groove portions 94*b* of the cam grooves 94 and hence holds the wedge cam 20A and the case-shaped piston 87 in the non-braking position against the spring biasing forces of the compression coil springs 17. Then, the compression coil springs 17 which are interposed between the housing 83 and the case-shaped piston 87 are held in a biasing force accumulating state.

Then, in applying the brake, when the ball screw 13 is released from the state in which the ball screw 13 is prevented from rotating by stopping the energization of the electric motor 61 or releasing the electromagnetic clutch, allowing the ball nut 38A to be pushed downwards via the case-shaped piston 87 by means of the spring biasing forces of the compression coil springs 17, the roller contact elements 97 are caused to roll along the sloping surfaces 96 of the holding groove portions 94*b* towards the guide groove portions 94*a*.

Figure 14:
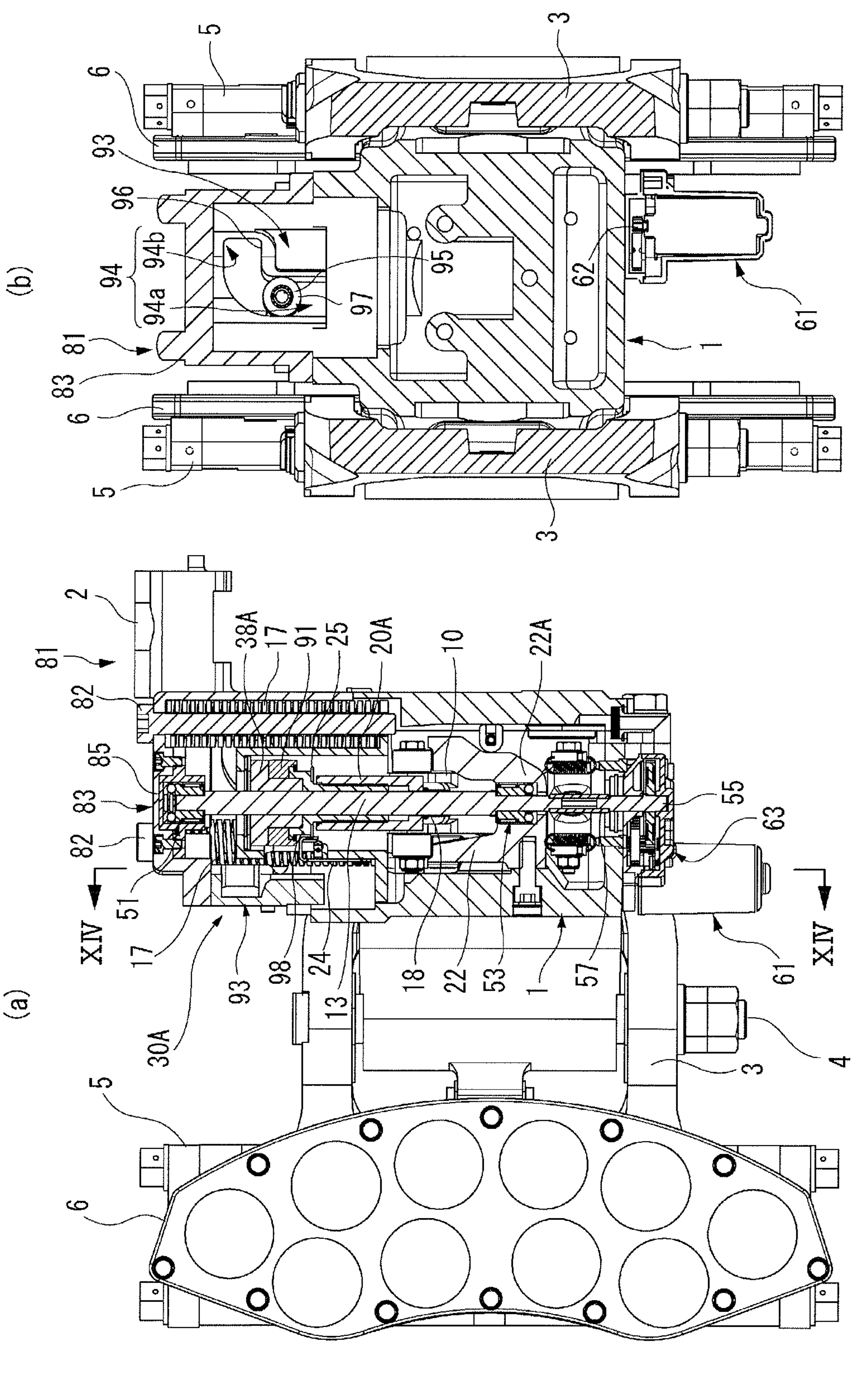
FIG. 14 shows explanatory views for explaining the operation of the wedge cam brake shown in FIG. 9, in which FIG. 14(*a*) is a vertical sectional view and FIG. 14(*b*) is a sectional view taken along a line XIV-XIV shown in FIG. 14(*a*) and seen in a direction indicated by arrows attached thereto.

As shown in FIG. 14, when the roller contact element 97 reaches the guide groove portion 94*a* of the cam groove 94, the ball nut 38A which is allowed to move freely along the direction of the rotational axis of the ball screw 13 is pushed to be biased downwards in the figure via the case-shaped piston 87 by means of the spring biasing forces of the compression coil springs 17. The ball nut 38A which is pushed downwards by means of the spring biasing forces of the compression coil springs 17 moves downwards to the parking brake applying position below while rotating the ball screw 13 which is now free to rotate since the electric motor 61 is not energized.

Then, when the wedge cam 20A which is provided integrally on the ball nut 38A moves downwards to the parking brake applying position below, the proximal end portions of the brake arms 3, 3 are expanded to oscillate by the action of the wedge cam 20A, causing the pair of brake pads 6, 6 which are provided at the open end portions of the brake arms 3, 3 to be pressed against both sides of the brake rotor 100 so as to hold it therebetween.

Then, the ball screw 13 is driven to rotate in the brake applying direction by the electric motor 61 substantially at the same time as the ball screw 13 is released from the state where the ball screw 13 is prevented from rotating as a result of the energization of the electric motor 61 being stopped or the electromagnetic clutch being released or slightly thereafter, whereby the wedge cam 20A which is provided integrally on the ball nut 38A moves further downwards to the normal braking position further below, whereupon the pair of pad assemblies 6, 6 are caused to be pressed against both sides of the brake rotor 100 so as to hold it therebetween with a normal braking force by the cam action of the wedge cam 20A.

When the brake is released, the ball screw 13 is driven to rotate in the brake releasing direction by the electric motor 61, whereby the ball nut 38A moves upwards while pushing the case-shaped piston 87 upwards. Then, the wedge cam 20A which is provided integrally on the ball nut 38A moves to the non-braking position above, whereby the pair of pad assemblies 6, 6 are caused to move away from the brake rotor 100 by the cam action of the wedge cam 20A.

At the same time as this, the case-shaped piston 87 is pushed upwards by the ball nut 38A against the spring biasing forces of the compression coil springs 17, and the compression coil springs 17 are returned to the biasing force accumulating state which corresponds to their initial positions (refer to FIG. 13). In addition, the roller contact element 97 which has arrived at an upper portion of the guide groove portion 94*a* as a result of the ball nut 38A moving upwards receives a rotational force of the ball screw 13 to enter the holding groove portion 94*a*.

Since the ball nut 38A is restricted from moving downwards in the figure when the ball screw 13 is prevented from rotating by means of a minute rotational force exerted in a counter-braking direction by the electric motor 61 or a holding force of the electromagnetic clutch provided between the electric motor 61 and the ball screw 13, the compression coil springs 17 interposed between the housing 83 and the case-shaped piston 87 are held in the biasing force accumulating state.

Consequently, according to the wedge cam brake including the actuator 81 of the second embodiment, in applying the brake, since the compression coil springs 17 push to bias the ball nut 38A to the braking position via the case-shaped piston 87 as a result of the spring holding mechanism 30A being released, whereafter the ball screw 13 is driven to rotate by the motor gear unit 60, the wedge cam 20A which is provided integrally on the ball nut 38A can move to the braking position without no delay, thereby making it possible to obtain a high brake response. Thus, a high response is not required on the electric motor 61, thereby making it possible to reduce the size of the electric motor 61 and the consumption of electric power by the electric motor 61.

Further, since the parking braking force (the parking state) is obtained by means of the spring biasing forces of the compression coil springs 17, the electric motor 61 does not have to be driven to stay in a halt state, thereby making it possible to suppress the consumption of electric power while a vehicle is at a halt. In addition, when the minute rotational force exerted in the counter-braking direction by the electric motor 61 or the holding force of the electromagnetic clutch provided between the electric motor 61 and the ball screw 13 is released as a result of the supply of electric power thereto being cut off, since the compression coil springs 17 push to bias the wedge cam 20A to the braking position at the same time as the ball screw 13 is released from the state in which the ball screw 13 is prevented from rotating so as to brake and stop the vehicle, the railway vehicle disc brake including the wedge cam brake configured according to this embodiment can ensure against a failure in terms of supply of electric power, whereby an improvement in safety can be realized.

Further, according to the wedge cam brake including the actuator 81 of the second embodiment, the rotational force of the ball nut 38A is received by the roller contact elements 97, which are then allowed to slide within the corresponding cam grooves 94, whereby frictional resistance that would be generated in the ball nut 38A when the ball nut 38A moves in the axial direction can be reduced, thereby allowing the ball nut 38A to move smoothly.

In releasing the brake, the ball screw 13 is driven to rotate in the brake releasing direction by the electric motor 61, whereby the compression coil springs 17 are returned to their initial positions, causing the roller contact elements 97 to enter the corresponding holding groove portions 94*b* of the cam grooves 94, and reaction forces of the compression coil springs 17 which are inputted into the ball nut 38A can be borne by the holding groove portions 94*b* via the roller contact elements 97. Then, since the reaction forces of the compression coil springs 17 are decomposed into a force with which the ball screw 13 is rotated and a force which is borne by the holding groove portions 94*b*, the holding force (for example, the minute rotational force exerted in the counter-braking direction by the electric motor 61 or the electromagnetic force of the electromagnetic clutch provided between the electric motor 61 and the ball screw 13) for preventing the rotation of the ball screw 13 can be reduced to a low level.

Next, the construction of a wedge cam brake according to a third embodiment of the invention will be described by the use of FIGS. 15 to 22. It should be noted that like reference numerals will be given to like constituent members to those of the wedge cam brake according to the first embodiment so as to omit a detailed description thereof.

Figure 15:
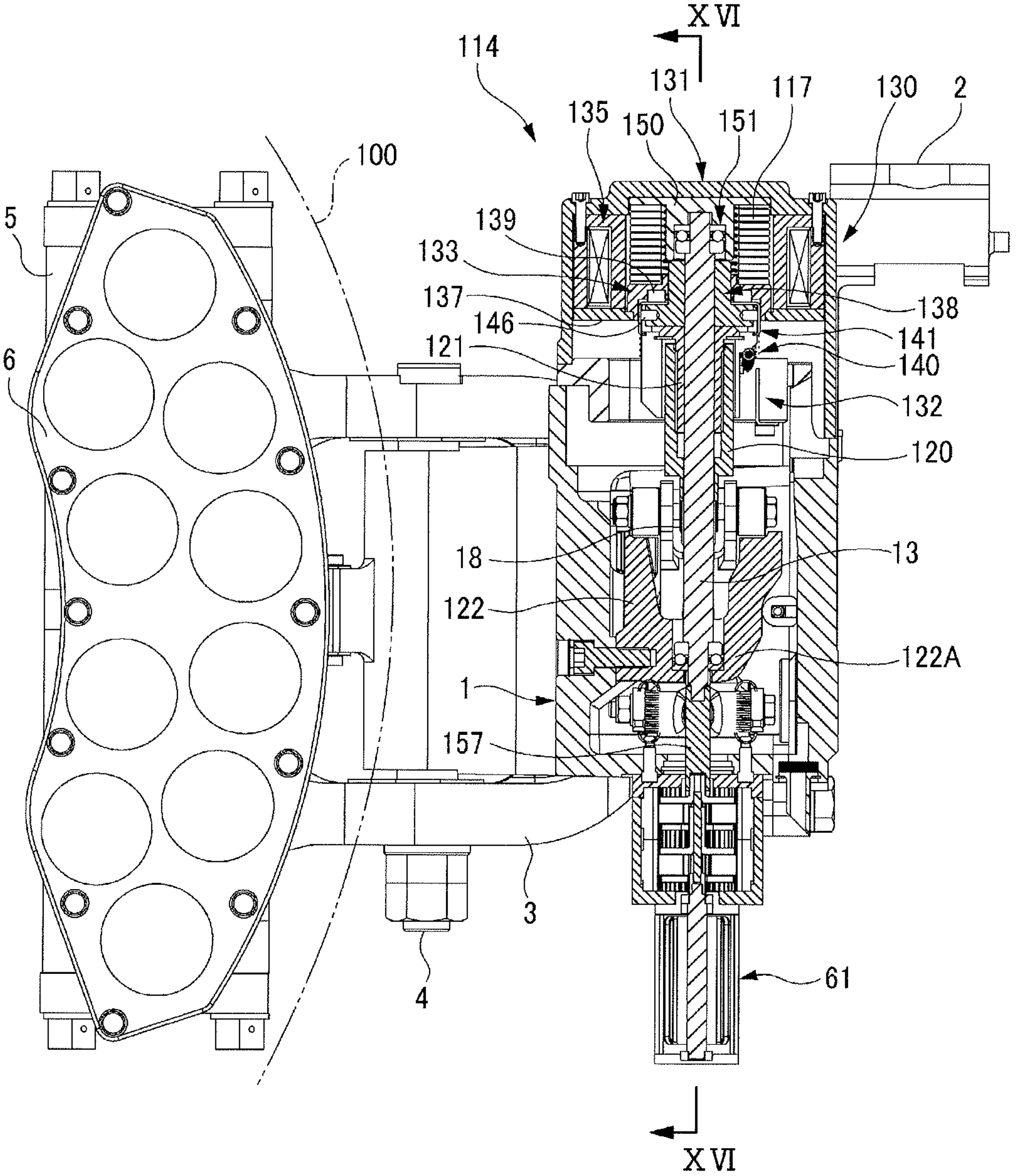
FIG. 15 is a vertical sectional view showing an overall construction of a railway vehicle disc brake including a wedge cam brake according to a third embodiment of the invention.

FIG. 15 is a vertical sectional view showing an overall construction of a railway vehicle disc brake including a wedge cam brake according to a third embodiment of the invention.

An actuator 114 for expanding brake arms 3, 3 is connected to oscillating ends of the brake arms 3, 3, and pad assemblies 6, 6 are mounted on the other oscillating ends of the brake arms 3, 3 via pad holders 5.

Figure 16:
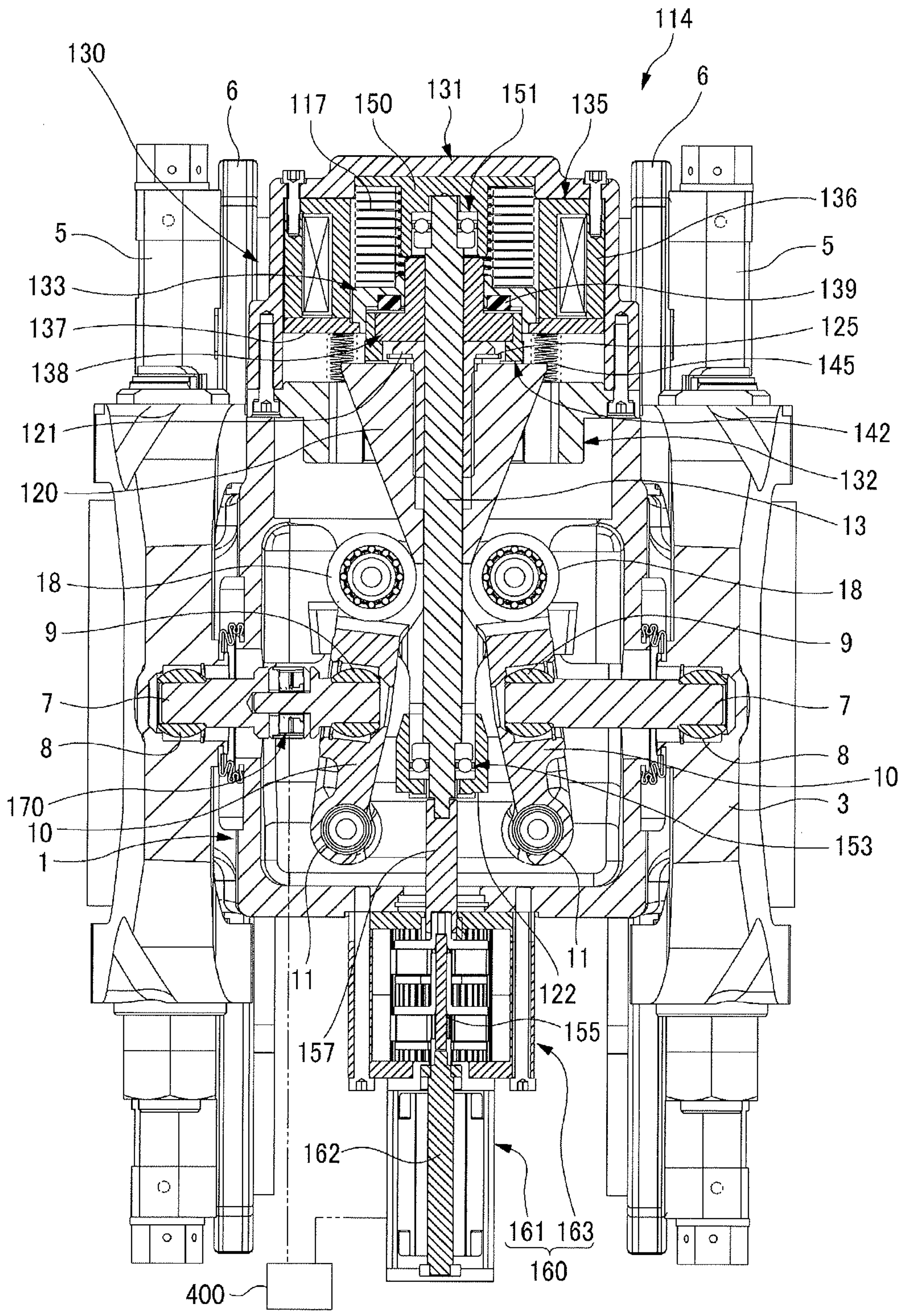
FIG. 16 is a sectional view taken along a line XVI-XIV shown in FIG. 15 and seen in a direction indicated by arrows attached thereto.

As shown in FIGS. 15 and 16, in an actuator 114 according to the third embodiment, when a brake is applied, a compression coil spring 117 pushes to bias a ball nut 138 for pushing to bias a wedge cam 120 to a braking position, and a ball screw 13 which is screwed into the ball nut 138 is driven to rotate by an electric motor 161, whereby proximal end portions of the brake arms 3, 3 are expanded to oscillate by means of a cam action of the wedge cam 120 which moves to the braking position along the direction of a rotational axis of the ball screw 13, and the pair of pad assemblies 6, 6 provided at open end portions of the brake arms 3, 3 are pressed against both sides of a brake rotor 100 so as to hold it therebetween to execute a braking operation. Namely, as in the actuator 14 according to the first embodiment, in the actuator 114, when a motor gear unit 160 is driven, link rods 7, 7 are caused to reciprocate via a link type servo unit.

The ball screw 13 is mounted in a body 1 so as not to move along the direction of the rotational axis thereof relative to the body 1 but so as to rotate relative to the body 1 by a bearing 151 which is disposed at a proximal end portion side (an upper end portion side in the figures) and a bearing 153 which is disposed at a distal end side (a lower end portion side in the figures) of the ball screw 13.

The bearing 151 is mounted in a bearing holder 150 which is fixed to an inner bottom surface of a cap 131 which constitutes a stationary portion on a brake main body side, and the bearing 153 is mounted in a sleeve portion 122A of a fixed sleeve member 122 in the body 1.

Further, a distal end portion of the ball screw 13 is coupled to an output shaft 155 of the motor gear unit 160 via a joint 157, whereby a rotational driving force of the electric motor 161 is transmitted to the ball screw 13 via a speed reduction mechanism 163. Here, the motor gear unit 160 is disposed so that a drive shaft 162 of the electric motor 161 becomes in series with the rotational axis of the ball screw 13.

Figure 17:
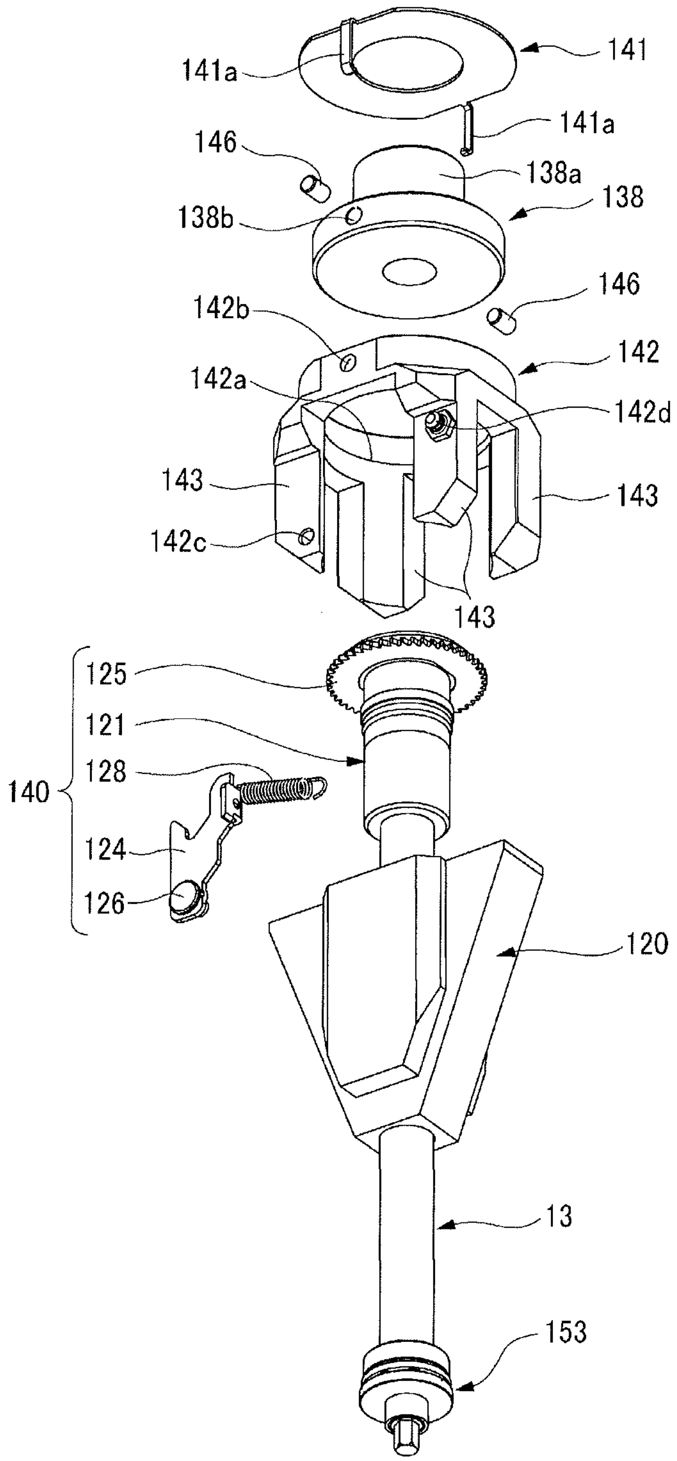
FIG. 17 is a partially exploded perspective view of the actuator shown in FIG. 15 as seen from below.

As shown in FIGS. 16 and 17, the ball nut 138 for pushing to bias the wedge cam 120 is fixed to a nut holder 142 which is disposed concentrically with the ball screw 13. Namely, the ball nut 138 is fitted in an annular step portion 142*a* of the nut holder 142 from above, and thereafter, connecting pins 146 which pass through fixing holes 142*b* of the nut holder 142 are inserted to be fitted in fixing holes 138*b*, whereby the ball nut 138 is fixed to the nut holder 142. A holding plate 141 having a pair of holding pieces 141*a* for preventing the dislocation of the connecting pins 146 is mounted on a rear end face of the ball nut 138.

The nut holder 142 is supported so as to move in an axial direction relative to a lower base 132 which is attached to an open end of the cap 131 having a substantially bottomed cylindrical shape but so as not to rotate relative thereto.

As the ball nut 138 moves axially on the ball screw 13 towards a distal end side (a lower side) thereof, cam rollers 18, 18 which are mounted at upper ends of roller arms 10, 10 ride on a sloping surface of the wedge cam 120 which is pushed to be biased to a distal end portion of the ball nut 138.

The roller arms 10, 10 are caused to oscillate in an expanding direction as a result of the cam rollers 18, 18 riding on the sloping surface of the wedge cam 120 and move link rods 7, 7 which are coupled to be supported substantially at middle portions of the roller arms 10, 10 by the spherical bushes 9, 9 axially outwards (leftwards and rightwards in FIG. 16) in an amplified fashion based on the principle of leverage. By doing so, the respective proximal end portions of the brake arms 3, 3 are moved in an expanding direction about brake arm shafts 4, 4 as oscillating centers, causing the pad assemblies 6, 6 provided at the open end portions of the brake arms 3, 3 to be pressed against the brake rotor 100 (refer to FIG. 15) so as to hold it therebetween to execute a braking operation.

An axial force sensor 170 for detecting an axial force exerted on the link rod 7 is provided on one of the link rods 7, 7. The axial force sensor 170 is connected to a controller 400 for controlling the rotation of the electric motor 161.

Further, the actuator 114 includes the compression coil spring 117 which is an elastic member for pushing to bias the wedge cam 120 towards the braking position where the wedge cam 120 expands the proximal end portions of the brake arms 3, 3 and a spring holding mechanism 130 for holding the compression coil spring 117 in a biasing force accumulating state so as to push to bias the wedge cam 120 from a non-braking position to the braking position.

The spring holding mechanism 130 includes a spring seat 133 which is a piston member which is configured to move freely along the direction of the rotational axis of the ball screw 13 to transmit a spring biasing force of the compression coil spring 117 which is interposed between the cap 131 which constitutes a stationary portion on a brake main body side and itself to the ball nut 138 which is held so as not to rotate relative to the ball screw 13, an armature 137 which is brought into engagement with an outer circumferential end of the spring seat 133 so as not to move towards the compression coil spring 117 and which is attracted to a stator 136 of an electromagnetic clutch 135 which is fixed to the cap 131, the axial force sensor 170 which is provided on one of the link rods 7, 7 which expand the proximal end portions of the brake arms 3, 3 for detecting an axial force exerted on the link rod 7, and the controller 400 for controlling the rotation of the electric motor 161 based on a detection signal of the axial force sensor 170.

Figure 18:
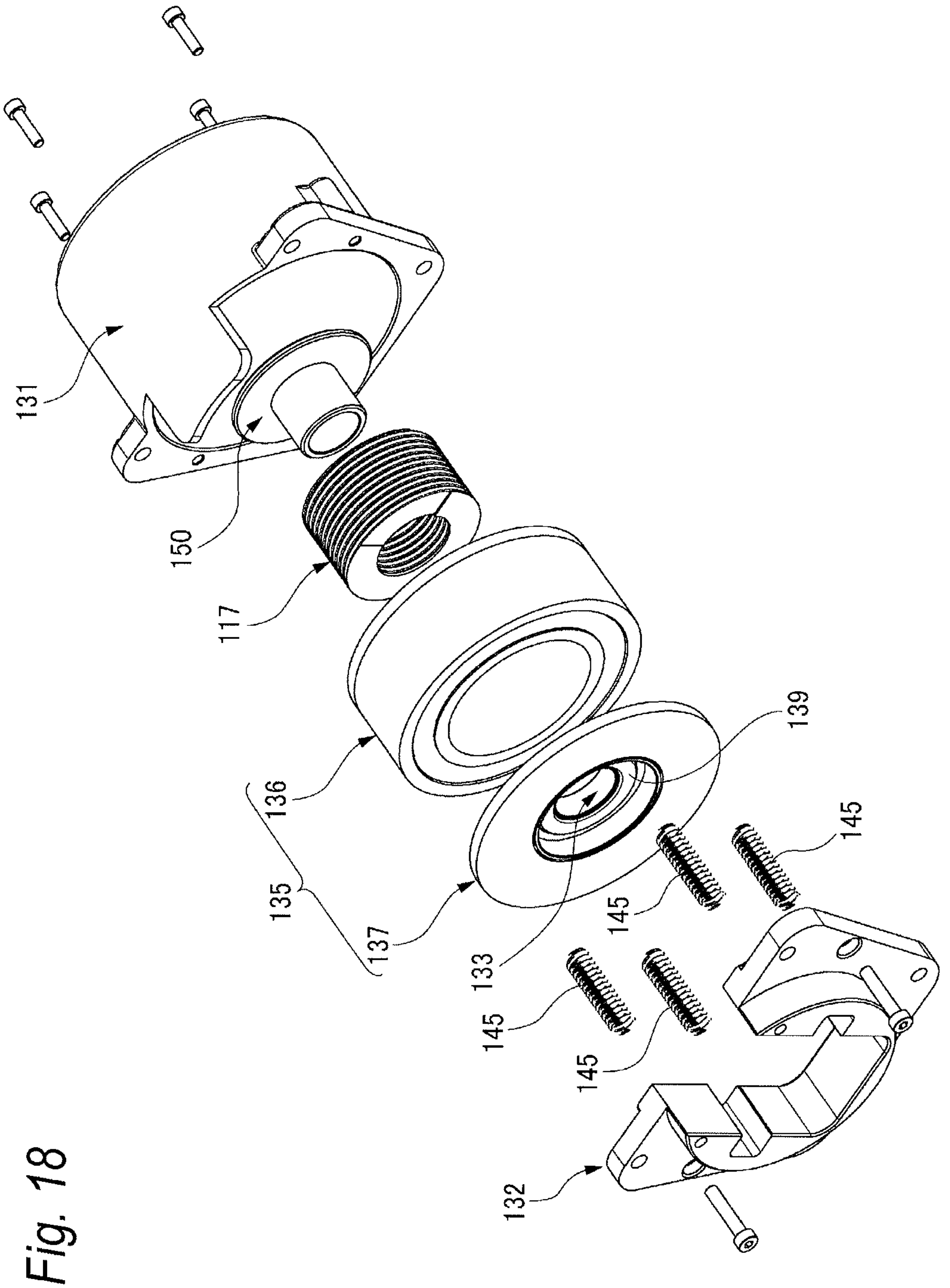
FIG. 18 is a partially exploded perspective view of the actuator shown in FIG. 15 as seen from below.
Figure 19:
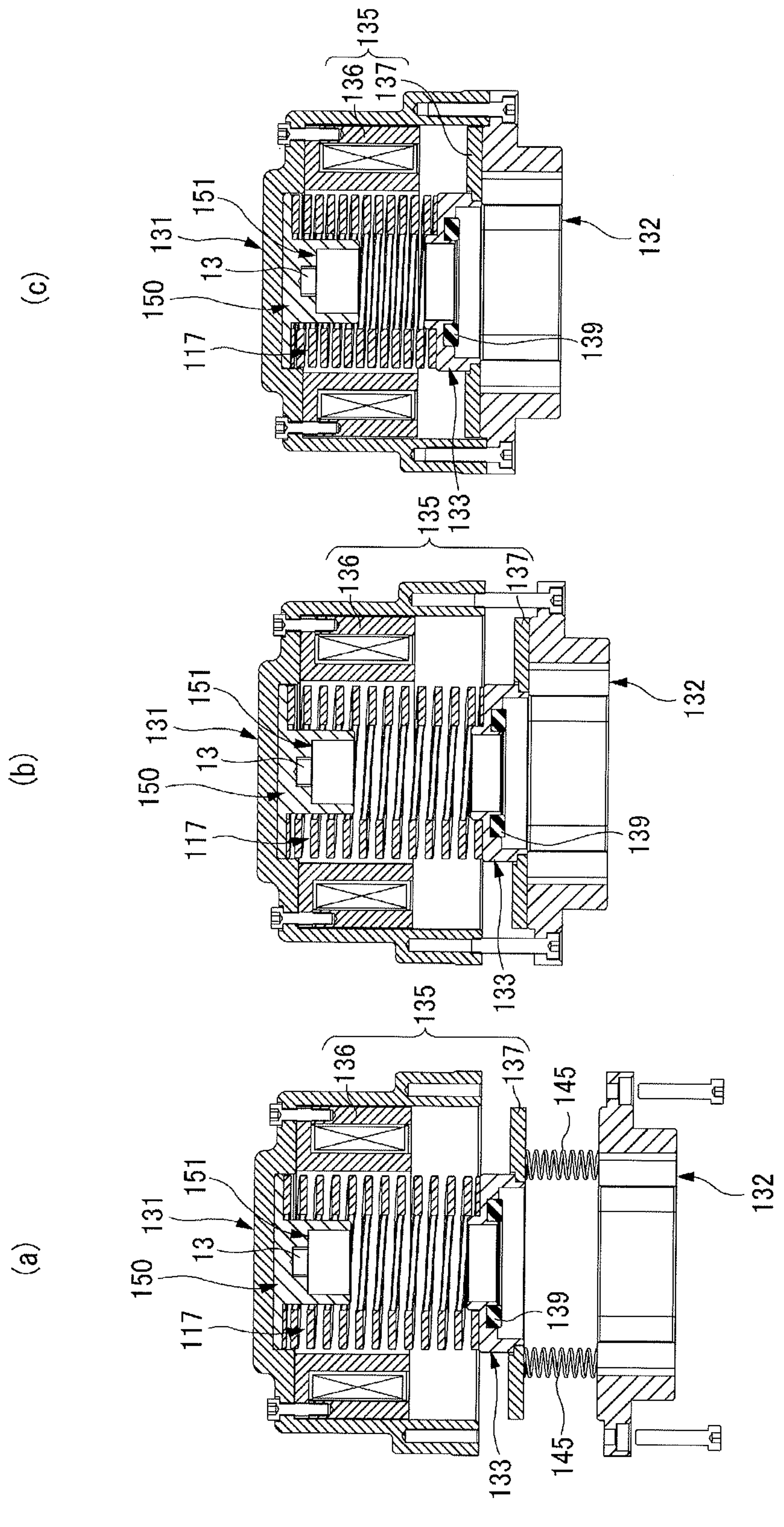
FIGS. 19(*a*) to 19(*c*) are vertical sectional views for explaining a procedure of assembling a compression coil spring and an electromagnetic clutch which are shown in FIG. 16.

As shown in FIGS. 18 and 19, the compression coil spring 117 is supported on an inner bottom surface of the cap 131 via a flange portion of the bearing holder 150 at an upper end portion thereof and is supported on a rear end face of the spring seat 133 at a lower end portion thereof, whereby the compression coil spring 117 is interposed between the cap 131 and the spring seat 133. The spring biasing force of the compression coil spring 117 is set so as to push to bias the wedge cam 120 from the non-braking position to the braking position to such an extent that the pad assemblies 6, 6 can obtain a parking braking force (a braking force which is about a half of a normal braking force).

The spring seat 133 is configured to move freely along the direction of the rotational axis of the ball screw 13 in such a state that the spring seat 133 is fitted on a rear end boss portion 138*a* of the ball nut 138. The armature 137 is brought into engagement with the outer circumferential end of the spring seat 133 so as not to move towards the compression coil spring 117.

Further, a damper member 139 made of an elastic material such as rubber is attached to a pushing portion of the spring seat 133 which faces a rear end face of the ball nut 138 and pushes to bias the ball unit 138. The damper member 139 projects further than a surface of the pushing portion of the spring seat 133 to dampen an impact generated when the spring seat 133 is brought into abutment with the ball nut 138.

The spring seat 133 is held in an initial position (a non-braking position) shown in FIG. 16 by the armature 137 which is attracted by the stator 136 of the electromagnetic clutch 135.

Further, the armature 137 is elastically biased towards the stator 136 by four set springs 145 interposed between the lower base 132 and itself at all times. The set spring 145 provides a spring force which is weaker than the biasing force of the compression coil spring 117.

Referring to FIGS. 19(*a*) to 19(*c*), an assembling procedure of the compression coil spring 117 which is assembled into an interior of the cap 131 will be described.

As shown in FIG. 19(*a*), the electromagnetic clutch 135, the bearing holder 150 in which the bearing 151 is mounted, the compression coil spring 117, the spring seat 133, the armature 137, the set springs 145 and the lower base 132 are assembled sequentially into the interior of the cap 131 in that order.

Figure 20:
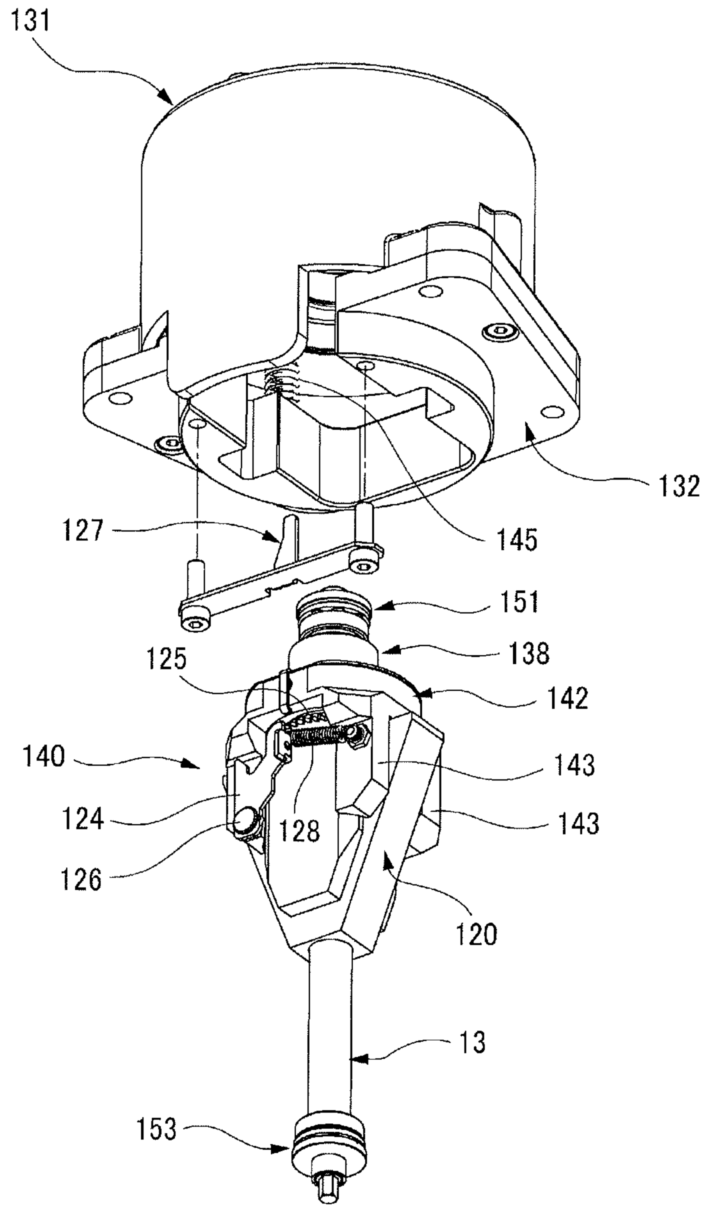
FIG. 20 is an exploded perspective view of an actuator assembly and a clutch assembly.
Figure 21:
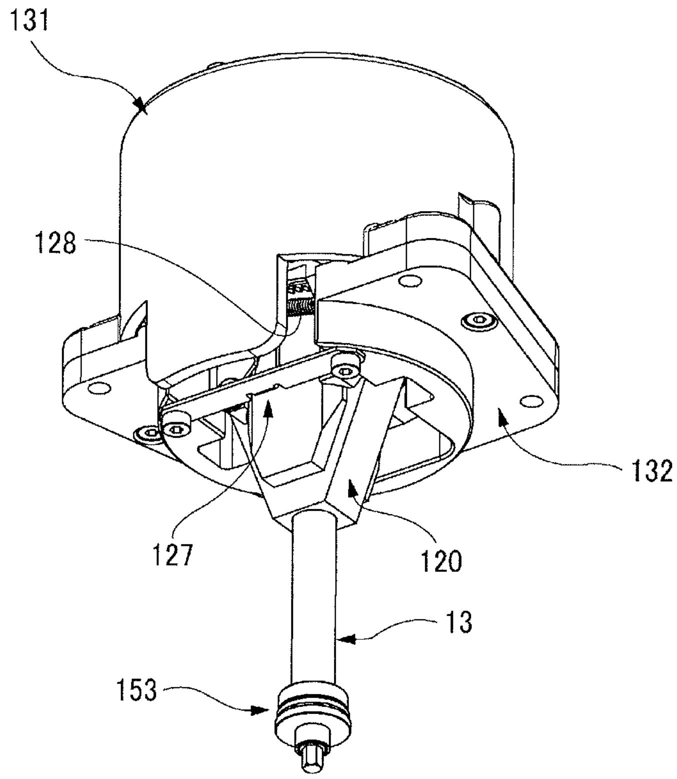
FIG. 21 is a perspective view of an assembly into which the actuator assembly and the clutch assembly are assembled.

Then, as shown in FIGS. 19(*b*), 19(*c*), the compression coil spring 117 and the electromagnetic clutch 135 which provide a great load are integrated into a clutch assembly within the cap 131 as a result of the lower base 132 being fixed to an open end of the cap 131 with bolts. A gap adjusting mechanism 140, which will be described, integrated with the ball nut 138 and an adjuster screw 121 as a sub-assembly is configured so as to be assembled into the sub-assembly of the compression coil spring 117 and the electromagnetic clutch 135 later, as shown in FIGS. 20 and 21.

In applying the brake, the ball nut 138 which is disposed below the spring seat 133 firstly pushes to bias the wedge cam 120 to the braking position as a result of the ball screw 13 being driven to rotate in a brake applying direction by the electric motor 161.

Next, the attraction of the armature 137 by the electromagnetic clutch 135 is released after a predetermined length of time elapses, and the biasing force of the compression coil spring 117 is transmitted to the ball nut 138 via the spring seat 133, whereby the ball nut 138 on which a screw feeding force by the ball screw 13 and the biasing force of the compression coil 117 are exerted moves the wedge cam 120 to a normal braking position.

Then, in releasing the brake, when the ball screw 13 is driven to rotate in a brake releasing direction by the electric motor 161, the ball nut 138 moves upwards while pushing up the spring seat 133 against the spring biasing force of the compression coil spring 117.

The gap adjusting mechanism 140 for automatically executing a gap adjustment when pads get worn is provided between the ball nut 138 and the wedge cam 120.

As shown in FIGS. 17 and 20, the gap adjusting mechanism 140 includes the adjuster screw 121 which is placed on the ball screw 13 in such a state that a flange at a rear end portion (an upper end portion in FIG. 17) is brought into abutment with a distal end face of the ball nut 138 and that male threads at a distal end portion (a lower end portion in FIG. 17) are screwed into female threads of the wedge cam 120, an adjuster gear 125 which is fixed to a rear end portion of the adjuster screw 121, an adjuster lever 124 which is attached rotatably to a nut holder 142 by a fulcrum pin 126 which is fixed in place in a fixing hole 142*c* of a leg portion 143 of the nut holder 142 so as to be brought into engagement with the adjuster gear 125, an adjuster guide 127 which is placed on the lower base 132, and a return spring 128 which is hooked on a hook pin 142*d* on a leg portion 143 of the nut holder 142 at one end and is hooked on an oscillating end of the adjuster lever 124 at the other end thereof.

In the gap adjusting mechanism 140, the adjuster lever 124 is provided on the nut holder 142, and the adjuster screw 121 which is integrated with the adjuster gear 125 and the wedge cam 120 which is thread fitted on the adjuster screw 121 are made into an actuator assembly.

Then, when the pads get worn, oscillating strokes of the brake arms 3 are increased, and hence, strokes of the nut holder 142 and the ball nut 138 deviate from their normal ranges to become excessive, whereby the ball nut 138 and the nut holder 142 move axially downwards.

As a result of this, when the nut holder 142 moves a predetermined distance away from the lower base 132, the adjuster lever 124 is rotated against a spring biasing force of the return spring 128 by the adjuster guide 127, whereby an engaging position between the adjuster lever 124 and the adjuster gear 125 is changed. Then, when the nut holder 142 returns to its initial position as a result of the brake being released, the adjuster lever 124 is rotated by means of the spring biasing force of the return spring 128, whereby the adjuster screw 121 is rotated via the adjuster gear 125, and an axial position of the adjuster screw 121 relative to the wedge cam 120 is adjusted upwards. This adjusts axial positions of the wedge cam 120 relative to the nut holder 142 and the ball nut 138 which stay in their initial positions, so that gaps between the brake rotor 100 and the pad assemblies 6, 6 are adjusted so as not to be too great.

Namely, the adjuster screw 121 is allowed to advance relatively from the wedge cam 120 to project therefrom by the gap adjustment ensured to be executed to eliminate the oscillating gaps of the brake arms 3, 3 which are generated by the excessive strokes thereof which are attributed to the wear of the pads, whereby an initial position of the wedge cam 120 after the gap adjustment is located in an advanced position lying further ahead by a distance over which the adjuster screw 121 projects as a result of the gap adjustment than its original position. Consequently, the roller arms 10, 10 which are brought into cam engagement with the sloping surface of the wedge cam 120 are also in an expanded state. Namely, a state is produced in which the gaps are adjusted to be advanced by an amount corresponding to an amount of wear of the pads in advance.

Next, referring to FIGS. 16 and 22(*a*), 22(*b*), an operation of the actuator 114 according to the third embodiment will be described.

FIG. 16 shows an initial state in which both the brake and the gap adjusting mechanism 140 are not in operation. In this state, the spring holding mechanism 130 is in operation, and the armature 137 is attracted to the stator 136 of the electromagnetic clutch 135, and the spring seat 133 which is in engagement with an inner circumferential end of the armature 137 is restricted from moving downwards in the figures and stays in a held state. Then, the compression coil spring 117 which is interposed between the cap 131 and the spring seat 133 are held in a biasing force accumulating state.

Figure 22:
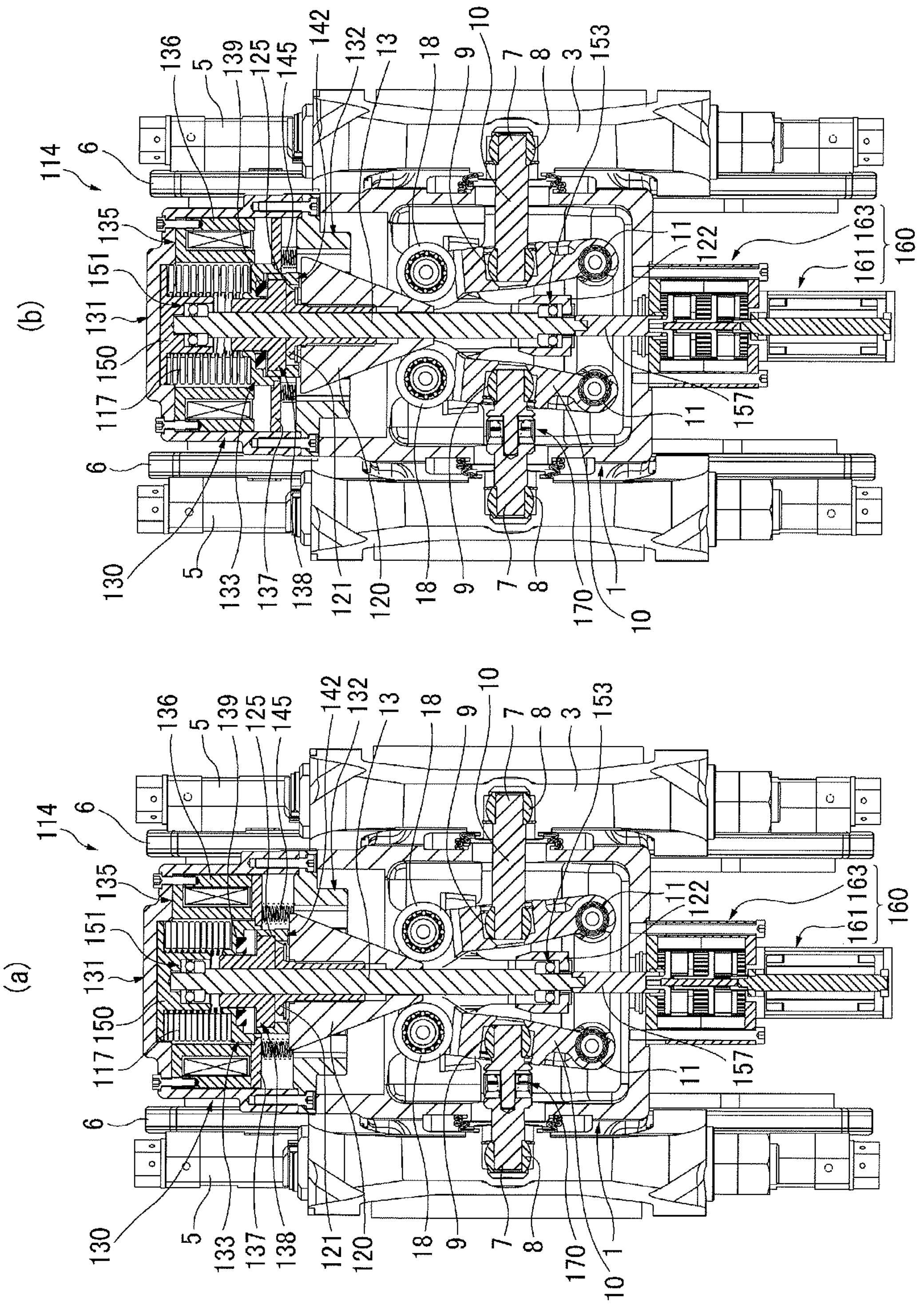
FIGS. 22(*a*), 22(*b*) are sectional views of a main part of the actuator shown in FIG. 16 for explaining an operation thereof.

Then, in applying the brake, firstly, as shown in FIG. 22(*a*), the ball screw 13 is driven to rotate in the brake applying direction by the electric motor 161, and the ball nut 138 pushes to bias the wedge cam 120 to the braking position. As this occurs, since a load acting along the direction of the rotational axis of the ball screw 13 is not exerted on the ball nut 138 whose rear end face lies away from the pushing portion of the spring seat 133, the ball screw 13 can rotate smoothly, whereby an initial response of the electric motor 161 is improved.

Namely, when the load attributed to the biasing forces of the compression coil springs 117 is exerted on the ball nut 138, a frictional resistance at a thread engagement portion between the ball nut 138 and the screw 13 is increased to thereby increase the load of the electric motor 161. However, since the armature 137 which is brought into engagement with the spring seat 133 so as not to move towards the compression coil springs 117 is attracted to the stator 136 of the electromagnetic clutch 135, the biasing force of the compression coil spring 117 is never exerted on the ball nut 138.

Next, when the energization of the electromagnetic clutch 135 is cut off after a predetermined length of time, releasing the armature 137 from the state in which the armature 137 is attracted to the stator 136, the holding state of the spring seat 133 by the armature 137 is released. Then, the compression coil spring 117 pushes to bias the ball nut 138 and the nut holder 142 downwards in the figure via the spring seat 133.

Then, as shown in FIG. 22(*b*), the ball nut 138 on which the screw feeding force by the ball screw 13 and the biasing force of the compression coil spring 117 are exerted moves the wedge cam 120 to the braking position. Then, the wedge cam 120 moves downwards to a parking brake applying position below, and the proximal end portions of the brake arms 3, 3 are expanded to oscillate by a cam action of the wedge cam 120, causing the pair of brake pads 6, 6 which are provided at the open end portions of the brake arms 3, 3 to be pressed against both sides of the brake rotor 100 so as to hold it therebetween.

As this occurs, an axial force exerted on the link rod 7 is detected by the axial force sensor 170 which is provided on one of the link rods 7 which expands the proximal end portions of the brake arms 3, 3 by the cam action of the wedge cam 120, and the controller 400 controls the rotation of the electric motor 161 based on a detection signal from the axial force sensor 170, thereby making it possible to control the braking force as required.

In releasing the brake, when the ball screw 13 is driven to rotate in a brake releasing direction by the electric motor 161, the ball nut 138 which pushes to bias the wedge cam 120 to the braking position moves upwards to the non-braking position above, whereby the wedge cam 120 also moves upwards to the non-braking position above, and the pair of pad assemblies 6, 6 are caused to move away from both the sides of the rotor 100 by the cam action of the wedge cam 120.

At the same time as this, the spring seat 133 is pushed upwards by the ball nut 138 against the spring biasing force of the compression coil spring 117, and the compression coil spring 117 is returned to the biasing force accumulating state which corresponds to their initial positions (refer to FIG. 16).

As this occurs, the armature 137 which can move relative to the spring seat 133 to an opposite side to the side where the compression coil spring 117 is provided is never caused to move to the initial position together with the spring seat 133 by the ball nut 138 but is kept in abutment with the stator 136 of the electromagnetic clutch 135 by means of spring forces of the set springs 145.

Then, in case the armature 137 is attracted to the stator 136 by energizing the electromagnetic clutch 135, since the armature 137 is brought into engagement with the outer circumferential end of the spring seat 133 to restrict the spring seat 133 from moving downwards in the figure, the compression coil spring 117 which is interposed between the cap 131 and the spring seat 133 are held in the biasing force accumulating state.

Consequently, according to the wedge cam brake including the actuator 114 configured according to the third embodiment, in applying the brake, firstly, the ball screw 13 is driven to rotate in the brake applying direction by the electric motor 161, and the ball nut 138 pushes to bias the wedge cam 120 to the braking position. As this occurs, since the load acting along the direction of the rotational axis of the ball screw 13 is not exerted on the ball nut 138, the ball screw 13 can rotate smoothly, whereby the initial response of the electric motor 161 is improved.

Next, the attraction of the armature 137 by the electromagnetic clutch 135 is released after a predetermined length of time elapses, and the biasing force of the compression coil spring 117 is transmitted to the ball nut 138 via the spring seat 133, whereby the ball nut 138 on which the screw feeding force by the ball screw 13 and the biasing force of the compression coil 117 are exerted moves the wedge cam 120 to the braking position. As this occurs, the axial force exerted on the link rod 7 is detected by the axial force sensor 170 which is provided on the link rod 7, and the controller 400 controls the rotation of the electric motor 161 based on the detection signal from the axial force sensor 170, thereby making it possible to control the braking force as required.

In addition, since the armature 137 can move relative to the spring seat 133 to the opposite side to the side where the compression coil spring 117 is provided, the armature 137 is never caused to move to the initial position together with the spring seat 133 by the ball nut 138. Namely, in this construction, the forces exerted from the wedge cam 120 and the ball nut 138 are transmitted to the compression coil spring 117 and are hence not exerted on the electromagnetic clutch 135, and therefore, an excessive load is never exerted on the electromagnetic clutch 135.

Further, since the parking braking force (the parking state) is obtained by means of the spring biasing force of the compression coil spring 117, the electric motor 161 does not have to be driven to stay in a halt state, thereby making it possible to suppress the consumption of electric power while the vehicle is at a halt. In addition, in the event that a power supply is cut off, since the compression coil spring 117 pushes to bias the wedge cam 120 to the braking position at the same time as the energization of the electromagnetic clutch 135 is stopped to brake and stop the vehicle, the railway vehicle disc brake including the wedge cam brake configured according to the third embodiment can ensure against a failure in terms of power supply, whereby an improvement in safety can be realized.

Further, according to the wedge cam brake including the actuator 114 of the third embodiment, in applying the brake, the ball screw 13 is driven to rotate in the brake applying direction by the electric motor 161, whereby the ball nut 138 is once caused to move away from the spring seat 133. Then, when the attraction of the armature 137 by the electromagnetic clutch 135 is released after a predetermined length of time elapses, the pushing portion of the spring seat 133 which is biased by the spring force of the compression coil spring 117 is forcibly brought into abutment with the ball nut 138. However, the damper member 139 is provided between the pushing portion and the ball nut 138. Thus, the impact generated when the spring seat 133 is brought into abutment with the ball nut 138 is dampened, whereby the generation of abnormal noise is suppressed, and the durability is never damaged.

Further, according to the wedge cam brake including the actuator 114 of the third embodiment, in releasing the brake, the ball screw 13 is driven to rotate in the brake releasing direction by the electric motor 161, and therefore, when the spring seat 133 is caused to move to its initial position against the spring biasing force of the compression coil spring 117 by the ball nut 138, the armature 137 which can move relative to the spring seat 133 towards the opposite side to the side where the compression coil spring 117 is provided is never caused to move to the initial position together with the spring seat 133 by the ball nut 138 but is brought into abutment with the stator 136 by means of the spring forces of the set springs 145. Then, in case the electromagnetic clutch 135 is energized to attract the armature 137 to the stator 136, a maximum attracting force can be obtained without any delay, whereby the consumption of electric power can be saved.

Next, the construction of a wedge cam brake according to a fourth embodiment of the invention will be described by the use of FIGS. 23 to 28. A wedge cam brake according to the fourth embodiment has substantially the same configuration as that of the wedge cam brake according to the third embodiment except that a spring holding mechanism 230 is used in place of the spring holding mechanism 130 thereof.

Figure 23:
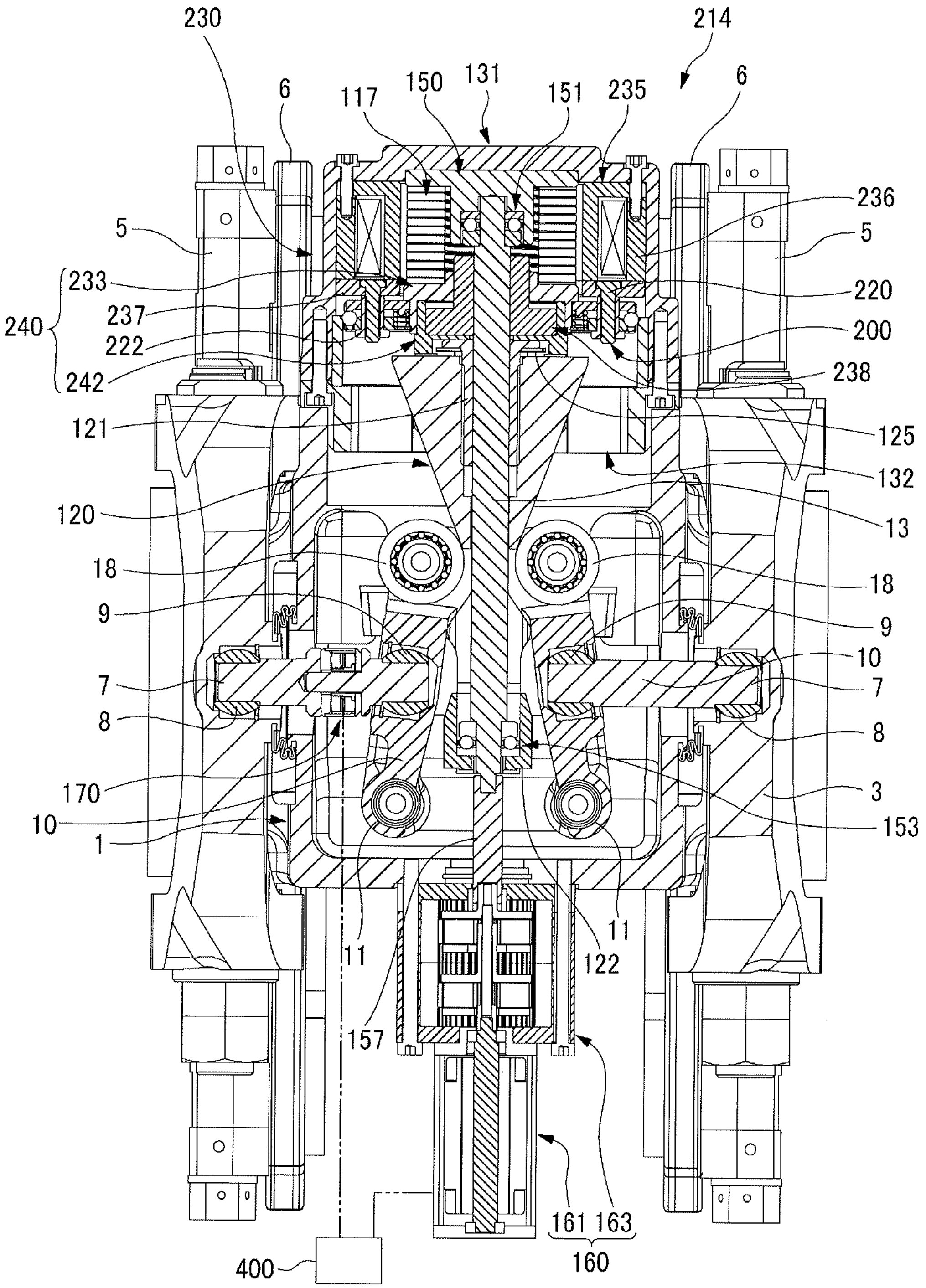
FIG. 23 is a vertical sectional view of a railway vehicle disc brake including a wedge cam brake according to a fourth embodiment of the invention.

FIG. 23 is a vertical sectional view of a railway vehicle disc brake including a wedge cam brake according to a fourth embodiment of the invention.

As shown in FIG. 23, in an actuator 214 according to the fourth embodiment, in applying a brake, a compression coil spring 117 pushes to bias a wedge cam 120 to a braking position, and a ball screw 13 which is screwed into a ball nut 238 is driven to rotate by an electric motor 161. By doing so, proximal end portions of brake arms 3, 3 are expanded to oscillate by a cam action of the wedge cam 120 which has moved to the braking position along the direction of a rotational axis of the ball screw 13, and a pair of pad assemblies 6, 6 which are provided at open end portions of the brake arms 3, 3 are pressed against both sides of a brake rotor 100 so as to hold it therebetween to execute a braking operation. Namely, as in the actuator 114 according to the third embodiment, in the actuator 214, when a motor gear unit 160 is driven, link rods 7, 7 are caused to reciprocate via a link type servo unit.

Figure 24:
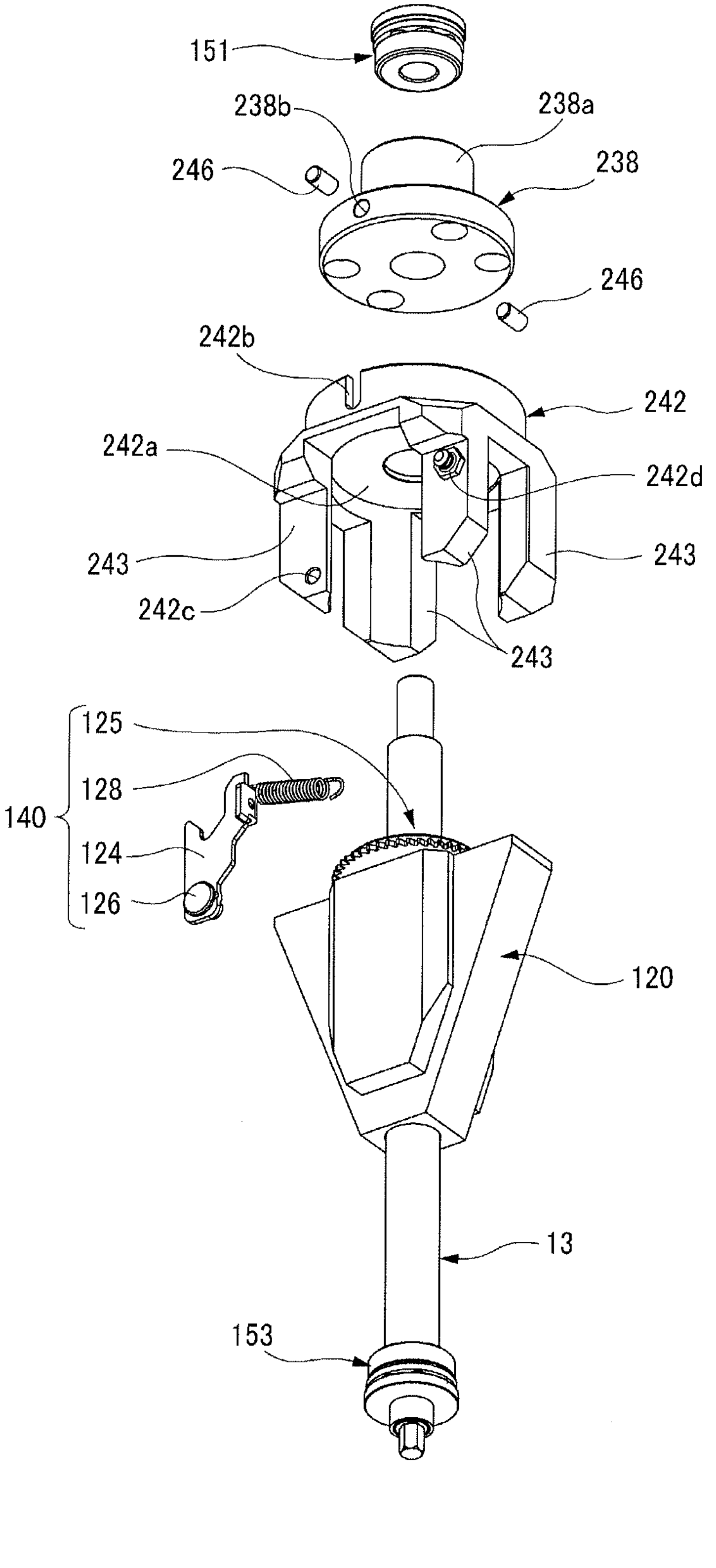
FIG. 24 is an exploded perspective view of the actuator shown in FIG. 23 as seen from below.
Figure 25:
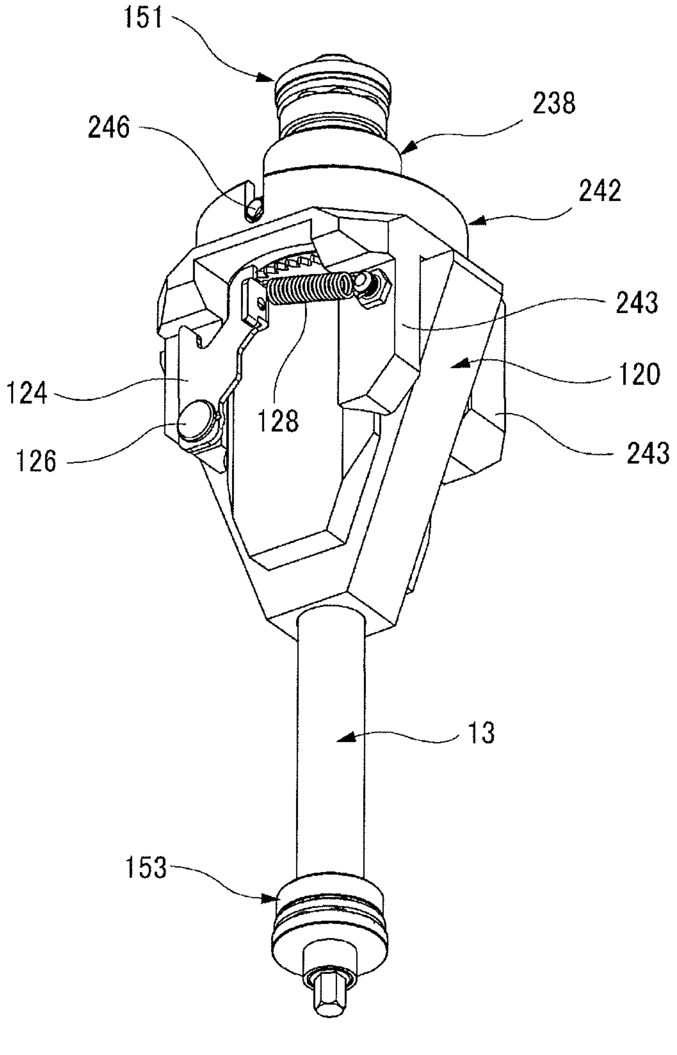
FIG. 25 is a perspective view of an assembly into which constituent parts of the actuator shown in FIG. 24 are assembled.

As shown in FIGS. 23 and 24, the ball nut 238 for pushing to bias the wedge cam 120 is accommodated within a case-shaped piston 240 which is made up of a nut holder 242 which is disposed concentrically with the ball screw 13 and a spring seat 233 so as to move relative to the case-shaped piston 240 in the direction of the rotational axis of the ball screw 13 within a predetermined range but so as not to rotate relative thereto.

Namely, the ball nut 238 is placed on an annular support portion 242*a* of the nut holder 242 from above, and thereafter, connecting pins 246 which penetrate guide slits 242*b* in the nut holder 242 are inserted to be fitted in fixing holes 238*b*. Then, the spring seat 233 is placed from above the nut holder 242 in which the ball nut 238 is placed on the annular support portion 242*a* so as to fit on a rear end boss portion 238*a* of the ball nut 238.

Then, the ball nut 238 is allowed to move slightly in the direction of the rotational axis of the ball screw 13 relative to the case-shaped piston 240 but is not allowed to rotate relative thereto within the case-shaped piston 240 into which the nut holder 242 and the spring seat 233 are assembled integrally.

The nut holder 242 of the case-shaped piston 240 is supported so as to move axially relative to a lower base 132 which is attached to an open end of a cap 131 having a substantially bottomed cylindrical shape but so as not to rotate relative thereto.

A gap adjusting mechanism 140 is provided between the annular support portion 242*a* of the nut holder 242 and the wedge cam 120. In the gap adjusting mechanism 140, a fulcrum pin 126 is fixed in a fixing hole 242*c* in a leg portion 243 of the nut holder 242, and one end of a return spring 128 is hooked on a hook pin 242*d* of a leg portion 243 of the nut holder 242.

Further, the actuator 214 includes the compression coil spring 117 which is an elastic member for pushing to bias the wedge cam 120 towards the braking position where the wedge cam 120 expands the proximal end portions of the brake arms 3, 3 and a spring holding mechanism 230 for holding the compression coil spring 117 in a biasing force accumulating state so as to push to bias the wedge cam 120 from a non-braking position to the braking position.

The spring holding mechanism 230 includes the case-shaped piston 240 which is configured to move freely along the direction of the rotational axis of the ball screw 13, which accommodates the ball nut 238 so as to move within the predetermined range along the direction of the rotational axis of the ball screw 13 but so as not to rotate relative thereto and which is configured to transmit the spring biasing force of the compression spring 117 which is interposed between the cap 131 and itself to the wedge cam 120, the armature 237 which is brought into engagement with the case-shaped piston 240 so as not to move towards the compression coil spring 117 and which is attracted to the stator 236 of the electromagnetic clutch 235 which is fixed to the cap 131, an axial force sensor 170 which is provided on one of the link rods 7, 7 for expanding the proximal end portions of the brake arms 3, 3 for detecting an axial force exerted on the link rod 7 and a controller 400 for controlling the rotation of the electric motor 161 based on a detection signal of the axial force sensor 170.

The spring seat 233 in the case-shaped piston 240 is configured to move freely along the direction of the rotational axis of the ball screw 13 in such a state that the spring seat 233 is fitted on a rear end boss portion 238*a* of the ball nut 238. The armature 237 is brought into engagement with an outer circumferential end of the spring seat 233 so as not to move towards the compression coil spring 117.

Further, the armature 237 is attached to the case-shaped piston 240 via a holding force reducing mechanism 200 for causing part of a locking force with which the case-shaped piston 240 attempting to move in an armature releasing direction is locked to be bore by an engaging portion 250 on the brake main body side. Namely, the holding force reducing mechanism 200 causes part of the holding force with which the compression coil spring 117 is held in a biasing force accumulating state to be borne by the engaging portion 250 on the brake main body side.

Figure 26:
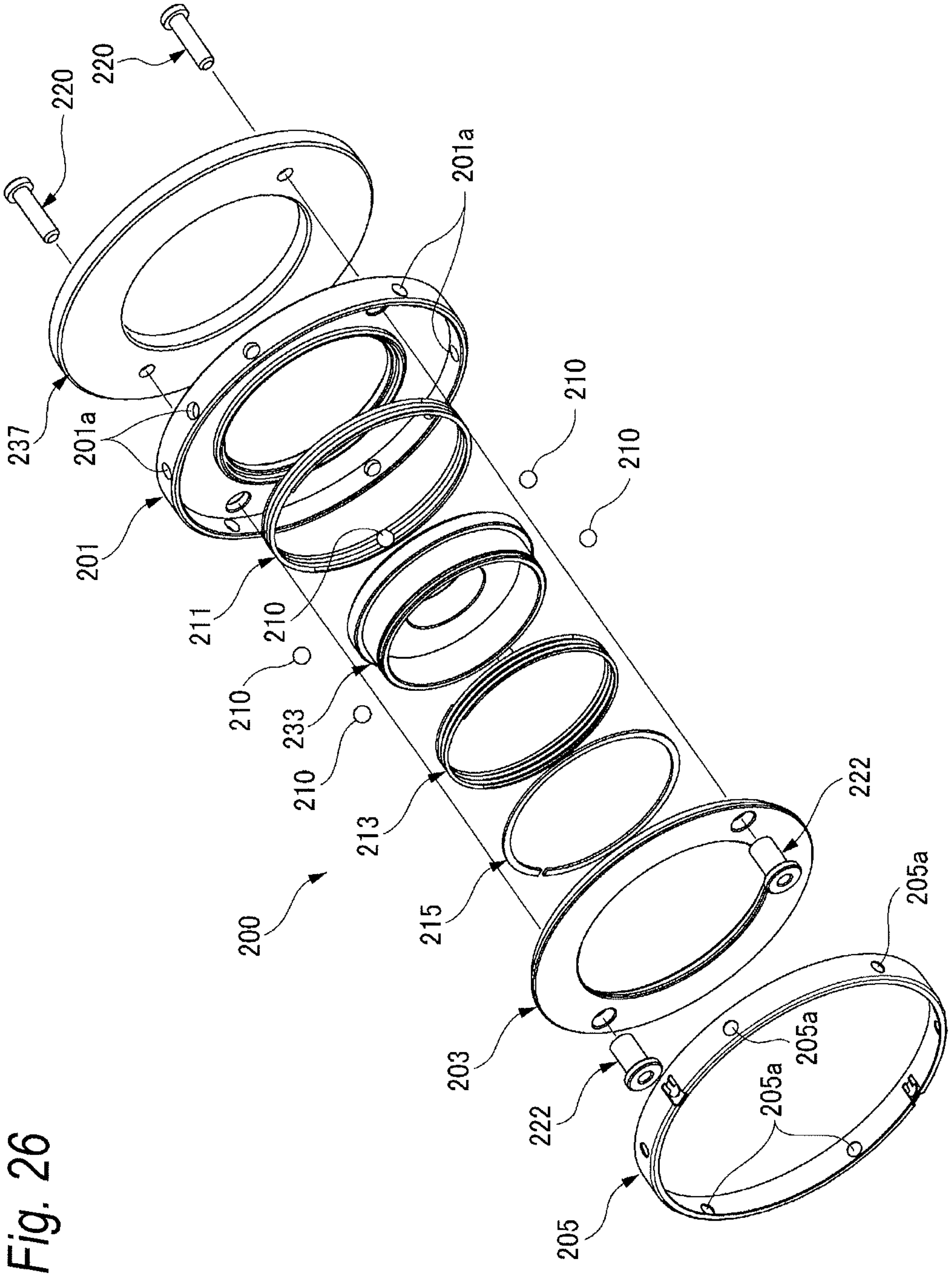
FIG. 26 is an exploded perspective view of a holding force reduction mechanism shown in FIG. 23.

As shown in FIG. 26, the holding force reducing mechanism 200 has an annular holder 201 into which an outer circumferential portion of the case-shaped piston 240 is fitted from above, a guide ring 203 which is fastened together with the annular holder 201 with nuts 222 which are screwed on support bolts 220 which are provided on the armature 237 so as to project therefrom in the armature releasing direction so as to be displaced axially relative to the annular holder 201, balls 210 which are held movably in ball supporting holes 201*a* which are provided in the annular holder 201 so as to be opened in a radial direction thereof, a compression spring 211 which is interposed between the annular holder 201 and the guide ring 203, and a holding plate 205 in which through holes 205*a* whose bore diameter is smaller than a diameter of the balls 210 are opened and which is configured to prevent the balls 210 from being dislocated radially outwards from the ball supporting holes 201*a* in the annular holder 201 while allowing the balls 210 to be brought into engagement with the engaging portion 250.

A cam surface 203*a* which is formed on an outer circumferential portion of the guide ring 203 moves the balls 210 radially outwards of the annular holder 201 as a result of the guide ring 203 moving in an armature attracting direction.

The annular holder 201 is restricted from moving in the armature releasing direction as a result of the balls 210 which move radially outwards being locked on the engaging portion 250 on the brake main body side.

An inner circumferential end of the annular holder 201 is brought into engagement with the case-shaped piston 240 (the spring seat 233) so as not to move towards the compression coil spring 117. Additionally, the annular holder 201 is elastically biased towards the stator 236 by a compression spring 213 which is interposed between a snap ring 215 which is placed on the case-shaped piston 240 and itself.

An operation of the holding force reducing mechanism 200 will be described by reference to FIGS. 27(*a*) to 27(*c*).

Figure 27:
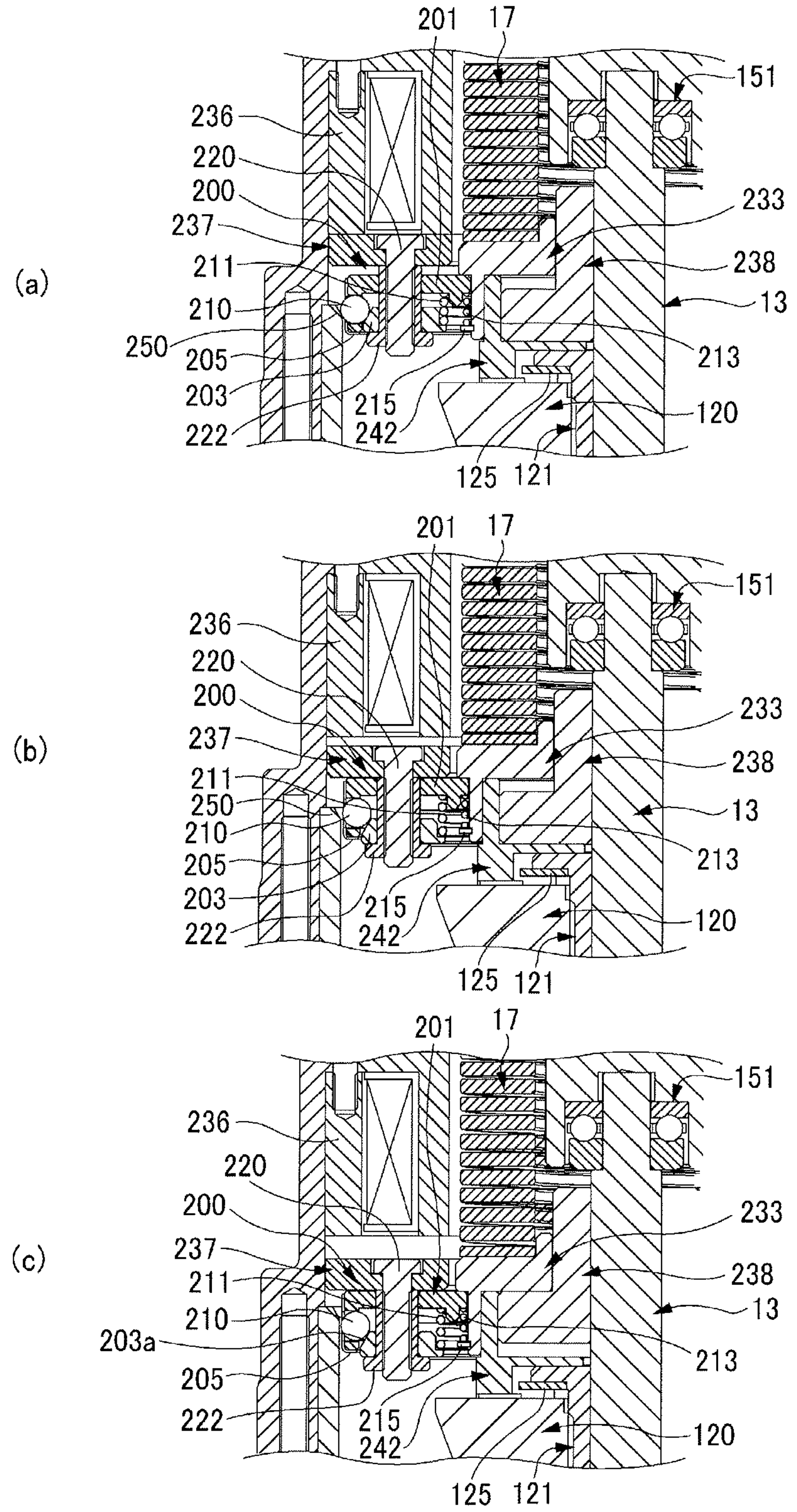
FIGS. 27(*a*) to 27(*c*) are sectional views of a main part of the holding force reduction mechanism shown in FIG. 23 for explaining an operation thereof.

As shown in FIG. 27(*a*), in such a state that the spring holding mechanism 230 is in operation and that the armature 237 is attracted to the stator 236 of the electromagnetic clutch 235, the guide ring 203 moves in the armature attracting direction against the spring biasing force of the compression coil spring 211, and the cam surface 203*a* moves the balls 210 radially outwards of the annular holder 201. Then, the guide ring 203 is restricted from moving in the armature releasing direction as a result of the balls 210 being locked on the engaging portion 250 on the brake main body side.

As a result of this, the case-shaped piston 240 which holds the compression coil spring 117 in the biasing force accumulating state is supported by means of the attracting force of the electromagnetic clutch 235 and the locking force of the engaging portion 250.

As shown in FIG. 27(*b*), when the energization of the electromagnetic clutch 235 is stopped to thereby release the attraction of the armature 237 by the stator 236, the guide ring 203 moves in a direction in which it moves away from the annular holder 201 at the same time as the armature 237 is brought into abutment with an upper surface of the annular holder 201 by means of the spring biasing force of the compression coil spring 211. Then, the cam surface 203*a* of the guide ring 203 withdraws, and the balls 210 which are locked on the engaging portion 250 on the brake main body side move radially inwards of the annular holder 201.

As a result of this, as shown in FIG. 27(*c*), the case-shaped piston 240 in which the locking force of the engaging portion 250 is released is caused to move downwards by means of the spring biasing force of the compression coil spring 117 to thereby move the wedge cam 120 to the braking position.

In this way, as a result of the armature 237 being attached to the case-shaped piston 240 via the holding force reducing mechanism 200, part of the holding force with which the compression coil spring 117 is held in the biasing force accumulating state is borne by the engaging portion 250 on the brake main body side, thereby making it possible to reduce the attraction force of the electromagnetic clutch 235.

Next, referring to FIGS. 23 and 28(*a*), 28(*b*), an operation of the actuator 214 according to the fourth embodiment will be described.

FIG. 23 shows an initial state where the brake is not in operation. In this state, the spring holding mechanism 230 is in operation, and the armature 237 is attracted to the stator 236 of the electromagnetic clutch 235, and the case-shaped piston 240 (the spring seat 233) which is brought into engagement with the inner circumferential end of the armature 237 via the holding force reducing mechanism 200 is restricted from moving downwards, staying in the holding state. Thus, the compression coil spring 117 which is interposed between the cap 131 and the spring seat 233 is held in the biasing force accumulating state.

Figure 28:
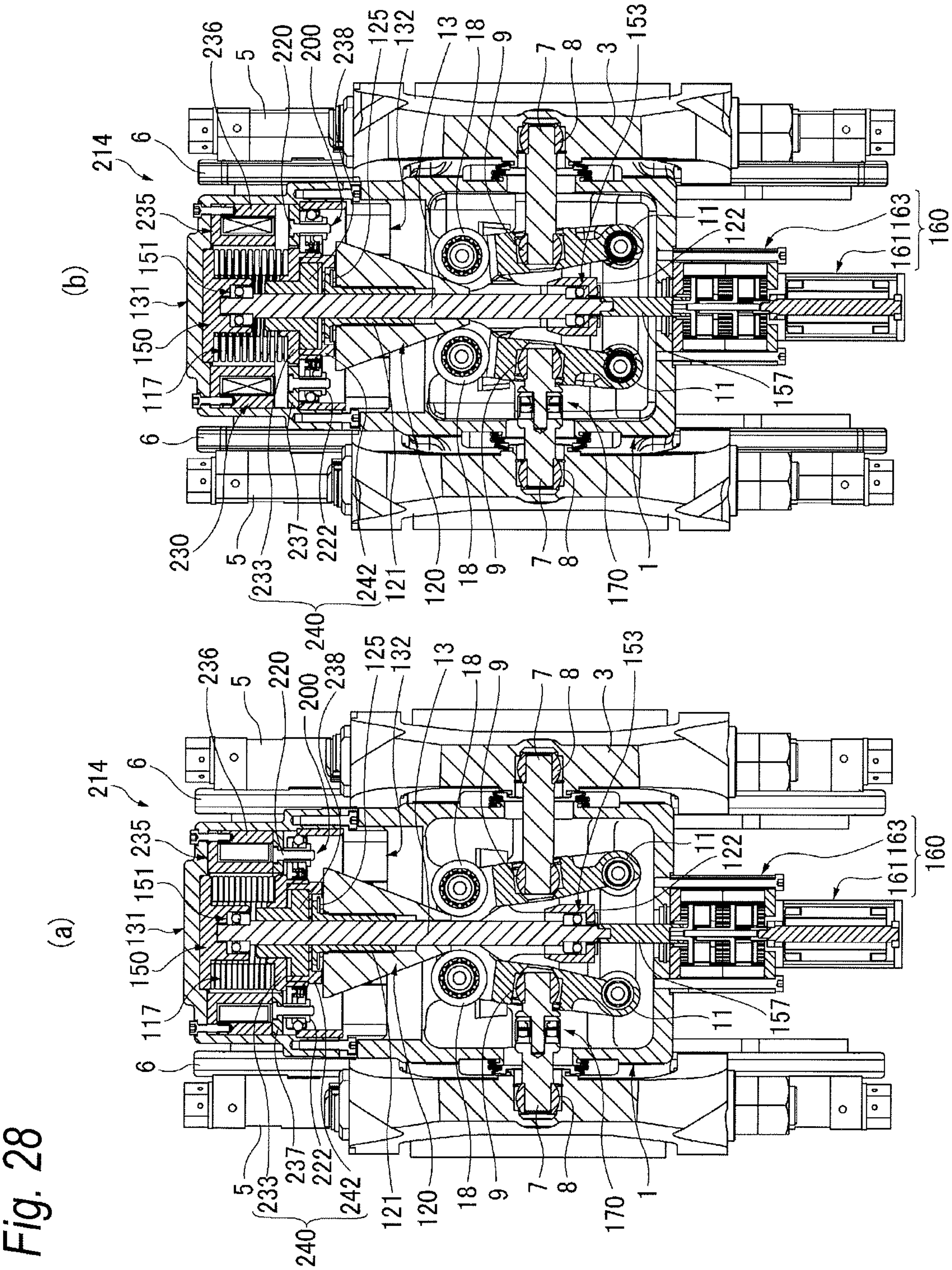
FIGS. 28(*a*), 28(*b*) are sectional views of a main part of the actuator shown in FIG. 23 for explaining an operation thereof.

Then, in applying the brake, as shown in FIG. 28(*a*), the ball screw 13 is driven to rotate in the brake applying direction by the electric motor 161, and the ball nut 238 pushes to bias the wedge cam 120 to the braking position.

Next, when the energization of the electromagnetic clutch 235 is cut off after a predetermined length of time has elapsed, releasing the attraction of the armature 237 by the stator 236, the holding force reducing mechanism 200 is released as described above. Then, the compression coil spring 117 pushes to bias the wedge cam 120 downwards in the figure via the case-shaped piston 240.

As described above, the ball nut 238 is allowed to move slightly in the direction of the rotational axis relative to the case-shaped piston 240 within a space inside the case-shaped piston 240 into which the nut holder 242 and the spring seat 233 are assembled integrally.

Then, the wedge cam 120 can be pushed to be biased to the braking position by means of the biasing force of the compression coil spring 117 which is transmitted via the case-shaped piston 240 and a screw feeding force by the ball screw 13 which is transmitted via the ball nut 238 independently.

Namely, the spring biasing force of the compression coil spring 117 is not exerted on the ball nut 238, and hence, the frictional resistance at the screwing portion between the ball nut 238 and the ball screw 13 is never increased. Consequently, the ball screw 13 is allowed to rotate smoothly, and hence, not only can the initial response of the electric motor 161 be improved, but also the operating force of the electric motor 161 can be reduced, thereby making it possible to save the consumption of electric power.

Then, as shown in FIG. 28(*b*), the wedge cam 120 on which the screw feeding force by the ball screw 13 and the biasing force of the compression coil spring 117 are exerted moves to the braking position. Then, the wedge cam 120 moves downwards to a parking brake applying position below, and the proximal end portions of the brake arms 3, 3 are expanded to oscillate by a cam action of the wedge cam 120, causing the pair of brake pads 6, 6 which are provided at the open end portions of the brake arms 3, 3 to be pressed against both sides of the brake rotor 100 so as to hold it therebetween.

As this occurs, an axial force exerted on the link rod 7 is detected by the axial force sensor 170 which is provided on one of the link rods 7 which expands the proximal end portions of the brake arms 3, 3 by the cam action of the wedge cam 120, and the controller 400 controls the rotation of the electric motor 161 based on a detection signal from the axial force sensor 170, thereby making it possible to control the braking force as required.

In releasing the brake, when the ball screw 13 is driven to rotate in the brake releasing direction by the electric motor 161, the ball nut 238 which pushes to bias the wedge cam 120 to the braking position moves upwards to the non-braking position above, whereby the wedge cam 120 also moves upwards to the non-braking position above, and the pair of pad assemblies 6, 6 are caused to move away from both the sides of the rotor 100 by the cam action of the wedge cam 120.

At the same time as this, the case-shaped piston 240 (the spring seat 233) is pushed upwards by the ball nut 238 against the spring biasing force of the compression coil spring 117, and the compression coil spring 117 is returned to the biasing force accumulating state which corresponds to their initial positions (refer to FIG. 23).

As this occurs, the armature 237 is elastically supported by the compression coil spring 213 which is interposed between the case-shaped piston 240 and itself so that the armature 237 is attracted to the stator 236 while being elastically biased thereto, and can move relative to the case-shaped piston 240 towards an opposite side to the side where the compression coil spring 117 is provided. Namely, forces exerted from the wedge cam 120 and the ball nut 238 are transmitted to the compression coil spring 117 and are not exerted on the electromagnetic clutch 235 in construction, and therefore, no excessive load is exerted on the electromagnetic clutch 235.

Next, the construction of a wedge cam brake according to a fifth embodiment of the invention will be described by the use of FIG. 29. A wedge cam brake according to the fifth embodiment has substantially the same configuration as that of the wedge cam brake according to the fourth embodiment except that in the wedge cam brake of the fifth embodiment, an armature 337 is supported by a compression coil spring 310 which is interposed between a case-shaped piston 240 and itself so that the armature 337 is attracted to a stator 336 while being elastically biased thereto although in the wedge cam brake according to the fourth embodiment, the armature 237 is attached to the case-shaped piston 240 via the holding force reducing mechanism 200.

Figure 29:
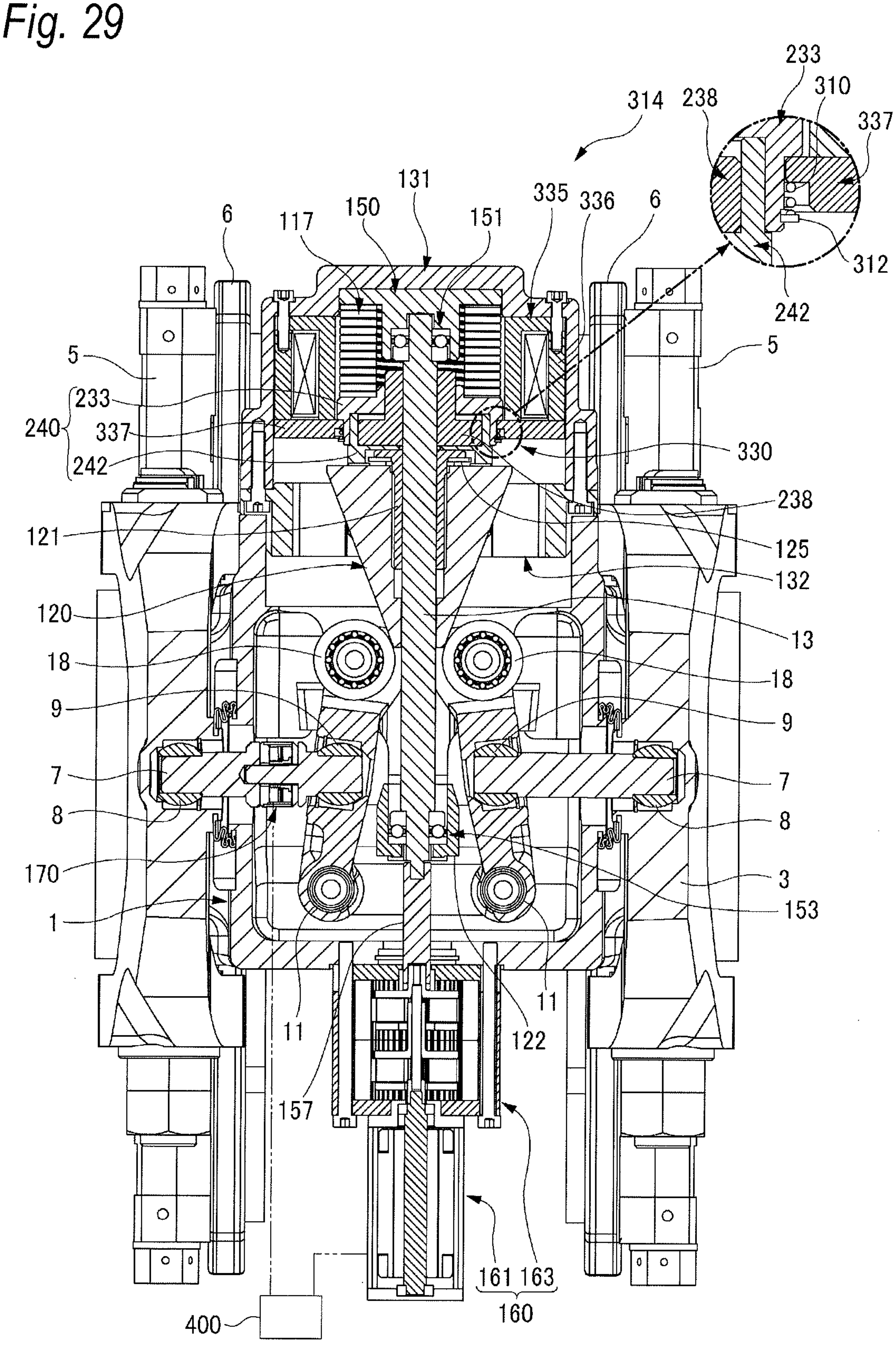
FIG. 29 is a vertical sectional view of a railway vehicle disc brake including a wedge cam brake according to a fifth embodiment of the invention.
Figure 30:
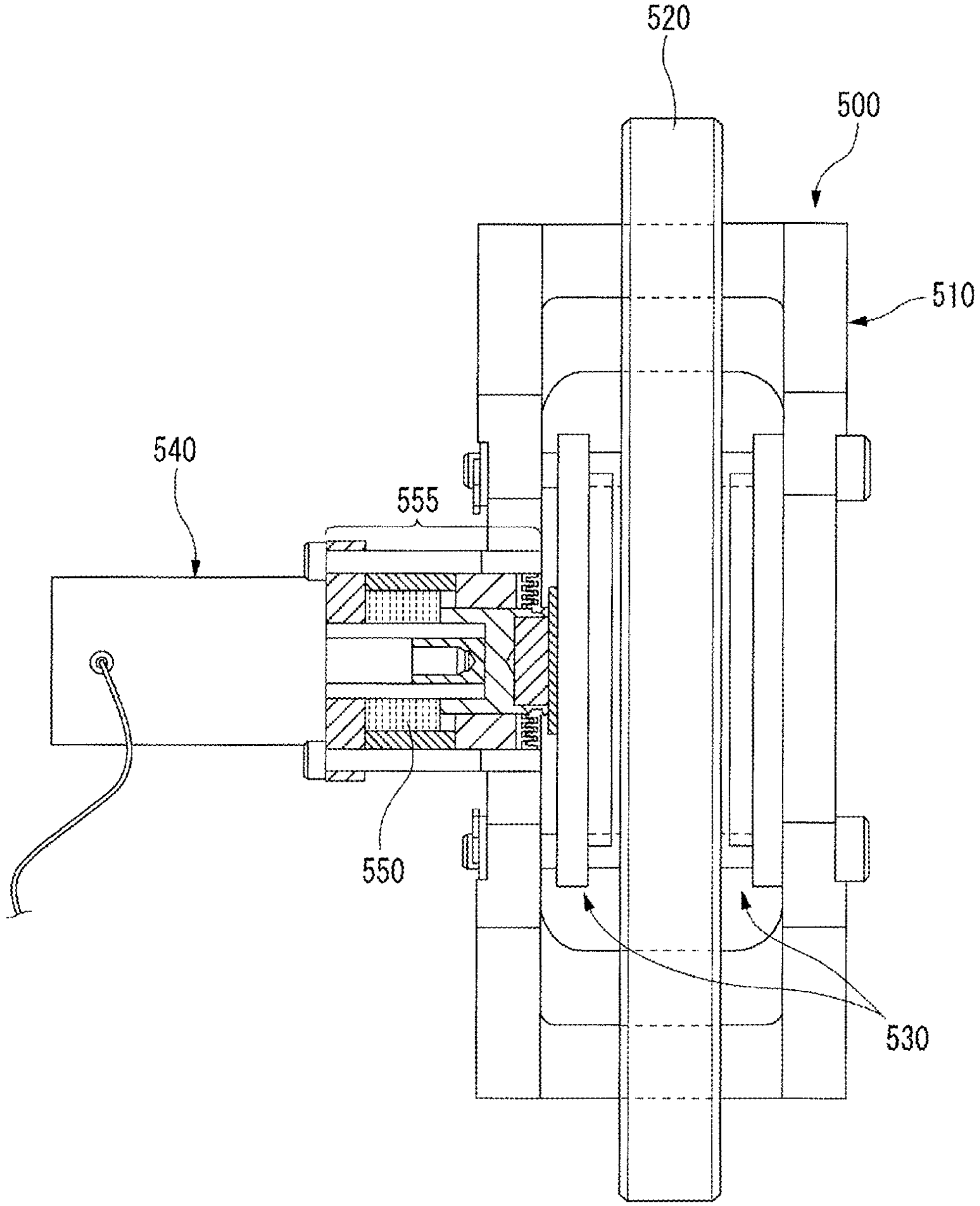
FIG. 30 is a front view of a conventional electric brake apparatus with a transmission mechanism shown in section.

As shown in FIG. 29, a spring holding mechanism 330 according to the fifth embodiment includes the case-shaped piston 240 which is configured to move freely along the direction of a rotational axis of a ball screw 13, which accommodates a ball nut 238 so as to move within a predetermined range along the direction of the rotational axis of the ball screw 13 but so as not to rotate relative thereto and which is configured to transmit a spring biasing force of a compression spring 117 which is interposed between a cap 131 and itself to a wedge cam 120, the armature 337 which is brought into engagement with the case-shaped piston 240 so as not to move towards the compression coil spring 117 and which is attracted to the stator 336 of an electromagnetic clutch 335 which is fixed to the cap 131, an axial force sensor 170 which is provided on one of link rods 7, 7 for expanding proximal end portions of brake arms 3, 3 for detecting an axial force exerted on the link rod 7 and a controller 400 for controlling the rotation of an electric motor 161 based on a detection signal of the axial force sensor 170.

The spring seat 233 in the case-shaped piston 240 is configured to move freely along the direction of the rotational axis of the ball screw 13 in such a state that the spring seat 233 is fitted on a rear end boss portion 238*a* of the ball nut 238. The armature 337 is brought into engagement with an outer circumferential end of a spring seat 233 so as not to move towards the compression coil spring 117.

Further, the armature 337 is elastically supported on the case-shaped piston 240 so as to be attracted to the stator 336 while being elastically biased thereto. Namely, the armature 337 is elastically biased towards the stator 336 by a compression spring 310 which is interposed between a snap ring 312 placed on the case-shaped piston 240 and itself.

Then, in releasing the brake, the ball screw 13 is driven to rotate in a brake releasing direction by the electric motor 161, whereby the armature 337 is brought into abutment with the stator 336 while being elastically biased thereto before the case-shaped piston 240 is caused to move to its initial position against the biasing force of the compression coil spring 117 by the ball nut 238. Then, since the electromagnetic clutch 335 can operate with substantially no gap defined between the stator 336 and the armature 337, it is possible to obtain a sufficient attracting force easily.

Thus, while the embodiments of the invention have been described heretofore, various modified examples can be considered to be made to the shape of the wedge cam and the form in which the wedge cam is attached to the ball nut, the related configuration between the wedge cam and the proximal end portions of the brake arms, and further the gap adjusting mechanism for adjusting the axial position of the wedge cam relative to the ball nut when the excessive stroke is generated within the scope of the spirit of the invention.

In addition, in the embodiments that have been described heretofore, while the invention has been described as being applied to the railway vehicle brake, it is obvious that the invention can also be applied to motor vehicles including large trucks.

Here, the characteristics of the embodiments of the wedge cam brake according to the invention will be briefly summarized by item by item below.

[1] The wedge cam brake, in which the proximal end portions of the brake arms (13) are expanded to oscillate by the cam action of the wedge cam (20, 20A, 120) which moves along a direction of the rotational axis of the ball screw (13) which screws into the ball nut (38, 38A, 138, 238) for pushing to bias the wedge cam to the braking position as a result of the ball screw being driven to rotate by the electric motor (61, 161), causing the pair of pad assemblies (6) provided at open end portions of the brake arms (3) to be pressed against both the sides of the brake rotor (100) so as to hold the brake rotor therebetween to thereby execute a braking operation, the wedge cam brake including:

the elastic member (the compression coil springs 17, 117) for pushing to bias the wedge cam to the braking position to expand the proximal end portions of the brake arms; and the spring holding mechanism (30, 30A, 130, 230) holding the elastic member in a biasing force accumulating state so as to push to bias the wedge can from the non-braking position to the braking position.

[2] The wedge cam brake according to [1] above, wherein the spring holding mechanism (30) includes:

the piston member (33) which is allowed to move freely along the direction of the rotational axis of the ball screw (13) to transmit the biasing force of the elastic member (the compression coil spring 17) to the ball nut (38) which is held so as not to rotate relative thereto, wherein the elastic member (17) is interposed between the stationary portion (the cap 31) on the brake main body side and the piston member (33);

the armature (37), which is disposed at the rear end side of the piston member, and which is attracted to the stator (36) of the electromagnetic clutch (35) which is fixed to the stationary portion on the brake main body side; and the holding lever (43), which is attached to the distal end portion of the guide rod (41) which is fixed to the armature at the proximal end portion thereof so as to oscillate, and which is brought into engagement with the engaging portion (34) on the brake main body side at the oscillating end (43*a*) thereof for abutment with the distal end side of the piston member to restrict the movement thereof.

[3] The wedge cam brake according to [1] above, wherein the spring holding mechanism (30A) includes:

the case-shaped piston (87) which is configured to move freely along the direction of the rotational axis of the ball screw (13) to transmit the biasing force of the elastic member (the compression coil spring 17) to the ball nut (38A) accommodated therein, wherein the elastic member (17) is interposed between the stationary portion (the housing 83) on the brake main body side and the case-shaped piston (87);

the guide groove portion (94*a*), which is provided on the stationary portion on a brake main body side, and which extends along the direction of the rotational axis of the ball screw;

the cam groove (94) having the holding groove portion (94*b*) which extends from one end portion of the guide groove portion in a rotational direction of the ball screw; and the follower member (the roller fixing bolt 95), which is provided integrally with the ball nut, which has the roller contact element (97) which moves so as to follow the cam groove at the distal end portion thereof, and which is provided so as to project radially outwards of the ball nut, wherein the ball nut in which the roller contact element is guided in the holding groove portion holds the wedge cam (20A) in the non-braking position against the spring biasing forces of the elastic member.

[4] The wedge cam brake according to [3] above, wherein the holding groove portion (94*b*) has the sloping surface (96) which allows the roller contact element (97) to roll towards the guide groove portion (94*a*) by the biasing force of the elastic member (the compression coil spring 17).

[5] The wedge cam brake according to [1] above, wherein the spring holding mechanism (130) includes:

the piston member (the spring seat 133) which is configured to move freely along the direction of the rotational axis of the ball screw (13) to transmit the biasing force of the elastic member (the compression coil spring 117) to the ball nut (138) which is held so as not to rotate relative to the ball screw, wherein the elastic member (117) is interposed between the stationary portion (the cap 131) on the brake main body side and the piston member (133);

the armature (137), which is brought into engagement with the piston member so as not to move towards the elastic member relative thereto, and which is attracted to the stator (136) of the electromagnetic clutch (135) which is fixed to the stationary portion on the brake main body side;

the axial force sensor (170), which is provided on the link rod (7) for expanding the proximal end portion of the brake arm (3), for detecting the axial force exerted on the link rod; and the controller (400) for controlling the rotation of the electric motor (161) based on the detection signal of the axial force sensor.

[6] The wedge cam brake according to [5] above, wherein the damper member (139) is provided between the pushing portion of the piston member (the spring seat 133) which pushes to bias the ball nut (138) and the ball nut.

[7] The wedge cam brake according to [5] or [6] above, wherein the armature (137) is elastically biased towards the stator (136) by the set spring (145) whose spring force is weaker than the biasing force of the elastic member (the compression spring 117) at all times.

[8] The wedge cam brake according to [1] above, wherein the spring holding mechanism (230) includes:

the case-shaped piston (240), which is configured to move freely along the direction of the rotational axis of the ball screw (13), which accommodates the ball nut (238) so as to move relative to the ball screw along the direction of the rotational axis of the ball screw within the predetermined range and so as not to rotate relative thereto and which is configured to transmit the biasing force of the elastic member (the compression coil spring 117) to the wedge cam (120), wherein the elastic member (117) is interposed between the stationary portion (the cap 131) on the brake main body side and the xase-shaped piston (240); and the armature (237), which is brought into engagement with the case-shaped piston so as not to move towards the elastic member relative to the case-shaped piston, and which is attracted to the stator (236) of the electromagnetic clutch (235) which is fixed to the stationary portion of the brake main body side.

[9] The wedge cam brake according to [8] above, wherein the armature (237) is elastically supported on the case-shaped piston (240) so as to be attracted to the stator (236) while being elastically biased thereto.

[10] The wedge cam brake according to [8] above, wherein the armature (237) is attached to the case-shaped piston via the holding force reducing mechanism (200), and the holding force reducing mechanism (200) causes a part of the locking force, with which the case-shaped piston (240) attempting to move in the armature releasing direction is locked, to be borne by the engaging portion (250) on the brake main body side.

The invention is not limited to the embodiments that have been described heretofore and hence can be modified or improved as required. In addition, the materials, shapes, dimensions, numbers, arranging positions and the like of the constituent elements described in the embodiments are arbitrary and hence are not limited thereto, provided that those elements can achieve the invention.

In addition, the patent application is based on Japanese Patent Application (No. 2015-155798) filed on Aug. 6, 2015 and Japanese Patent Application (No. 2016-051276) filed on Mar. 15, 2016, and the contents thereof are incorporated herein by reference.

INDUSTRIAL APPLICABILITY

Since the wedge cam brake of the invention can reduce the consumption of electric power by the electric motor and can ensure against the failure of power supply, the wedge cam brake can be applied to a railway vehicle disc brake.

DESCRIPTION OF REFERENCE NUMERALS

1 Body
2 Support
3 Brake Arm
4 Brake Arm Shaft
5 Pad Holder
6 Pad Assembly
7 Link Rod
10 Roller Arm
13 Ball Screw
14 Actuator
17 Compression Coil Spring (Elastic Member)
18 Cam Roller
20 Wedge Cam
30 Spring Holding Mechanism
33 Piston Member
38 Ball Nut
61 Electric Motor
100 Brake Rotor

The invention claimed is:

1. A wedge cam brake, in which proximal end portions of brake arms are expanded to oscillate by a cam action of a wedge cam which moves along a direction of a rotational axis of a ball screw which screws into a ball nut for pushing to bias the wedge cam to a braking position as a result of the ball screw being driven to rotate by an electric motor, causing a pair of pad assemblies provided at open end portions of the brake arms to be pressed against both sides of a brake rotor so as to hold the brake rotor therebetween to thereby execute a braking operation, the wedge cam brake comprising:

an elastic member configured to bias the wedge cam in a direction from a non-braking position to the braking position to expand the proximal end portions of the brake arms; and a spring holding mechanism holding the elastic member in a biasing force accumulating state, wherein the spring holding mechanism includes:

a piston member which is allowed to move along the direction of the rotational axis of the ball screw to transmit a biasing force of the elastic member to the ball nut which is held so as not to rotate relative to the piston member, wherein the elastic member is interposed between a stationary portion on a brake main body side and the piston member;

an armature, which is disposed at a rear end side of the piston member, and which is attracted to a stator of an electromagnetic clutch which is fixed to the stationary portion on the brake main body side; and a holding lever, which is attached to a distal end portion of a guide rod which is fixed to the armature at a proximal end portion thereof so as to oscillate, wherein the holder lever is brought into engagement with an engaging portion provided in a guide rail of the brake main body side at an oscillating end thereof for abutment with a distal end side of the piston member to restrict the movement thereof.

2. A wedge cam brake, in which proximal end portions of brake arms are expanded to oscillate by a cam action of a wedge cam which moves along a direction of a rotational axis of a ball screw which screws into a ball nut for pushing to bias the wedge cam to a braking position as a result of the ball screw being driven to rotate by an electric motor, causing a pair of pad assemblies provided at open end portions of the brake arms to be pressed against both sides of a brake rotor so as to hold the brake rotor therebetween to thereby execute a braking operation, the wedge cam brake comprising:

an elastic member configured to bias the wedge cam in a direction from a non-braking position to the braking position to expand the proximal end portions of the brake arms; and a spring holding mechanism holding the elastic member in a biasing force accumulating state, wherein the spring holding mechanism includes:

a piston having a flange and a cylindrical main body portion, which is configured to move along the direction of the rotational axis of the ball screw to transmit a biasing force of the elastic member to the ball nut accommodated therein, wherein the elastic member is interposed between a stationary portion on a brake main body side and the piston;

a guide groove portion, which is provided on the stationary portion on a brake main body side, and which extends along the direction of the rotational axis of the ball screw;

a cam groove having a holding groove portion which extends from one end portion of the guide groove portion in a rotational direction of the ball screw; and a follower member, which is provided integrally with the ball nut, which has a roller contact element which moves so as to follow the cam groove at a distal end portion thereof, and which is provided so as to project radially outwards of the ball nut, wherein in a state where the roller contact element is guided in the holding groove portion, the ball nut holds the wedge cam in the non-braking position against the spring biasing forces of the elastic member.

3. The wedge cam brake according to claim 2, wherein the holding groove portion has a sloping surface which allows the roller contact element to roll towards the guide groove portion by the biasing force of the elastic member.

4. A wedge cam brake, in which proximal end portions of brake arms are expanded to oscillate by a cam action of a wedge cam which moves along a direction of a rotational axis of a ball screw which screws into a ball nut for pushing to bias the wedge cam to a braking position as a result of the ball screw being driven to rotate by an electric motor, causing a pair of pad assemblies provided at open end portions of the brake arms to be pressed against both sides of a brake rotor so as to hold the brake rotor therebetween to thereby execute a braking operation, the wedge cam brake comprising:

an elastic member configured to bias the wedge cam in a direction from a non-braking position to the braking position to expand the proximal end portions of the brake arms; and a spring holding mechanism holding the elastic member in a biasing force accumulating state, wherein the spring holding mechanism includes:

a piston member which is configured to move along the direction of a rotational axis of the ball screw to transmit a biasing force of the elastic member to the ball nut which is held so as not rotate relative to the ball screw, wherein the elastic member is interposed between a stationary portion on a brake main body side and the piston member;

an armature, which is brought into engagement with the piston member so as not to move towards the elastic member relative thereto, and which is attracted to a stator of an electromagnetic clutch which is fixed to the stationary portion on the brake main body side;

an axial force sensor, which is provided on a link rod for expanding the proximal end portion of the brake arm, for detecting an axial force exerted on the link rod; and a controller for controlling the rotation of the electric motor based on a detection signal of the axial force sensor.

5. The wedge cam brake according to claim 4, wherein a damper member is provided between a pushing portion of the piston member which pushes to bias the ball nut and the ball nut.

6. The wedge cam brake according to claim 4, wherein the armature is elastically biased towards the stator by a set spring whose spring force is weaker than the biasing force of the elastic member at all times.

7. A wedge cam brake, in which proximal end portions of brake arms are expanded to oscillate by a cam action of a wedge cam which moves along a direction of a rotational axis of a ball screw which screws into a ball nut for pushing to bias the wedge cam to a braking position as a result of the ball screw being driven to rotate by an electric motor, causing a pair of pad assemblies provided at open end portions of the brake arms to be pressed against both sides of a brake rotor so as to hold the brake rotor therebetween to thereby execute a braking operation, the wedge cam brake comprising:

an elastic member configured to bias the wedge cam in a direction from a non-braking position to the braking position to expand the proximal end portions of the brake arms; and a spring holding mechanism holding the elastic member in a biasing force accumulating state, wherein the spring holding mechanism includes:

a piston having a flange and a cylindrical main body portion, which is configured to move along the direction of a rotational axis of the ball screw, which accommodates the ball nut so as to move relative to the ball screw along the direction of the rotational axis of the ball screw within a predetermined range and so as not to rotate relative thereto and which is configured to transmit a biasing force of the elastic member to the wedge cam, wherein the elastic member is interposed between the stationary portion on the brake main body side and the piston; and an armature, which is brought into engagement with the piston so as not to move towards the elastic member relative to the piston, and which is attracted to a stator of an electromagnetic clutch which is fixed to the stationary portion of the brake main body side.

8. The wedge cam brake according to claim 7, wherein the armature is elastically supported on the piston so as to be attracted to the stator while being elastically biased thereto.

9. The wedge cam brake according to claim 7, wherein the armature is attached to the piston via a holding force reducing mechanism, and the holding force reducing mechanism causes a part of a locking force, with which the piston attempting to move in an armature releasing direction is locked, to be borne by an engaging portion on the brake main body side.

* * * * *